(12) United States Patent
Hayashi et al.

(10) Patent No.: US 11,265,704 B2
(45) Date of Patent: Mar. 1, 2022

(54) SECURITY KEY GENERATION FOR COMMUNICATIONS BETWEEN BASE STATION AND TERMINAL BASED ON BEAM SELECTION

(71) Applicant: NEC CORPORATION, Tokyo (JP)

(72) Inventors: Sadafuku Hayashi, Tokyo (JP); Hisashi Futaki, Tokyo (JP); Anand Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 410 days.

(21) Appl. No.: 16/323,553

(22) PCT Filed: Jun. 5, 2017

(86) PCT No.: PCT/JP2017/020759
§ 371 (c)(1),
(2) Date: Feb. 6, 2019

(87) PCT Pub. No.: WO2018/029952
PCT Pub. Date: Feb. 15, 2018

(65) Prior Publication Data
US 2019/0174311 A1    Jun. 6, 2019

(30) Foreign Application Priority Data

Aug. 12, 2016 (JP) ............................. JP2016-158484

(51) Int. Cl.
*H04W 12/041* (2021.01)
*H04W 16/28* (2009.01)
(Continued)

(52) U.S. Cl.
CPC ............. *H04W 12/041* (2021.01); *H04L 9/08* (2013.01); *H04L 9/0861* (2013.01);
(Continued)

(58) Field of Classification Search
CPC ............. H04W 12/009; H04W 12/041; H04W 12/0431; H04W 12/65; H04W 16/28;
(Continued)

(56) References Cited

U.S. PATENT DOCUMENTS 6,690,798 B1   2/2004  Dent
2011/0299678 A1   12/2011  Deas et al.
(Continued)

FOREIGN PATENT DOCUMENTS

CN   1295740 A   5/2001
CN   104320777 A   1/2015
(Continued)

OTHER PUBLICATIONS

Aikawa et al., "A Key Generation Technique Using Array Antenna Beam Selection", IEEE, 2011, pp. 1-4.
(Continued)

*Primary Examiner* — Philip Sobutka
(74) *Attorney, Agent, or Firm* — Sughrue Mion, PLLC

(57) ABSTRACT

To enable security enhancement in the case of employing beamforming. A first apparatus according to the present invention includes: an information obtaining unit configured to obtain information related to beam selection; and a key generating unit configured to generate a security key for radio communication between a base station and a terminal apparatus based on the information related to the beam selection.

16 Claims, 51 Drawing Sheets

(51) Int. Cl.
*H04L 9/08* (2006.01)
*H04W 12/0431* (2021.01)
*H04W 88/08* (2009.01)
*H04W 12/00* (2021.01)
*H04W 12/65* (2021.01)
*H04W 88/06* (2009.01)

(52) U.S. Cl.
CPC .......... *H04L 9/0866* (2013.01); *H04L 9/0875* (2013.01); *H04W 12/009* (2019.01); *H04W 12/0431* (2021.01); *H04W 16/28* (2013.01); *H04L 2209/80* (2013.01); *H04W 12/65* (2021.01); *H04W 88/06* (2013.01); *H04W 88/08* (2013.01)

(58) Field of Classification Search
CPC .. H04W 88/06; H04W 88/08; H04L 2209/80; H04L 9/08; H04L 9/0861; H04L 9/0866; H04L 9/0875
See application file for complete search history.

(56) References Cited

U.S. PATENT DOCUMENTS

| | | | |
|---|---|---|---|
| 2016/0056871 | A1 | 2/2016 | Kakishima et al. |
| 2016/0191471 | A1 | 6/2016 | Ryoo et al. |
| 2016/0197709 | A1 | 7/2016 | Shen et al. |
| 2016/0219604 | A1 | 7/2016 | Fujishiro et al. |
| 2017/0288754 | A1 | 10/2017 | Tomeba et al. |
| 2018/0332657 | A1* | 11/2018 | Fan ....................... H04W 76/15 |

FOREIGN PATENT DOCUMENTS

| | | |
|---|---|---|
| JP | 2005-333489 A | 12/2005 |
| JP | 2010-109939 A | 5/2010 |
| JP | 2011-186675 A | 9/2011 |
| JP | 2012-175446 A | 9/2012 |
| JP | 2014-199997 A | 10/2014 |
| JP | 2015-53569 A | 3/2015 |
| JP | 2015-525540 A | 9/2015 |
| JP | 2016-505231 A | 2/2016 |
| JP | 2016-508004 A | 3/2016 |
| WO | 2013/188629 A2 | 12/2013 |
| WO | 2014/124024 A2 | 8/2014 |
| WO | 2014/182911 A1 | 11/2014 |
| WO | 2015/065010 A1 | 5/2015 |
| WO | 2015/115573 A1 | 8/2015 |
| WO | 2016/047373 A1 | 3/2016 |

OTHER PUBLICATIONS

Communication dated Apr. 3, 2019 from European Patent Office in counterpart EP Application No. 17839027.4.
Communication dated Oct. 13, 2020, from the Japanese Patent Office in Application No. 2019-236318.
Abdellatif, M., et al., "Neighbors and Relative Location Identification Using RSSI in a Dense Wireless Sensor Network", 2014, 13th Annual Mediterranean Ad Hoc Networking Workshop, pp. 140-145 (6 pages).
Communication dated Dec. 13, 2019 from the European Patent Office in application No. 17839027.4.
Japanese Notice of Allowance for JP Application No. 2019-236318 dated Dec. 15, 2020 with English Translation.
3GPP TS 33.401 V13.3.0, "3rd Generation Partnership Project; Technical Specification Group Services and System Aspects; 3GPP System Architecture Evolution (SAE); Security architecture (Release 13)", Jun. 2016, pp. 1-148.
3GPP TS 33.220 V13.1.0, "3rd Generation Partnership Project; Technical Specification Group Services and System Aspects; Generic Authentication Architecture (GAA); Generic Bootstrapping Architecture (GBA) (Release 13)", Jun. 2016, pp. 1-93.
ZTE, "Intra-NR mobility", 3GPP TSG RAN WG3 Meeting #92, R3-161217, May 23-27, 2016, pp. 1-5, Nanjing, China.
International Search Report of PCT/JP2017/020759 dated Jul. 4, 2017 [PCT/ISA/210].
Chinese Office Communication for CN Application No. 201 780048316.X dated Dec. 17, 2021 with English Translation.

* cited by examiner

| IE/Group Name | Presence | Range | IE type and reference | Semantics description | Criticality | Assigned Criticality |
|---|---|---|---|---|---|---|
| Message Type | M | | 9.2.13 | | YES | reject |
| ... | ... | ... | ... | ... | ... | ... |
| Beamforming ID | O | | 9.2.xx | | YES | reject |

Figure 20

| IE/Group Name | Presence | Range | IE Type and Reference | Semantics Description |
|---|---|---|---|---|
| Beamforming ID | M | | INTEGER (0..255) | |

Figure 21

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | |
| >UE Security Capabilities | M | | 9.2.29 | | -- | -- |
| >AS Security Information | M | | 9.2.30 | | -- | -- |

Figure 23

| IE/Group Name | Presence | Range | IE Type and Reference | Semantics Description |
|---|---|---|---|---|
| Key eNodeB Star | M | | BIT STRING (256) | KeNB* defined in TS 33.401 [18]. If the target cell belongs to multiple frequency bands, the source eNB selects the DL-EARFCN for KeNB* calculation as specified in section 10.3 of TS 36.331 [9]. |
| Next Hop Chaining Count | M | | INTEGER (0..7) | Next Hop Chaining Count (NCC) defined in TS 33.401 [18] |

Figure 24

SECURITY KEY GENERATION FOR COMMUNICATIONS BETWEEN BASE STATION AND TERMINAL BASED ON BEAM SELECTION

CROSS REFERENCE TO RELATED APPLICATIONS

This application is a National Stage of International Application No. PCT/JP2017/020759, filed Jun. 5, 2017, claiming priority based on Japanese Patent Application No. 2016-158484, filed Aug. 12, 2016, the contents of all of which are incorporated herein by reference in their entirety.

BACKGROUND

Technical Field

The present invention relates to an apparatus, a method, a system, a program, and a recording medium relating to beam and security enhancement.

Background Art

Recent years have seen an increase of communication traffic in mobile communication systems. It could probably be said that this arises from a situation that many communication apparatuses use Long Term Evolution (LTE) as an access technology and various applications operate on smartphones. Operators of and the national authorities related to the mobile communication systems are discussing measures such as additional allocation of frequencies for use, for example. In particular, additional allocation of high frequency bands (e.g., 6 GHz to 100 GHz) in which a wider bandwidth is expected to be usable is discussed. In addition, research and development have been conducted continuously on access technologies of mobile communication systems to address the increase of communication traffic. For example, in recent years, research and development of a technology of multi-antenna beamforming using a high frequency band (e.g., 6 GHz to 100 GHz) have been particularly active.

For example, PTL 1 to PTL 3 disclose technologies related to beamforming. Moreover, for example, PTL 4 and PTL 5 disclose technologies related to dual connectivity.

CITATION LIST

Patent Literature

[PTL 1] JP 2015-525540 T
[PTL 2] JP 2016-508004 T
[PTL 3] JP 2010-109939 T
[PTL 4] WO 2015/115573
[PTL 5] JP 2016-505231 T

SUMMARY

Technical Problem

For example, in a mobile communication system, a parameter for generating a security key (secret key) for radio communication between a base station and a terminal apparatus varies every time a cell serving the terminal apparatus changes. For example, as the parameter for generating the security key, a physical cell identity (PCI) is used. In this manner, efforts are made so that the security key would not be easily decrypted.

However, in a case of employing beamforming, a base station is capable of communicating with a terminal apparatus located considerably distant from the base station and a cell serving the terminal apparatus may not be changed for a long time. This may reduce the frequency at which the parameter for generating the security key (secret key) varies and may consequently make decryption of the security key relatively easy. In other words, security level may be lowered.

An example object of the present invention is to enable security enhancement in a case of employing beamforming.

Solution to Problem

A first apparatus according to an example aspect of the present invention includes: an information obtaining unit configured to obtain information related to beam selection; and a key generating unit configured to generate a security key for radio communication between a base station and a terminal apparatus based on the information related to the beam selection.

A second apparatus according to an example aspect of the present invention includes: a key generating unit configured to generate a security key for radio communication with a base station based on information related to beam selection; and a communication processing unit configured to perform radio communication with the base station using the security key.

A third apparatus according to an example aspect of the present invention includes: an information obtaining unit configured to obtain a security key for radio communication with a terminal apparatus, the security key being generated based on information related to beam selection; and a first communication processing unit configured to perform radio communication with the terminal apparatus using the security key.

A first method according to an example aspect of the present invention includes: obtaining information related to beam selection; and generating a security key for radio communication between a base station and a terminal apparatus based on the information related to the beam selection.

A second method according to an example aspect of the present invention includes: generating a security key for radio communication with a base station based on information related to beam selection; and performing radio communication with the base station using the security key.

A third method according to an example aspect of the present invention includes: obtaining a security key for radio communication with a terminal apparatus, the security key being generated based on information related to beam selection; and performing radio communication with the terminal apparatus using the security key.

A system according to an example aspect of the present invention includes a base station and a terminal apparatus. The base station generates a security key for radio communication with the terminal apparatus based on information related to beam selection. The terminal apparatus generates a security key for radio communication with a base station, based on the information related to the beam selection and performs the radio communication with the base station using the security key.

A first program according to an example aspect of the present invention is a program that causes a processor to execute: obtaining information related to beam selection;

and generating a security key for radio communication between a base station and a terminal apparatus based on the information related to the beam selection.

A second program according to an example aspect of the present invention is a program that causes a processor to execute: generating a security key for radio communication with a base station based on information related to beam selection; and performing radio communication with the base station using the security key.

A third program according to an example aspect of the present invention is a program that causes a processor to execute: obtaining a security key for radio communication with a terminal apparatus, the security key being generated based on information related to beam selection; and performing radio communication with the terminal apparatus using the security key.

A first recording medium according to an example aspect of the present invention is a non-transitory computer-readable recording medium storing a program that causes a processor to execute: obtaining information related to beam selection; and generating a security key for radio communication between a base station and a terminal apparatus based on the information related to the beam selection.

A second recording medium according to an example aspect of the present invention is a non-transitory computer-readable recording medium storing a program that causes a processor to execute: generating a security key for radio communication with a base station based on information related to beam selection; and performing radio communication with the base station using the security key.

A third recording medium according to an example aspect of the present invention is a non-transitory computer-readable recording medium storing a program that causes a processor to execute: obtaining a security key for radio communication with a terminal apparatus, the security key being generated based on information related to beam selection; and performing radio communication with the terminal apparatus using the security key.

Advantageous Effects of Invention

According to an example aspect of the present invention, it is possible to achieve security enhancement in a case of employing beamforming. Note that, instead of the above advantageous effects or together with the above advantageous effect, the present invention may exert other advantageous effect.

BRIEF DESCRIPTION OF THE DRAWINGS

FIG. 20 is an explanatory diagram for describing an example of HANDOVER REQUEST ACKNOWLEDGE in the first example alteration.

FIG. 21 is an explanatory diagram for describing an example of a beam ID information element (IE) in the first example alteration.

FIG. 23 is an explanatory diagram for describing an example of a security key update message in the first example alteration.

FIG. 24 is an explanatory diagram for describing an example of AS security information in the first example alteration.

DESCRIPTION OF THE EXAMPLE EMBODIMENTS

Example embodiments of the present invention will be described below in detail with reference to the accompanying drawings. Note that, in the present Specification and drawings, elements to which the same or similar descriptions are applicable are denoted by the same reference signs, whereby overlapping descriptions may be omitted.

Description will be given in the following order.
1. Related Art
2. Overview of Example Embodiments of the Present Invention
3. First Example Embodiment
3.1. Configuration of System
3.2. Configuration of Base Station
3.3. Configuration of Terminal Apparatus
3.4. Configuration of Core Network Node
3.5. Technical Features
4. Example Alterations of First Example Embodiment
4.1. First Example Alteration
4.2. Second Example Alteration
4.3. Third Example Alteration
4.4. Fourth Example Alteration
4.5. Others
5. Second Example Embodiment
5.1. Configuration of System
5.2. Configuration of Base Station
5.3. Configuration of Terminal Apparatus
5.4. Technical Features 1. Related Art As technologies related to descriptions of example embodiments and example alterations to be described below, an example of an architecture of a mobile communication system, beamforming, and dual connectivity will be described first.

(1) Architecture of Mobile System

Figure 1:
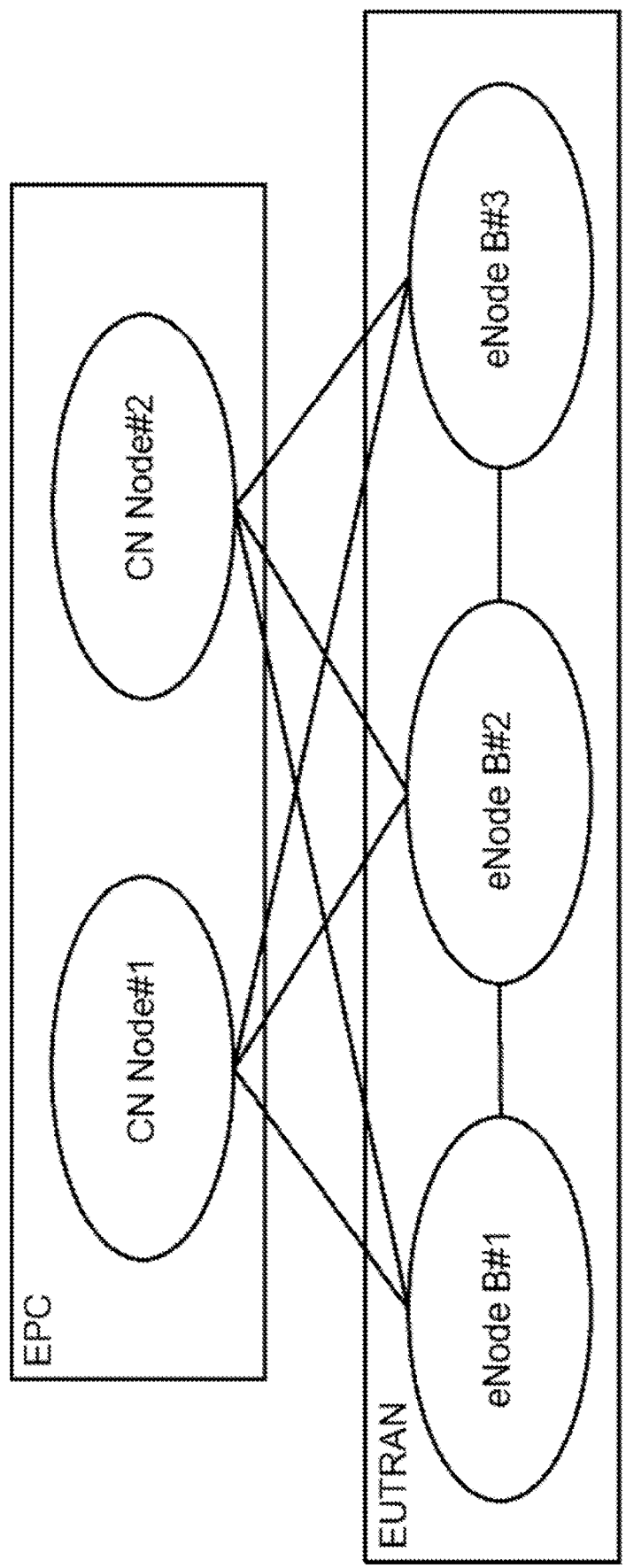
FIG. 1 is an explanatory diagram for describing an architecture of a mobile communication system using 3GPP LTE.

FIG. 1 is an explanatory diagram for describing an architecture of a mobile communication system using Third Generation Partnership Project (3GPP) LTE. With reference to FIG. 1, the mobile communication system includes an Evolved Universal Terrestrial Radio Access Network (E-UTRAN), which is a radio access network (RAN), and an Evolved Packet Core (EPC), which is a core network. E-UTRAN includes an evolved Node B (eNB), which is a base station, and EPC includes a plurality of core network nodes (e.g., a mobility management entity (MME), a serving gateway (S-GW), and the like). This architecture aims to build a system that can reduce transmission time of each of a control plane (C-plane) and a user plane (U-plane) to achieve high-throughput data transfer.

(2) Beamforming

Research and development have been conducted continuously on access technologies of mobile communication systems to address an increase of communication traffic. For example, in recent years, research and development of a technology of multi-antenna beamforming using a high frequency band (e.g., 6 GHz to 100 GHz) have been particularly active.

Different from a spread type radiation in a large cell, the beamforming technology narrows a transmission area of a certain frequency to be able to follow communicating terminals. Thus, narrowing a transmission area can reduce interference with the surroundings. Hence, a base station can communicate with a terminal located considerably distant from the base station to the limit of the transmit power of the terminal.

(3) Dual Connectivity

Figure 2:
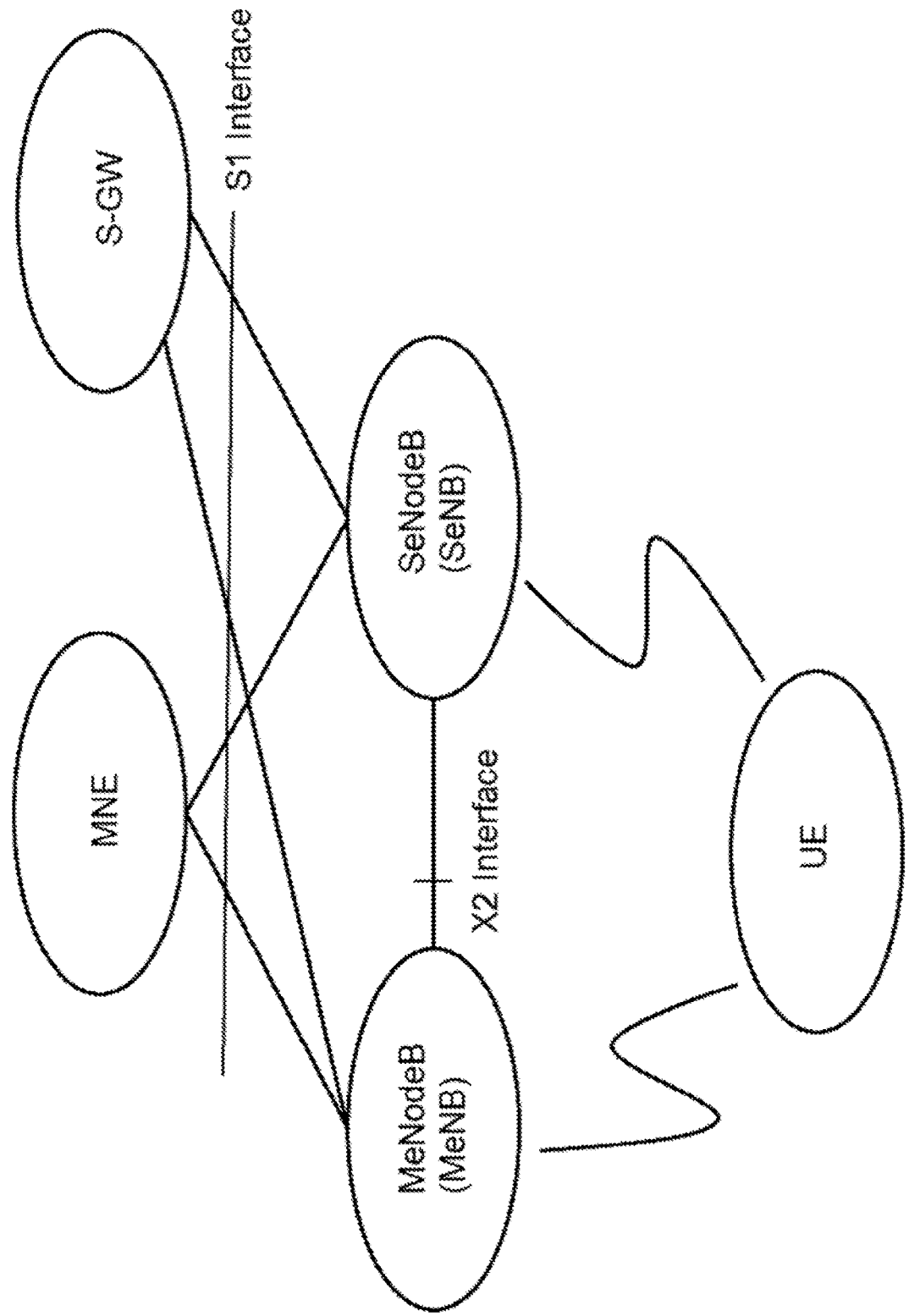
FIG. 2 is an explanatory diagram for describing an architecture of dual connectivity.

In 3GPP Release 12, dual connectivity (DC) has been standardized. As illustrated in FIG. 2, in dual connectivity, a user equipment (UE) can communicate with both a master evolved Node B (MeNB) and a secondary evolved Node B (SeNB).

Figure 3:
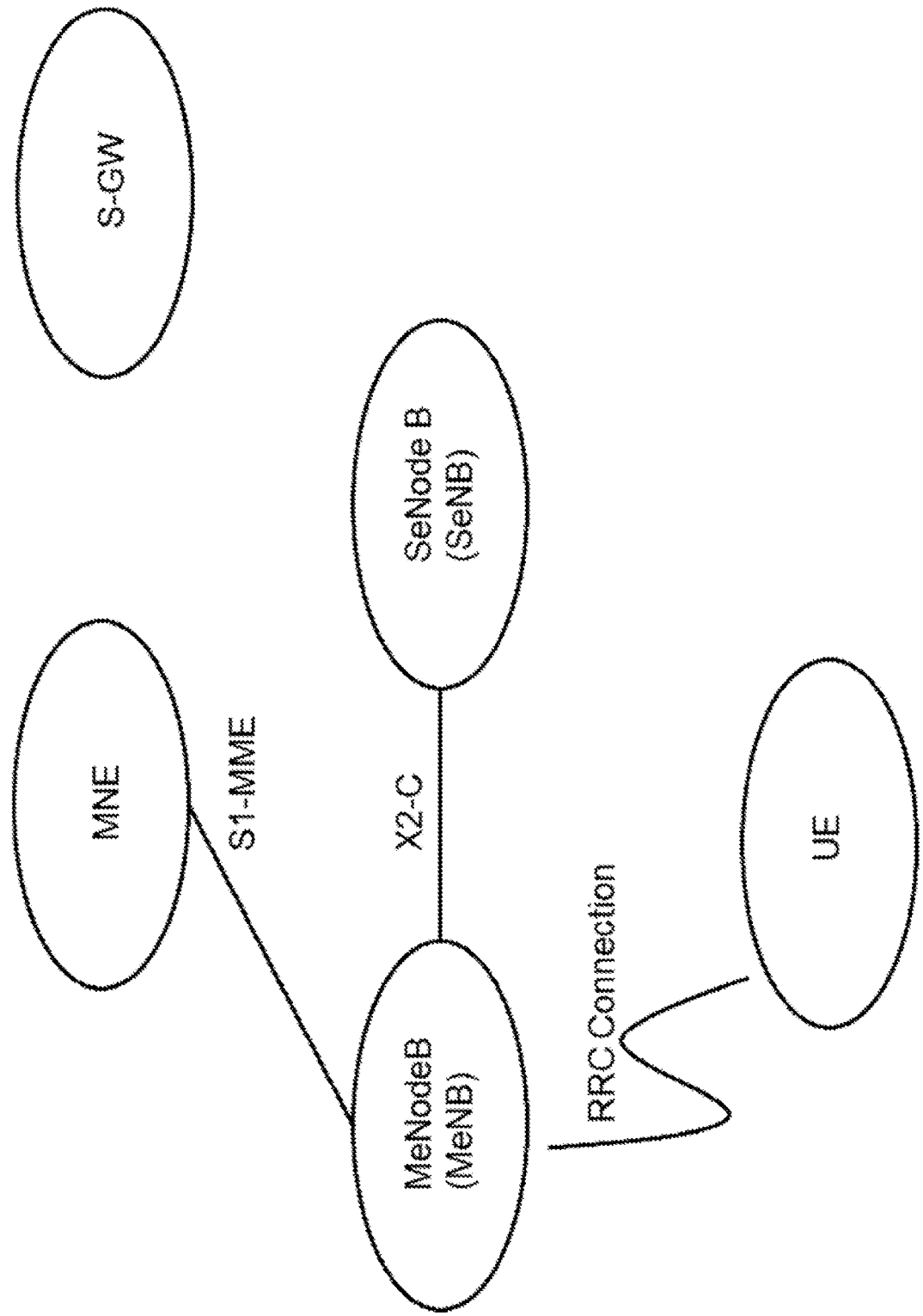
FIG. 3 is an explanatory diagram for describing connection in a control plane in dual connectivity.

As illustrated in FIG. 3, the UE performs control plane (C-plane) communication with the MeNB. The UE does not perform control plane communication with the SeNB.

Figure 4:
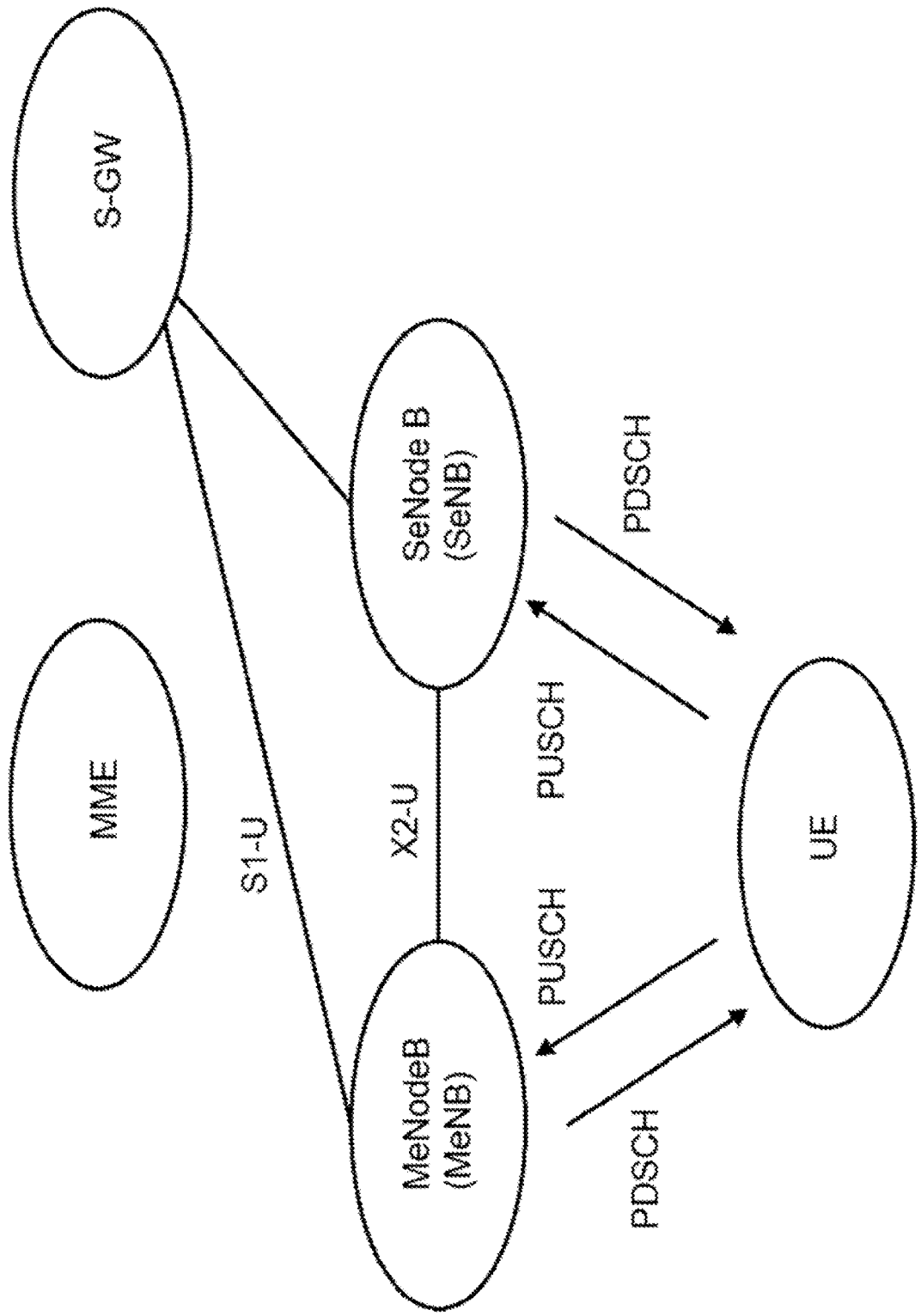
FIG. 4 is an explanatory diagram for describing a first example (example of a SCG bearer) of connection in a user plane in dual connectivity.
Figure 5:
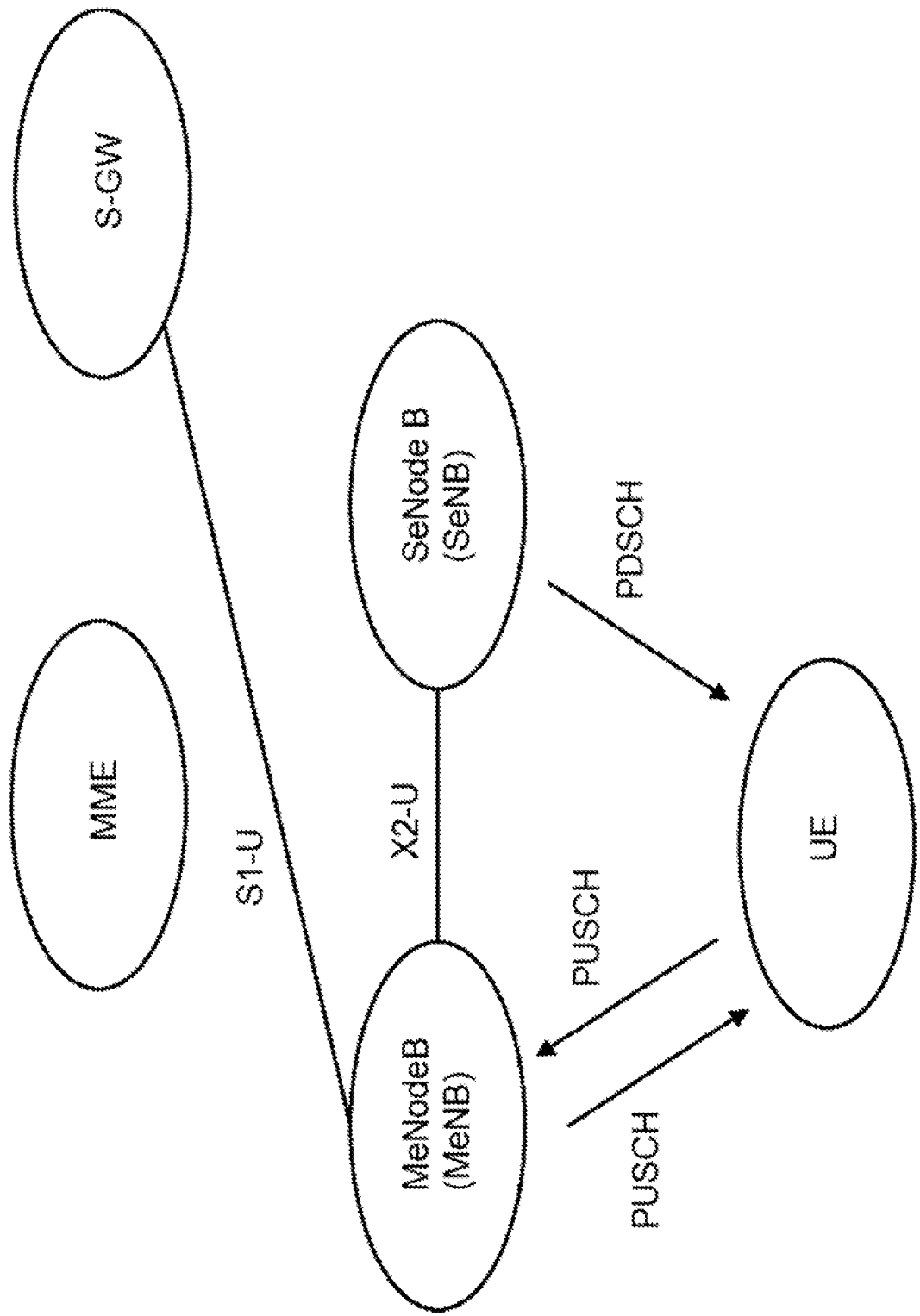
FIG. 5 is an explanatory diagram for describing a second example (example of a split bearer) of connection in the user plane in dual connectivity.

As illustrated in FIG. 4 and FIG. 5, the UE can perform user plane communication with both the MeNB and the SeNB. FIG. 4 illustrates an example of a secondary cell group (SCG) bearer. In this example, the SeNB receives, from the S-GW, data to the UE and transmits, to the S-GW, data from the UE. In contrast, FIG. 5 illustrates an example of a split bearer. In this example, the SeNB receives, from the MeNB, data to the UE. In other words, data transmitted from the SeNB to the UE passes through the MeNB.

Figure 6:
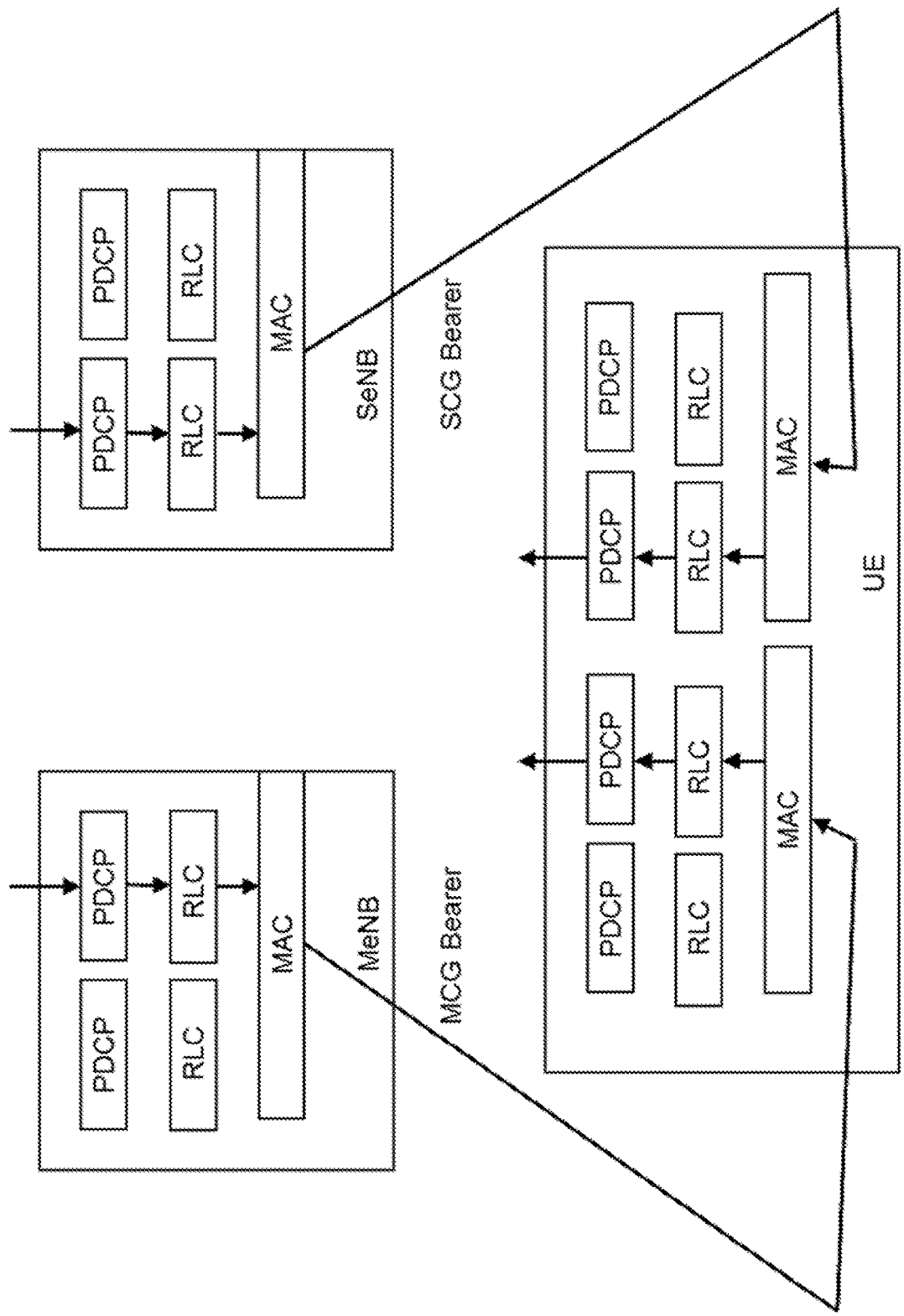
FIG. 6 is an explanatory diagram for describing protocol processing in a case of the SCG bearer.
Figure 7:
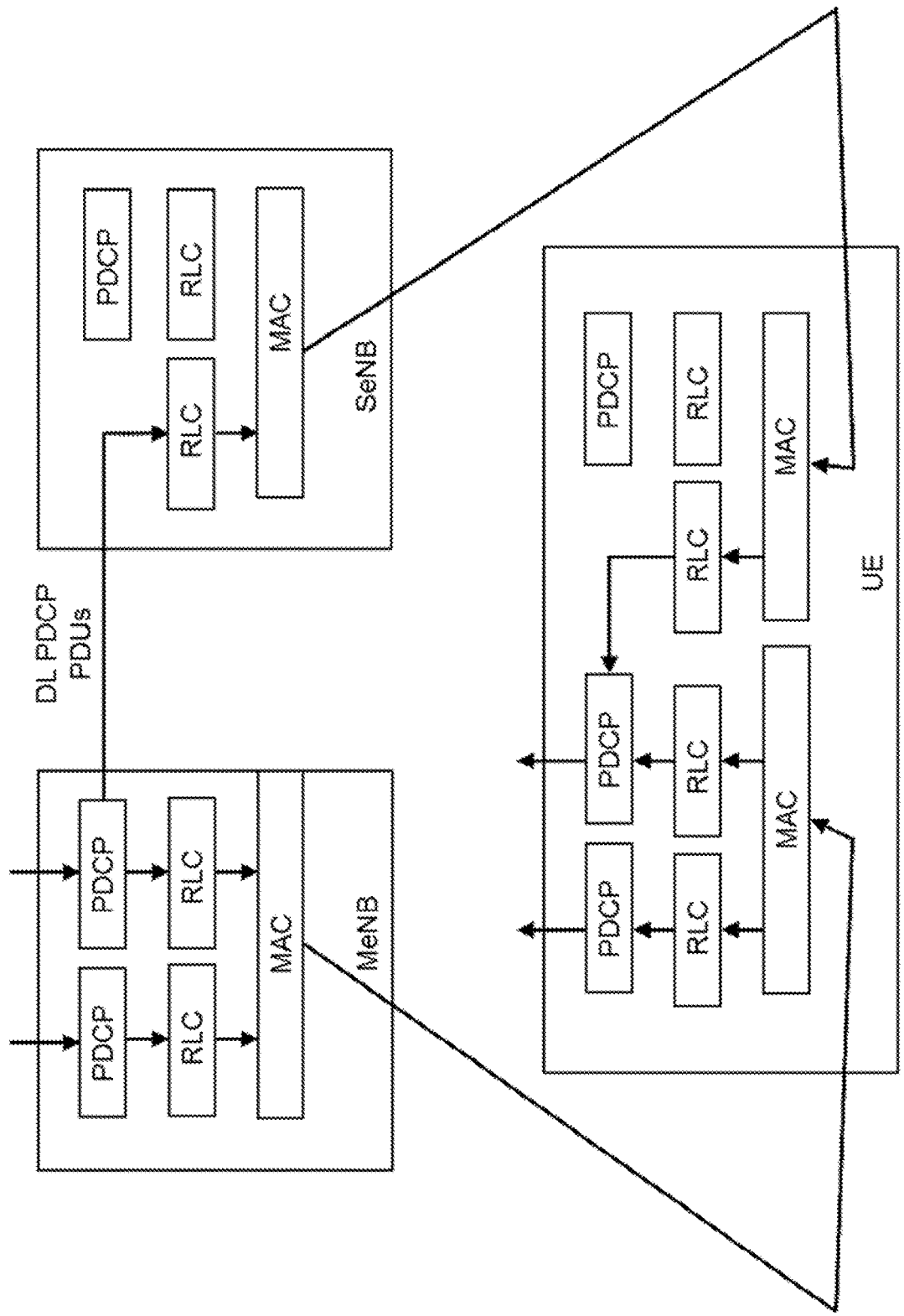
FIG. 7 is an explanatory diagram for describing protocol processing in a case of the split bearer.

FIG. 6 illustrates protocol processing in the case of the SCG bearer, and FIG. 7 illustrates protocol processing in the case of the split bearer. As illustrated in FIG. 6, in the case of the SCG bearer, protocol data convergence protocol (PDCP) processing, radio link control (RLC) processing, and medium access control (MAC) processing are performed in both the MeNB and the SeNB. In contrast, in the case of the split bearer as illustrated in FIG. 7, PDCP processing is performed only in the MeNB, and RLC processing and MAC processing are performed in the SeNB.

(4) Beamforming in Dual Connectivity

In dual connectivity, it is considered, for example, that control plane communication is performed in a large coverage of the MeNB, and user plane communication is performed through beamforming of the SeNB. In such a communication mode, communication with massive traffic can be possible between a radio access network (RAN) and UEs.

In addition, to follow move of each UE, a communication mode can be considered in which a beam used for transmission or reception of data of the UE is switched according to move of the UE.

In the above-described communication mode, for example, a cell of the MeNB is not frequently switched, but a beam of the SeNB is switched highly frequently, according to move of the UE.

2. Overview of Example Embodiments of the Present Invention

First, an overview of example embodiments of the present invention is described.

(1) Technical Problems

For example, in a mobile communication system, a parameter for generating a security key (secret key) for radio communication between a base station and a terminal apparatus varies every time a cell serving the terminal apparatus changes. For example, as the parameter for generating the security key, a physical cell ID (PCI) is used. In this manner, efforts are made so that the security key would not be easily decrypted.

However, in a case of employing beamforming, a base station is capable of communicating with a terminal apparatus located considerably distant from the base station and a cell serving the terminal apparatus may not be changed for a long time. This may reduce the frequency at which the parameter for generating the security key (secret key) varies and may consequently make decryption of the security key relatively easy. In other words, security level may be lowered.

In view of these, it is desirable to enable security enhancement in the case of employing beamforming.

(2) Technical Features

In the example embodiments of the present invention, for example, a base station generates a security key for radio communication with a terminal apparatus, based on information related to selection of a beam for the radio communication (e.g., a beam ID or a beam counter).

This enables security enhancement in the case of employing beamforming, for example. More specifically, for example, even if the cell or the base station serving the terminal apparatus does not change for a long time as a result of beamforming, a new security key is generated at the time of beam selection (e.g., at the time when beam is modified), which makes it more difficult to decrypt the security key. Hence, security enhancement can be achieved.

Note that the technical feature described above is a concrete example of the example embodiments of the present invention, and as a matter of course, the example embodiments of the present invention are not limited to the technical features described above.

3. First Example Embodiment

Next, with reference to FIG. 8 to FIG. 17, a first example embodiment of the present invention will be described.

<3.1. Configuration of System>

Figure 8:
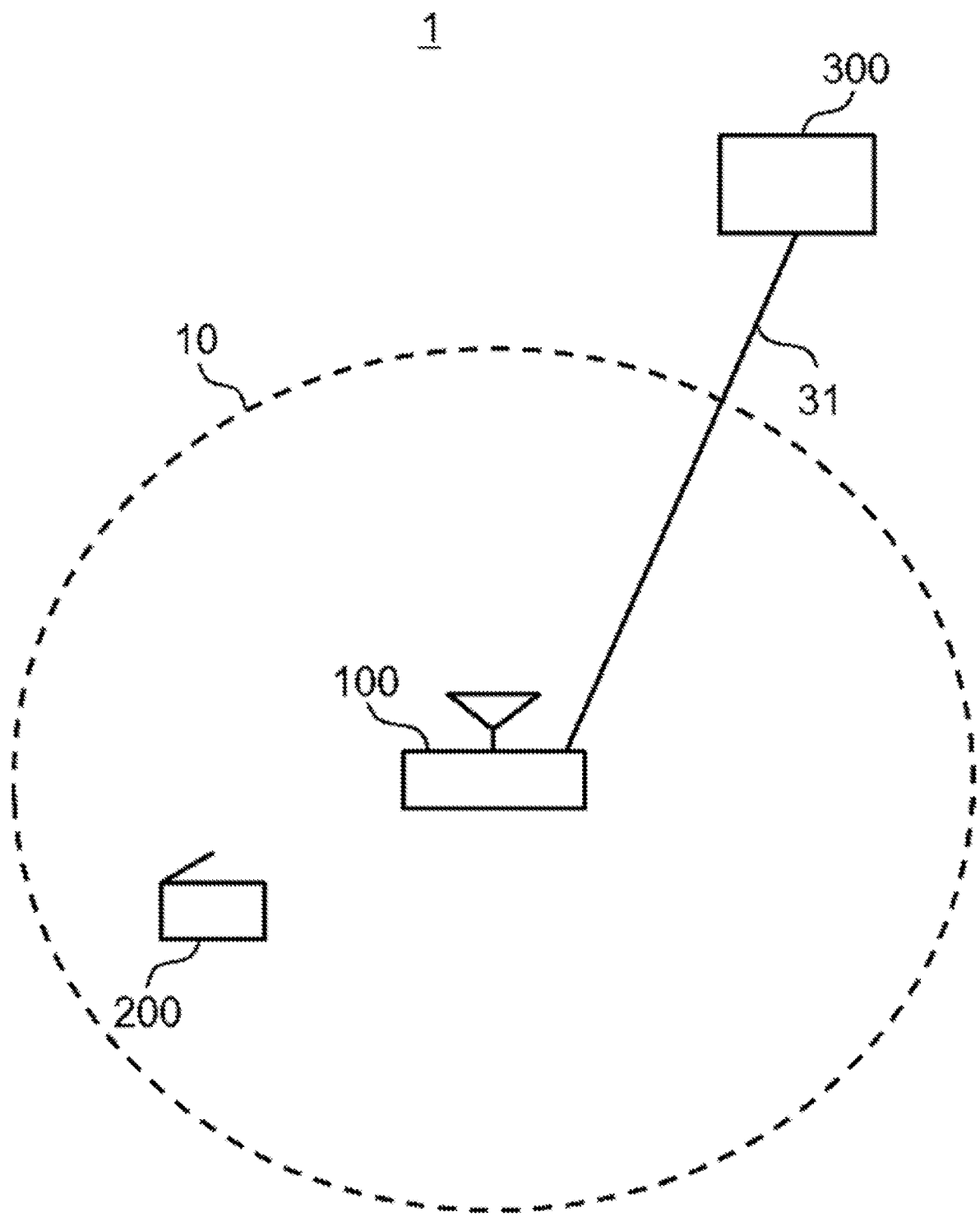
FIG. 8 is an explanatory diagram illustrating an example of a schematic configuration of a system according to a first example embodiment.

With reference to FIG. 8, an example of a configuration of a system 1 according to the first example embodiment will be described. FIG. 8 is an explanatory diagram illustrating an example of the schematic configuration of a system 1 according to the first example embodiment. According to FIG. 8, the system 1 includes a base station 100, a terminal apparatus 200, and a core network node 300.

For example, the system 1 is a system conforming to a Third Generation Partnership Project (3GPP) standard. More concretely, the system 1 may be a system conforming to LTE/LTE-Advanced or may be a system conforming to a 5th generation (5G) standard. The system 1 is apparently not limited to these examples.

(1) Base Station 100

The base station 100 performs radio communication with a terminal apparatus located in a cell 10 (or a coverage area 10).

In addition, the base station 100 communicates with the core network node 300 via an interface 31 (e.g., an S1 interface).

The base station 100 is a node that performs radio communication with a terminal apparatus, in other words, a radio access network (RAN) node. For example, the base station 100 may be an evolved Node B (eNB) or a home evolved Node B (H-eNB), or a generation Node B (gNB) in 5G. The base station 100 may include a plurality of units (or a plurality of nodes). The plurality of units (or the plurality of nodes) may include a first unit (or a first node) configured to perform upper protocol layer processing and a second unit (or a second node) configured to perform lower protocol layer processing. As an example, the first unit may be referred to as a center/central unit (CU), and the second unit may be referred to as a distributed unit (DU), a radio unit (RU), a remote unit (RU), or an access unit (AU). As another example, the first unit may be referred to as a digital unit (DU), and the second unit may be referred to as a radio unit (RU) and a remote unit (RU). The digital unit (DU) may be a base band unit (BBU), and the RU may be a remote radio head (RRH) or a remote radio unit (RRU). The terms for the first unit (or the first node) and the second unit (or the second node) are apparently not limited to these examples. Alternatively, the base station 100 may be a single unit (or a single node). In this case, the base station 100 may be one of the plurality of units (e.g., one of the first unit and the second unit) and may be connected to another one of the plurality of units (e.g., the other one of the first unit and the second unit).

(2) Terminal Apparatus 200

The terminal apparatus 200 performs radio communication with a base station. For example, when the terminal apparatus 200 is located in the cell 10, the terminal apparatus 200 performs radio communication with the base station 100. For example, the terminal apparatus 200 is a user equipment (UE).

(3) Core Network Node 300

The core network node 300 is a control node in a core network. For example, the core network node 300 is a mobility management entity (MME). Alternatively, the core network node 300 may be a 5G control node.

For example, the core network node 300 communicates with the base station 100 via the interface 31 (e.g., an S1 interface).

<3.2. Configuration of Base Station>

Figure 9:
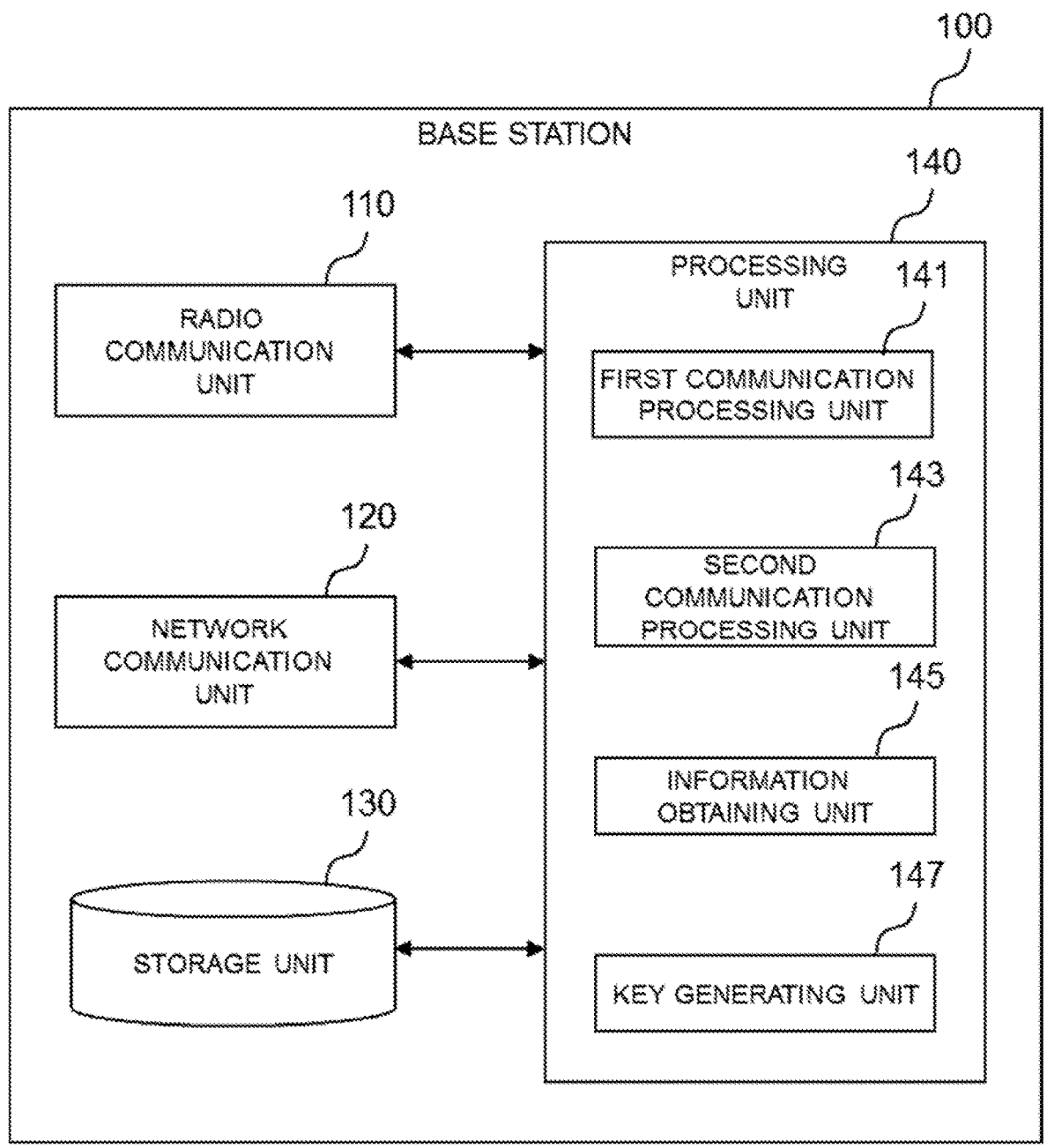
FIG. 9 is a block diagram illustrating an example of a schematic configuration of a base station according to the first example embodiment.

Next, with reference to FIG. 9, a description will be given of an example of a configuration of the base station 100 according to the first example embodiment. FIG. 9 is a block diagram illustrating an example of a schematic configuration of the base station 100 according to the first example embodiment. According to FIG. 9, the base station 100 includes a radio communication unit 110, a network communication unit 120, a storage unit 130, and a processing unit 140.

(1) Radio Communication Unit 110

The radio communication unit 110 transmits and/or receives a signal wirelessly. For example, the radio communication unit 110 receives a signal from a terminal apparatus and transmits a signal to a terminal apparatus.

(2) Network Communication Unit 120

The network communication unit 120 receives a signal from a network and transmits a signal to a network.

(3) Storage Unit 130

The storage unit 130 temporarily or permanently stores a program and parameters for operations of the base station 100 as well as various data.

(4) Processing Unit 140

The processing unit 140 provides various functions of the base station 100. The processing unit 140 includes a first communication processing unit 141, a second communication processing unit 143, an information obtaining unit 145, and a key generating unit 147. Note that the processing unit 140 may further include constituent components other than these constituent components. In other words, the processing unit 140 may perform other operations than the operations of these constituent elements. Concrete operations of the first communication processing unit 141, the second communication processing unit 143, the information obtaining unit 145, and the key generating unit 147 will be described later in detail.

For example, the processing unit 140 (first communication processing unit 141) communicates with a terminal apparatus (e.g., the terminal apparatus 200) via the radio communication unit 110. For example, the processing unit 140 (second communication processing unit 143) communicates with another network node (e.g., the core network node 300) via the network communication unit 120.

(5) Implementation Example

The radio communication unit 110 may be implemented by an antenna, a radio frequency (RF) circuit, and the like, and the antenna may be a directional antenna. The network communication unit 120 may be implemented by a network adapter, a network interface card, or the like. The storage unit 130 may be implemented by a memory (e.g., a nonvolatile memory and/or a volatile memory) and/or a hard disk, and the like. The processing unit 140 may be implemented by a baseband (BB) processor and/or another processor, and the like. The first communication processing unit 141, the second communication processing unit 143, the information obtaining unit 145, and the key generating unit 147 may be implemented by the same processor or may be implemented by separate processors. The memory (storage unit 130) may be included in such a processor (chip).

The base station 100 may include a memory configured to store a program and one or more processors that can execute the program, and the one or more processors may perform operations of the processing unit 140 (operations of the first communication processing unit 141, the second communication processing unit 143, the information obtaining unit 145 and/or the key generating unit 147). The program may be a program for causing the one or more processors to perform operations of the processing unit 140 (operations of the first communication processing unit 141, the second communication processing unit 143, the information obtaining unit 145, and/or the key generating unit 147).

<3.3. Configuration of Terminal Apparatus>

Figure 10:
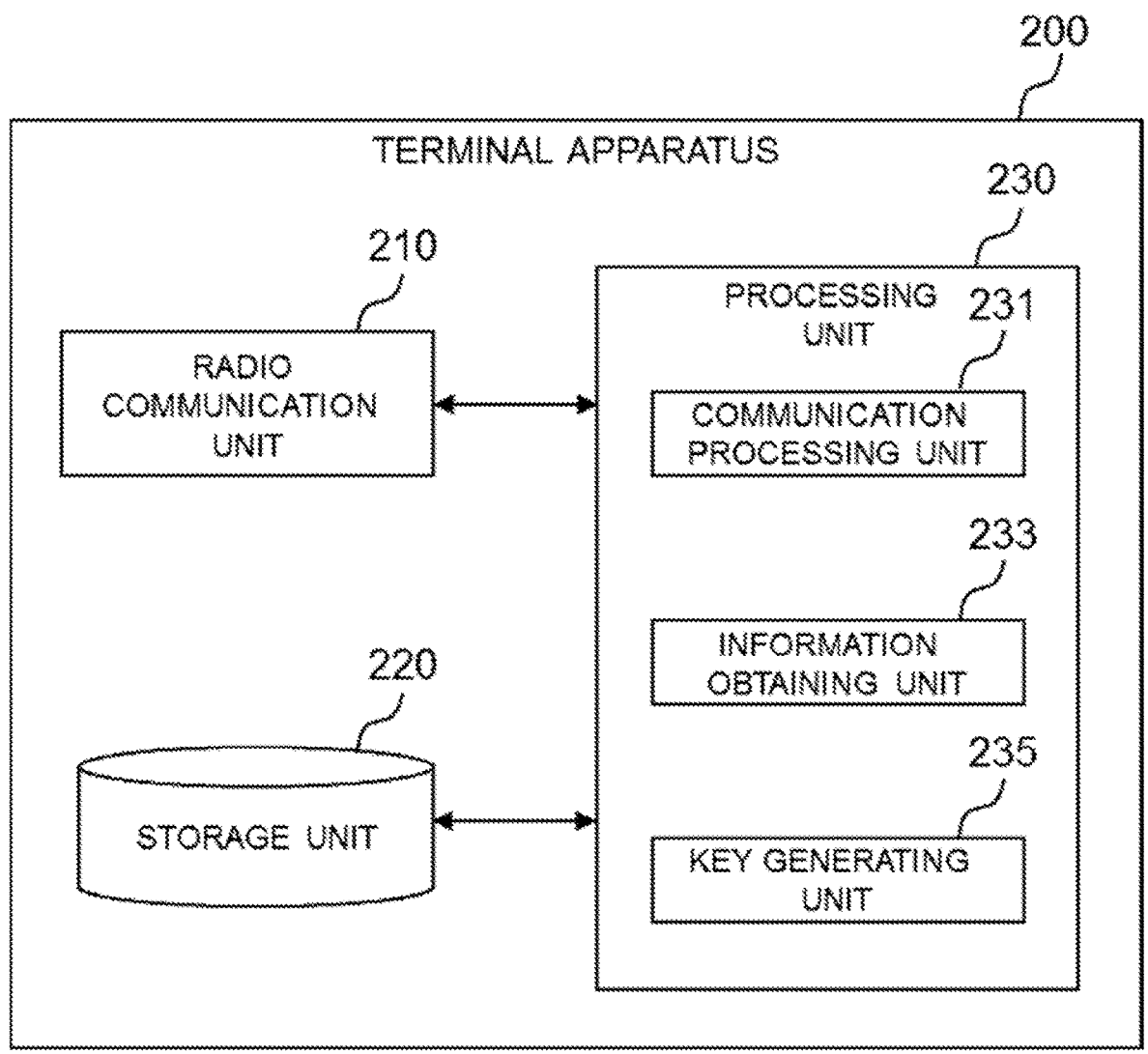
FIG. 10 is a block diagram illustrating an example of a schematic configuration of a terminal apparatus according to the first example embodiment.

Next, with reference to FIG. 10, an example of a configuration of the terminal apparatus 200 according to the first example embodiment will be described. FIG. 10 is a block diagram illustrating an example of a schematic configuration of the terminal apparatus 200 according to the first example embodiment. According to FIG. 10, the terminal apparatus 200 includes a radio communication unit 210, a storage unit 220, and a processing unit 230.

(1) Radio Communication Unit 210

The radio communication unit 210 wirelessly transmits and/or receives a signal. For example, the radio communication unit 210 receives a signal from a base station and transmits a signal to a base station.

(2) Storage Unit 220

The storage unit 220 temporarily or permanently stores a program and parameters for operations of the terminal apparatus 200 as well as various data.

(3) Processing Unit 230

The processing unit 230 provides various functions of the terminal apparatus 200. The processing unit 230 includes a communication processing unit 231, an information obtaining unit 233, and a key generating unit 235. Note that the processing unit 230 may further include constituent components other than these constituent components. In other words, the processing unit 230 may also perform operations other than the operations of these constituent components. Concrete operations of the communication processing unit 231, the information obtaining unit 233, and the key generating unit 235 will be described later in detail.

For example, the processing unit 230 (communication processing unit 231) communicates with a base station (e.g., the base station 100) via the radio communication unit 210.

(4) Implementation Example

The radio communication unit 210 may be implemented by an antenna, a radio frequency (RF) circuit, and the like. The storage unit 220 may be implemented by a memory (e.g., a nonvolatile memory and/or a volatile memory) and/or a hard disk, and the like. The processing unit 230 may be implemented by a baseband (BB) processor and/or another processor, and the like. The communication processing unit 231, the information obtaining unit 233, and the key generating unit 235 may be implemented by the same processor or may be implemented by separate processors. The memory (storage unit 220) may be included in such a processor (chip).

The terminal apparatus 200 may include a memory configured to store a program and one or more processors that can execute the program, and the one or more processors may perform operations of the processing unit 230 (operations of the communication processing unit 231, the information obtaining unit 233, and/or the key generating unit 235). The program may be a program for causing the one or more processors to perform operations of the processing unit 230 (operations of the communication processing unit 231, the information obtaining unit 233, and/or the key generating unit 235).

<3.4. Configuration of Core Network Node>

Figure 11:
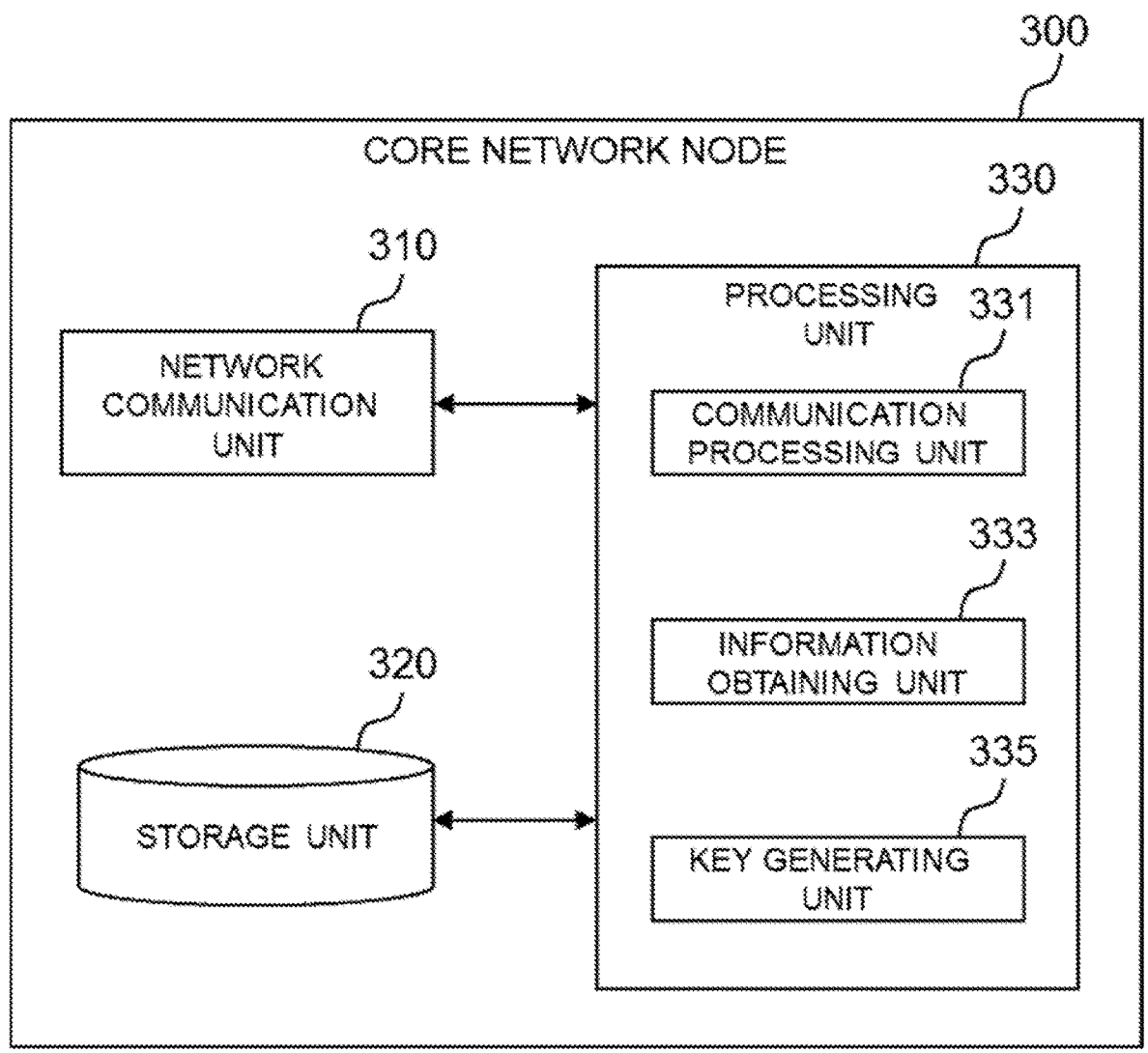
FIG. 11 is a block diagram illustrating an example of a schematic configuration of a core network node according to the first example embodiment.

Next, with reference to FIG. 11, an example of a configuration of the core network node 300 according to the first example embodiment will be described. FIG. 11 is a block diagram illustrating an example of a schematic configuration of the core network node 300 according to the first example embodiment. According to FIG. 11, the core network node 300 includes a network communication unit 310, a storage unit 320, and a processing unit 330.

(1) Network Communication Unit 310

The network communication unit 310 receives a signal from a network and transmits a signal to a network.

(2) Storage Unit 320

The storage unit 320 temporarily or permanently stores a program and parameters for operations of the core network node 300 as well as various data.

(3) Processing Unit 330

The processing unit 330 provides various functions of the core network node 300. The processing unit 330 includes a communication processing unit 331, an information obtaining unit 333, and a key generating unit 335. Note that the processing unit 330 may further include constituent components other than these constituent components. In other words, the processing unit 330 may also perform operations other than the operations of these constituent components. Concrete operations of the communication processing unit 331, the information obtaining unit 333, and the key generating unit 335 will be described later in detail.

For example, the processing unit 330 (communication processing unit 331) communicates with another network node (e.g., the base station 100) via the network communication unit 310.

(4) Implementation Example

The network communication unit 310 may be implemented by a network adapter, a network interface card, or the like. The storage unit 320 may be implemented by a memory (e.g., a nonvolatile memory and/or a volatile memory) and/or a hard disk, and the like. The processing unit 330 may be implemented by a processor and the like. The communication processing unit 331, the information obtaining unit 333, and the key generating unit 335 may be implemented by the same processor or may be implemented by separate processors. The memory (storage unit 320) may be included in such a processor (chip).

The core network node 300 may include a memory configured to store a program and one or more processors that can execute the program, and the one or more processors may perform operations of the processing unit 330 (operations of the communication processing unit 331, the information obtaining unit 333, and/or the key generating unit 335). The program may be a program for causing the one or more processors to perform operations of the processing unit 330 (operations of the communication processing unit 331, the information obtaining unit 333, and/or the key generating unit 335).

<3.5. Technical Features>

Next, technical features of the first example embodiment will be described with reference to FIG. 12 to FIG. 17.

The base station 100 (information obtaining unit 145) obtains information related to beam selection (referred to as "beam selection related information" below). Then, the base station 100 (key generating unit 147) generates a security key for radio communication between a base station and the terminal apparatus 200, based on the beam selection related information.

(1) Base Station/Radio Communication

For example, the base station is the base station 100, and the radio communication is radio communication between the base station 100 and the terminal apparatus 200. In other words, the base station 100 (key generating unit 147) generates a security key for radio communication between the base station 100 and the terminal apparatus 200.

For example, the radio communication includes downlink radio communication and uplink radio communication. Alternatively, the radio communication may be only one of downlink radio communication and uplink radio communication.

(2) Beam Selection

For example, the beam selection is selection of a beam to be used for the radio communication. The beam here is a directional beam.

Selection by Base Station

For example, the base station 100 (first communication processing unit 141) performs the beam selection. Specifically, for example, the base station 100 (first communication processing unit 141) receives measurement information on the base station 100 from the terminal apparatus 200 and selects, based on the measurement information, a beam (e.g., an optimal beam) to be used for radio communication between the base station 100 and the terminal apparatus 200.

For example, the measurement information is included in control information of a physical layer or a MAC layer. As an example, the measurement information is channel state information (CSI) or information similar to this. Alternatively, the measurement information may be included in RRC layer control information. As an example, the measurement information may be included in a measurement report. In any case, for example, the measurement information includes information such as downlink receive power and/or receive quality.

Selection by Terminal Apparatus

Alternatively, the terminal apparatus 200 (communication processing unit 231) may perform the beam selection. Specifically, the terminal apparatus 200 (communication processing unit 231) may select, based on measurements for the base station 100, a beam to be used for radio communication between the base station 100 and the terminal apparatus 200.

Beam Selection Technique

For example, the base station 100 transmits reference signals through beamforming. Specifically, for example, the base station 100 transmits reference signals by each beam by using different radio resource for each beam. Alternatively, the base station 100 may transmit, by each beam, beam-specific reference signals (e.g., reference signals including information for identifying the beam). This enables the terminal apparatus 200 to obtain measurements for each beam. Hence, the base station 100 or the terminal apparatus 200 may select an optimal beam, based on the measurements for each beam.

Alternatively, the base station 100 may transmit reference signals without using beamforming, and the terminal apparatus 200 may, for example, multiply each received signal by weights of beams to obtain the measurements for each beam. This also enables the terminal apparatus 200 to obtain measurements for each beam, which enables selection of an optimal beam.

(3) Beam Selection Related Information (3-1) Example of Beam Selection Related Information For example, the beam selection related information is a parameter that varies at the time of selection of a beam to be used for the radio communication. Specifically, the base station 100 (key generating unit 147) generates a security key for the radio communication, based on the parameter that varies at the time of selection of a beam to be used for the radio communication. The parameter may vary every time the beam is selected.

First Example: Beam Identification Information

Specifically, for example, the beam selection related information is identification information for identifying a beam to be used for the radio communication ("referred to as beam identification information" below). As an example, the beam identification information is a beam ID or a beam index. As another example, the beam identification information may be a weight ID or a weight index of weights for forming a beam. Note that the beam identification information is apparently not limited to these examples.

Second Example: Beam Counter

The beam selection related information may be a counter (referred to as a "beam counter" below) which is incremented when a beam to be used for the radio communication is selected. The beam counter may be incremented every time the beam is selected. As an example, the beam counter may have a length of 16 bits.

The beam counter may be transmitted from a source base station to a target base station at the time of a handover and may be used successively. As an example, the beam counter may be included in a HANDOVER REQUEST message transmitted from the source base station to the target base station. Alternatively, the beam counter may be returned to an initial value at the time of a handover.

In a case that the beam counter reaches an upper limit, an upper key for generating the security key may be refreshed. Alternatively, in a case that the beam counter reaches the upper limit, connection for the radio communication may be discontinued.

Others

The beam selection related information may be another parameter that varies at the time of selecting a beam without being limited to the beam identification information or the beam counter. As an example, the beam selection related information may be a pseudo-random number (having reproducibility) that varies at the time of selecting a beam.

Moreover, the beam selection related information may be another kind of information related to the beam selection without being limited to a parameter that varies at the time of selecting a beam. For example, the beam selection related information may be information indicating that the beam selection has been performed or may be information that triggers the beam selection. The base station 100 (key generating unit 147) may generate the security key in response to obtaining of such information.

(3-2) Transmission and/or Reception of Beam Selection Related Information

First Example: Transmission to Terminal Apparatus

For example, the beam selection related information is transmitted to the terminal apparatus 200, and the terminal apparatus 200 (communication processing unit 231) receives the beam selection related information from the radio access network (RAN). In other words, the terminal apparatus 200, as well as the base station 100, also obtains the beam selection related information.

Control Information of Physical layer or MAC layer

For example, the beam selection related information is included in the control information of the physical layer or the MAC layer to be transmitted to the terminal apparatus 200. In other words, the beam selection related information is transmitted in the control information. The terminal apparatus 200 (communication processing unit 231) receives the control information. For example, the control information is downlink control information (DCI), a MAC control element, or information equivalent to these. In this way, for example, the terminal apparatus 200 can obtain the beam selection related information speedily. Hence, even with dynamic modification of a beam, the terminal apparatus 200 may respond to such beam modification.

Specifically, for example, the beam selection related information is the beam identification information (identification information for identifying a beam to be used for the radio communication), and the base station 100 performs the beam selection (selection of a beam to be used for the radio communication). In this case, the base station 100 (first communication processing unit 141) generates the beam identification information according to the beam selection and transmits, to the terminal apparatus 200, the control information (control information of the physical layer or the MAC layer) including the beam identification information.

RRC Message

The beam selection related information may be included in a radio resource control (RRC) message. In other words, the beam selection related information may be transmitted in the RRC message. For example, the RRC message may be an RRC connection reconfiguration message.

Specifically, the beam selection related information may be the beam identification information, and the base station 100 may perform the beam selection. In this case, the base station 100 (first communication processing unit 141) may generate the beam identification information according to the beam selection and transmit, to the terminal apparatus 200, the RRC message including the beam identification information.

Alternatively, the beam selection related information may be the beam counter. In this case, the base station 100 (first communication processing unit 141) may transmit, to the terminal apparatus 200, the RRC message including the beam counter (e.g., the initial value). To prevent the beam counter (e.g., the initial value) from being maliciously changed by a third party, the RRC message may be a message with protected integrity. As an example, the RRC message may be an RRC connection reconfiguration message to be used after a security mode command procedure at the time when the terminal apparatus 200 changes from an idle state to a connected state.

Second Example: Reception from Terminal Apparatus

The beam selection related information may be transmitted from the terminal apparatus 200. In other words, the terminal apparatus 200 (communication processing unit 231) may transmit the beam selection related information to the RAN. Through this operation, the base station 100 (information obtaining unit 145) may obtain the beam selection related information.

Control Information of Physical Layer or MAC Layer

The beam selection related information may be included in the control information of the physical layer or the MAC layer to be transmitted from the terminal apparatus 200. In other words, the terminal apparatus 200 (communication processing unit 231) may transmit the control information including the beam selection related information to the RAN. For example, the control information may be uplink control information (UCI), a MAC control element, or information equivalent to these. In this way, for example, the base station 100 may obtain the beam selection related information speedily. Hence, the beam can be dynamically modified.

Specifically, the beam selection related information may be the beam identification information (identification information for identifying a beam to be used for the radio communication), and the terminal apparatus 200 may perform the beam selection (selection of a beam to be used for the radio communication). In this case, the terminal apparatus 200 (communication processing unit 231) may generate the beam identification information according to the beam selection and transmit, to the base station 100, the control information (control information of the physical layer or the MAC layer) including the beam identification information.

RRC Message

The beam selection related information may be included in the RRC message. In other words, the beam selection related information may be transmitted in the RRC message.

Specifically, the beam selection related information may be the beam identification information, and the terminal apparatus 200 may perform the beam selection. In this case, the terminal apparatus 200 (communication processing unit 231) may generate the beam identification information according to the beam selection and transmit, to the base station 100, an RRC message including the beam identification information (e.g., a measurement report message).

Alternatively, the beam selection related information may be the beam counter. In this case, the terminal apparatus 200 (communication processing unit 231) may transmit, to the base station 100, the RRC message including the beam counter (e.g., the initial value).

As described above, the beam selection related information is transmitted to the terminal apparatus 200 or is transmitted from the terminal apparatus 200. Through this operation, for example, the base station 100 and the terminal apparatus 200 can obtain the beam selection related information and generate the same security key.

(4) Generation of Security Key

As described above, the base station 100 (key generating unit 147) generates a security key for the radio communication, based on the beam selection related information.

(4-1) Input for Generation

For example, the base station 100 (key generating unit 147) generates the security key by using the beam selection related information as an input.

Alternatively, for example, the base station 100 (key generating unit 147) generates the security key by using another key as an input.

Note that the base station 100 (key generating unit 147) may further use, as an input, information other than the beam selection related information and such another key.

(4-2) Example of Security Key

First Example: Encryption Key for User Plane

For example, the security key is an encryption key for encryption of the user plane. Specifically, the security key is, for example, $K_{UPenc}$.

For example, the base station 100 (key generating unit 147) generates the security key, based further on an upper key (key for the base station) of the security key. For example, the upper key is $K_{eNB}$. For example, the upper key is provided by the core network node 300 (e.g., the MME) or is provided by the source base station of a handover to the base station 100 (target base station). As an example, the upper key is included in an INITIAL CONTEXT SETUP REQUEST message from the core network node 300 (e.g., the MME) or a HANDOVER REQUEST message from the source base station.

Figure 12:
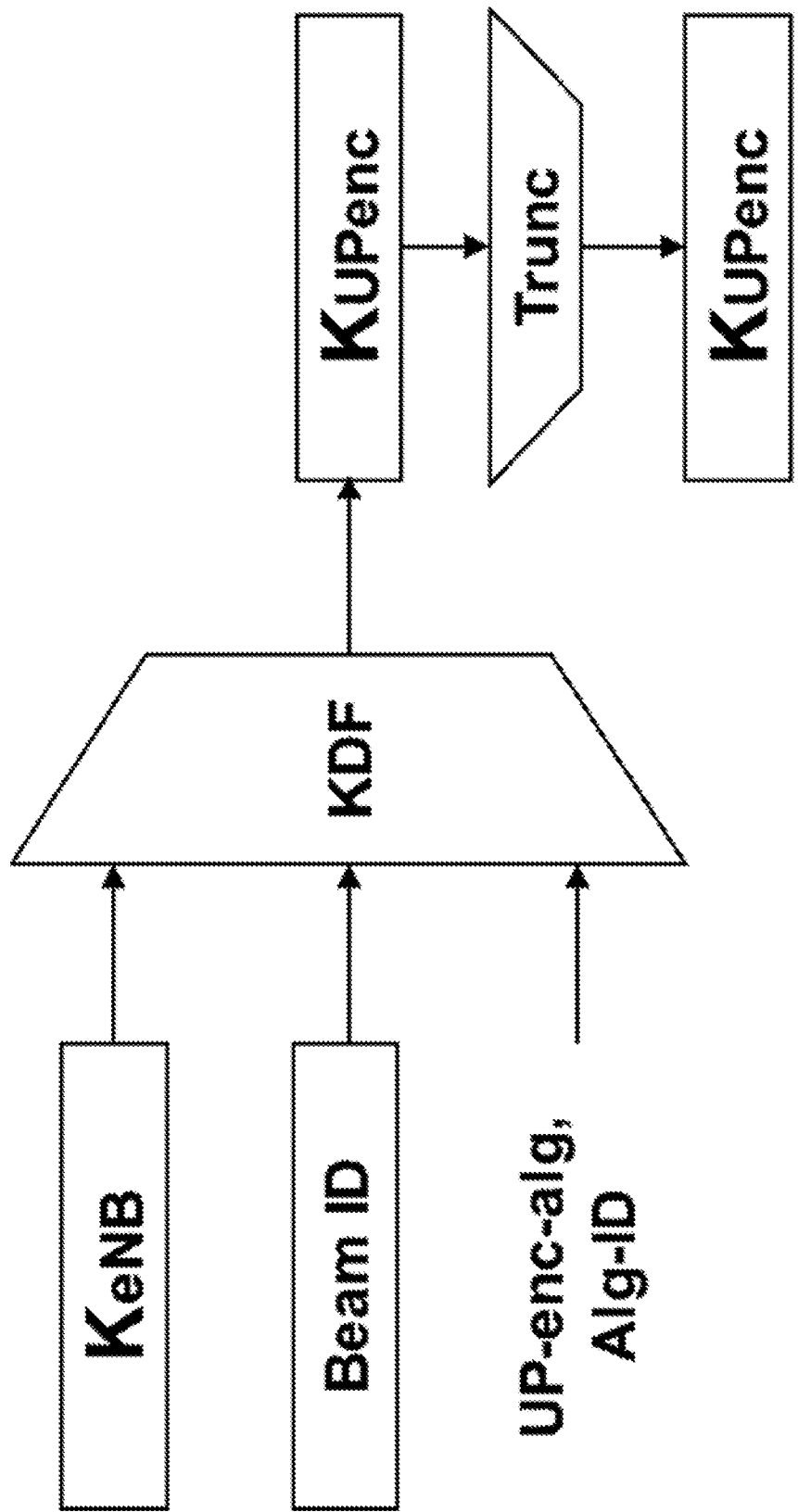
FIG. 12 is an explanatory diagram for describing a first example of security key generation based on beam selection related information in the first example embodiment.

FIG. 12 is an explanatory diagram for describing a first example of security key generation based on beam selection related information in the first example embodiment. With reference to FIG. 12, an encryption key $K_{UPenc}$ for the user plane is generated through a key derivation function (KDF) by using $K_{eNB}$, the beam ID, UP-enc-alg, and Alg-ID as inputs. UP-enc-alg is information indicating a user plane encryption algorithm as a type of algorithm, and Alg-ID is an ID of the algorithm (this applies also to other drawings). The KDF is an algorithm similar to the algorithm described in 3GPP TS33.401 V13.3.0 (Annex A A.7) and/or 3GPP TS33.220 V13.1.0 (Annex B), for example. Further, $K_{UPenc}$ is truncated, so that the length of $K_{UPenc}$ becomes 128 bits from 256 bits, for example. Specifically, the higher-order 128 bits of 256 bits of $K_{UPenc}$ are extracted, and the 128 bits result in final $K_{UPenc}$.

In the example in FIG. 12, a beam ID is used as an input of the KDF. However, a beam counter may be used as an input of the KDF instead of a beam ID. Alternatively, beam selection related information other than a beam ID and a beam counter may be used as an input of the KDF.

Note that the base station 100 (key generating unit 147) may also generate an encryption key for encryption of the control plane (e.g., $K_{RRCenc}$) and/or a key for integrity protection for the control plane (e.g., $K_{RRCint}$), based on the beam selection related information. In this case, the security key may be such a key.

Second Example: Key for Key Generation

The security key may be a key to be used for key generation. The key generation may be generation of an encryption key for encryption of the user plane. Specifically, the security key may be $K_{eNB}$ or $K_{eNBbeam}$, and the encryption key may be $K_{UPenc}$.

The base station 100 (key generation unit 147) may generate a new security key, based further on a current security key.

Figure 13:
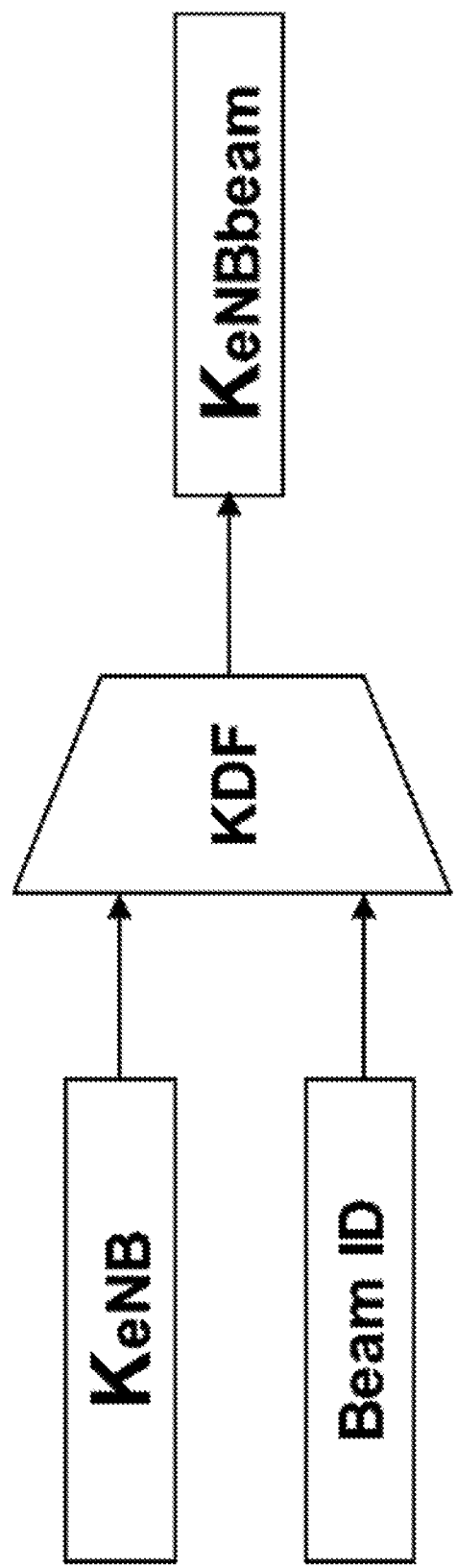
FIG. 13 is an explanatory diagram for describing a second example of the security key generation based on beam selection related information in the first example embodiment.

FIG. 13 is an explanatory diagram for describing a second example of the security key generation based on beam selection related information in the first example embodiment. With reference to FIG. 13, $K_{eNBbeam}$ is generated through the KDF by using the current $K_{eNB}$ and the beam ID as inputs. The KDF is an algorithm similar to the algorithm described in 3GPP TS 33.220 V13.1.0 (Annex B), for example. For example, $K_{eNBbeam}$ thereafter serves as new $K_{eNB}$. Alternatively, $K_{eNBbeam}$ may exist as an independent key different from $K_{eNB}$.

Figure 14:
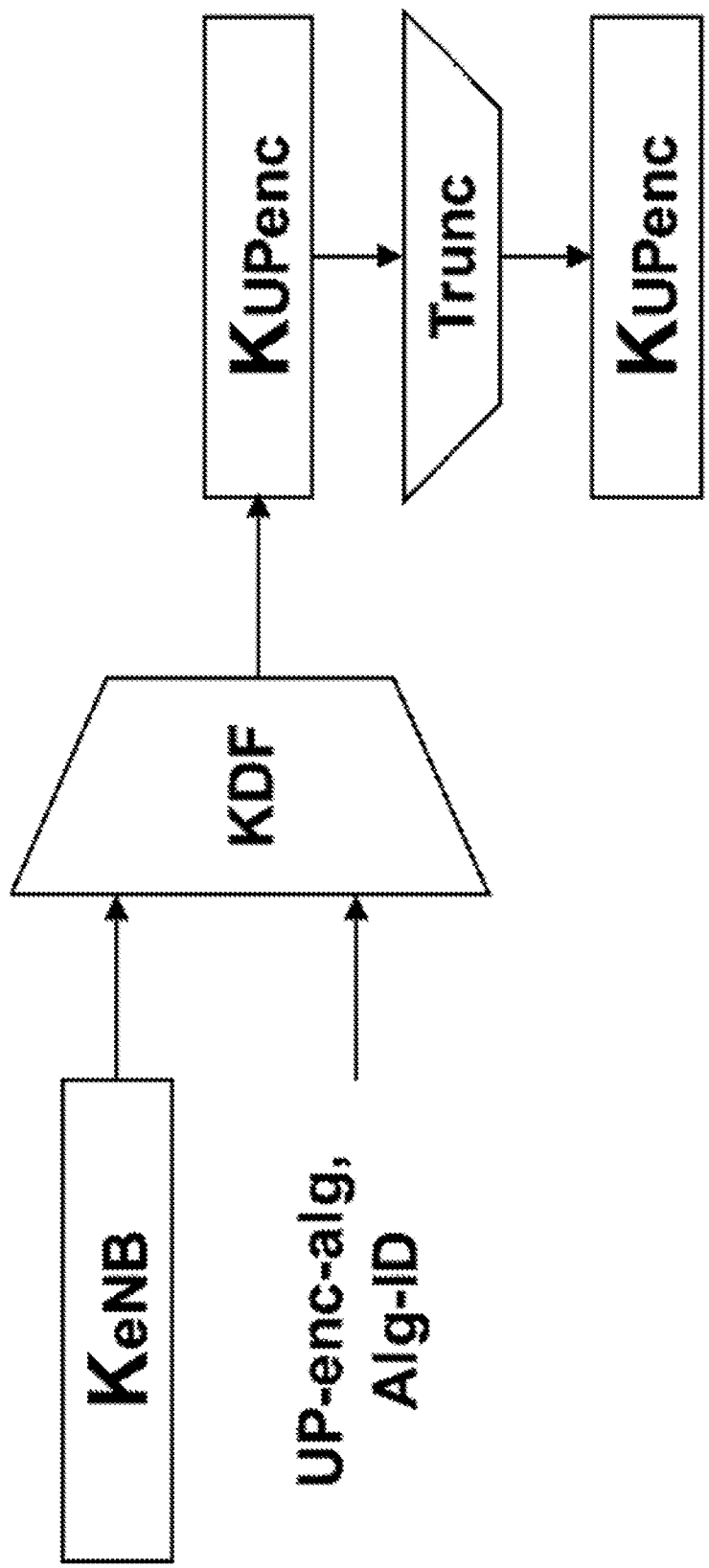
FIG. 14 is an explanatory diagram for describing an example of key generation using a security key in the first example embodiment.

FIG. 14 is an explanatory diagram for describing an example of key generation using a security key in the first example embodiment. According to FIG. 14, the encryption key $K_{UPenc}$ for the user plane is generated through the KDF by using $K_{eNB}$, UP-enc-alg, and Alg-ID as inputs. The KDF is the same algorithm as the algorithm described in 3GPP TS 33.401 V13.3.0 (Annex A A.7) and/or 3GPP TS 33.220

V13.1.0 (Annex B), for example. Further, $K_{UPenc}$ is truncated, so that the length of $K_{UPenc}$ becomes 128 bits from 256 bits, for example. Specifically, the higher-order 128 bits of 256 bits of $K_{UPenc}$ are extracted, and the 128 bits result in final $K_{UPenc}$. Note that, in a case that $K_{eNBbeam}$ in the example in FIG. 13 exists as an independent key instead of serving as new $K_{eNB}$, $K_{eNBbeam}$ may be used as an input, instead of $K_{eNB}$, in the example in FIG. 14.

In the example in FIG. 13, a beam ID is used as an input of the KDF. However, a beam counter may be used as an input of the KDF instead of a beam ID. Alternatively, beam selection related information other than a beam ID and a beam counter may be used as an input of the KDF.

Note that the security key (e.g., new $K_{eNB}$ or $K_{eNBbeam}$ independent of $K_{eNB}$) may also be used for generation of the encryption key for encryption of the control plane (e.g., $K_{RRCenc}$) and/or the key for integrity protection for the control plane (e.g., $K_{RRCint}$). In this case, the key generation may be generation of such a key.

(4-3) Timing for Generation of Security Key

For example, the base station 100 (key generating unit 147) generates the security key, based on the beam selection related information at the time of beam selection. The base station 100 (key generating unit 147) may generate the security key, based on the beam selection related information at every beam selection.

As described above, the base station 100 generates the security key, based on the beam selection related information. Through this operation, security enhancement can be achieved in a case of employing beamforming, for example. More specifically, for example, even if the cell or the base station serving the terminal apparatus does not change for a long time as a result of beamforming, a new security key is generated (security key is changed) at the time of beam selection (at the time when the beam is modified), which makes it more difficult to decrypt the security key. Hence, security enhancement can be achieved.

(5) Radio Communication with Terminal Apparatus, Using Security Key

For example, the base station 100 (first communication processing unit 141) performs radio communication with the terminal apparatus 200 by using the security key.

For example, as described above, the security key is an encryption key for encryption of a user plane (e.g., $K_{UPenc}$), and the base station 100 (first communication processing unit 141) performs radio communication with the terminal apparatus 200 by using the security key. More specifically, for example, the base station 100 (first communication processing unit 141) encrypts (ciphers) downlink data (e.g., in the PDCP layer) by using the encryption key (e.g., $K_{UPenc}$) and transmits the encrypted downlink data to the terminal apparatus 200. In addition, for example, the base station 100 (first communication processing unit 141) decrypts (deciphers) received uplink data (e.g., in the PDCP layer) by using the encryption key (e.g., $K_{UPenc}$).

Alternatively, as described above, the security key may be a key ($K_{eNB}$ or $K_{eNBbeam}$) to be used for generation of an encryption key for encryption of a user plane (e.g., $K_{UPenc}$), and the base station 100 (first communication processing unit 141) performs radio communication with the terminal apparatus 200 by using the key. More specifically, for example, the base station using the key (e.g., $K_{eNB}$ or $K_{eNBbeam}$) and performs radio communication with the terminal apparatus 200 by using the encryption key. A description of the subsequent operations is the same as that in the above-described example.

Figure 15:
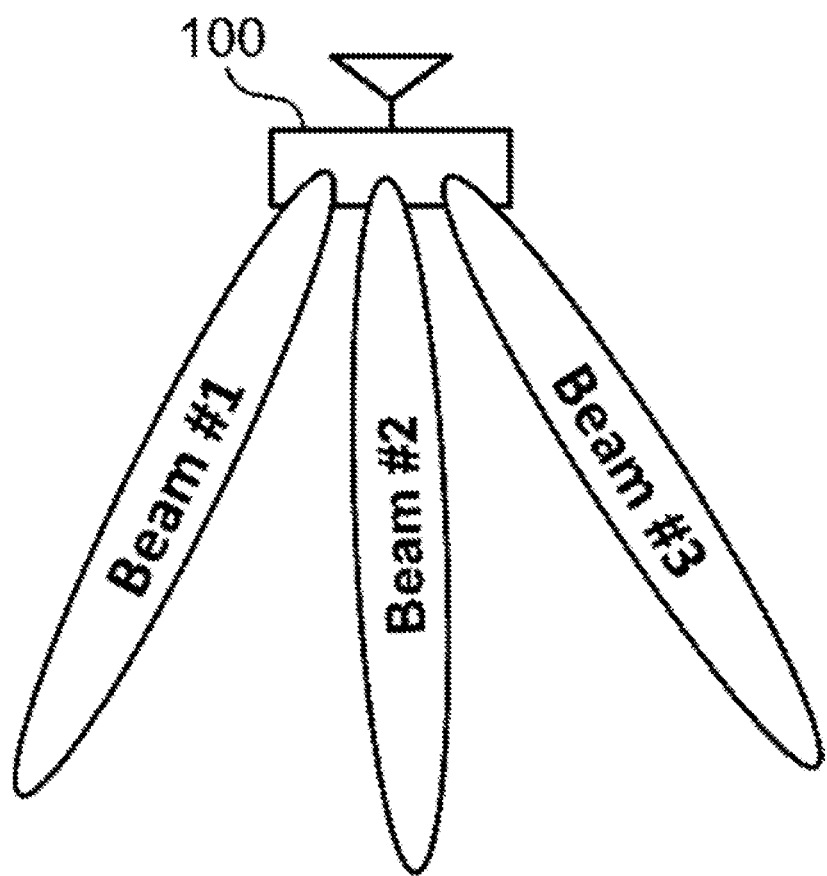
FIG. 15 is an explanatory diagram for describing an example of use of a beam in the first example embodiment.

For example, the base station 100 uses a beam for radio communication with the terminal apparatus 200 as illustrated in FIG. 15. For example, a new beam is selected in response to move of the terminal apparatus 200, and a security key is generated. The base station 100 then performs radio communication with the terminal apparatus 200 by using the beam and the security key.

Note that, although the radio communication using the security key includes radio communication of both downlink and uplink as described above, for example, the first example embodiment is not limited to this example. The radio communication using the security key may be radio communication of only one of downlink and uplink.

(6) Operations of Terminal Apparatus

The terminal apparatus 200 (information obtaining unit 233) obtains the beam selection related information. The terminal apparatus 200 (key generating unit 235) then generates a security key for radio communication with the base station 100, based on the beam selection related information. The security key is the same as the security key generated by the base station 100. The terminal apparatus 200 (communication processing unit 231) thereafter performs radio communication with the base station 100 by using the security key.

Generation of Security Key

A security key generation method is the same as the generation technique in the base station 100.

Note that the terminal apparatus 200 (key generating unit 235) itself, different from the base station 100, generates an upper key (key for a base station) (e.g., $K_{eNB}$). For example, the terminal apparatus 200 generates the upper key, based on a key stored in a subscriber identity module (SIM) card.

Radio Communication with Base Station, Using Security Key

For example, as described above, the security key is an encryption key for encryption of a user plane (e.g., $K_{UPenc}$), and the terminal apparatus 200 (communication processing unit 231) performs radio communication with the base station 100 by using the encryption key. More specifically, for example, the terminal apparatus 200 (communication processing unit 231) encrypts uplink data (e.g., in the PDCP layer) by using the encryption key (e.g., $K_{UPenc}$) and transmits the encrypted uplink data to the base station 100. In addition, for example, the terminal apparatus 200 (communication processing unit 231) decrypts received downlink data (e.g., in the PDCP layer) by using the encryption key (e.g., $K_{UPenc}$).

Alternatively, as described above, the security key may be a key ($K_{eNB}$ or $K_{eNBbeam}$) to be used for generation of an encryption key for encryption of a user plane (e.g., $K_{UPenc}$), and the terminal apparatus 200 (communication processing unit 231) may perform radio communication with the base station 100 by using the key. More specifically, for example, the terminal apparatus 200 (communication processing unit 231) generates the encryption key (e.g., $K_{UPenc}$) by using the key (e.g., $K_{eNB}$ or $K_{eNBbeam}$) and performs radio communication with the base station 100 by using the encryption key. A description of the subsequent operations is the same as that in the above-described example.

Reception/Transmission of Beam Selection Related Information

As described above, for example, the terminal apparatus 200 (communication processing unit 231) receives the beam selection related information from the RAN.

Alternatively, as described above, the terminal apparatus 200 (communication processing unit 231) may transmit the beam selection related information to the RAN.

(7) Flow of Processing

First Example: Beam ID

Figure 16:
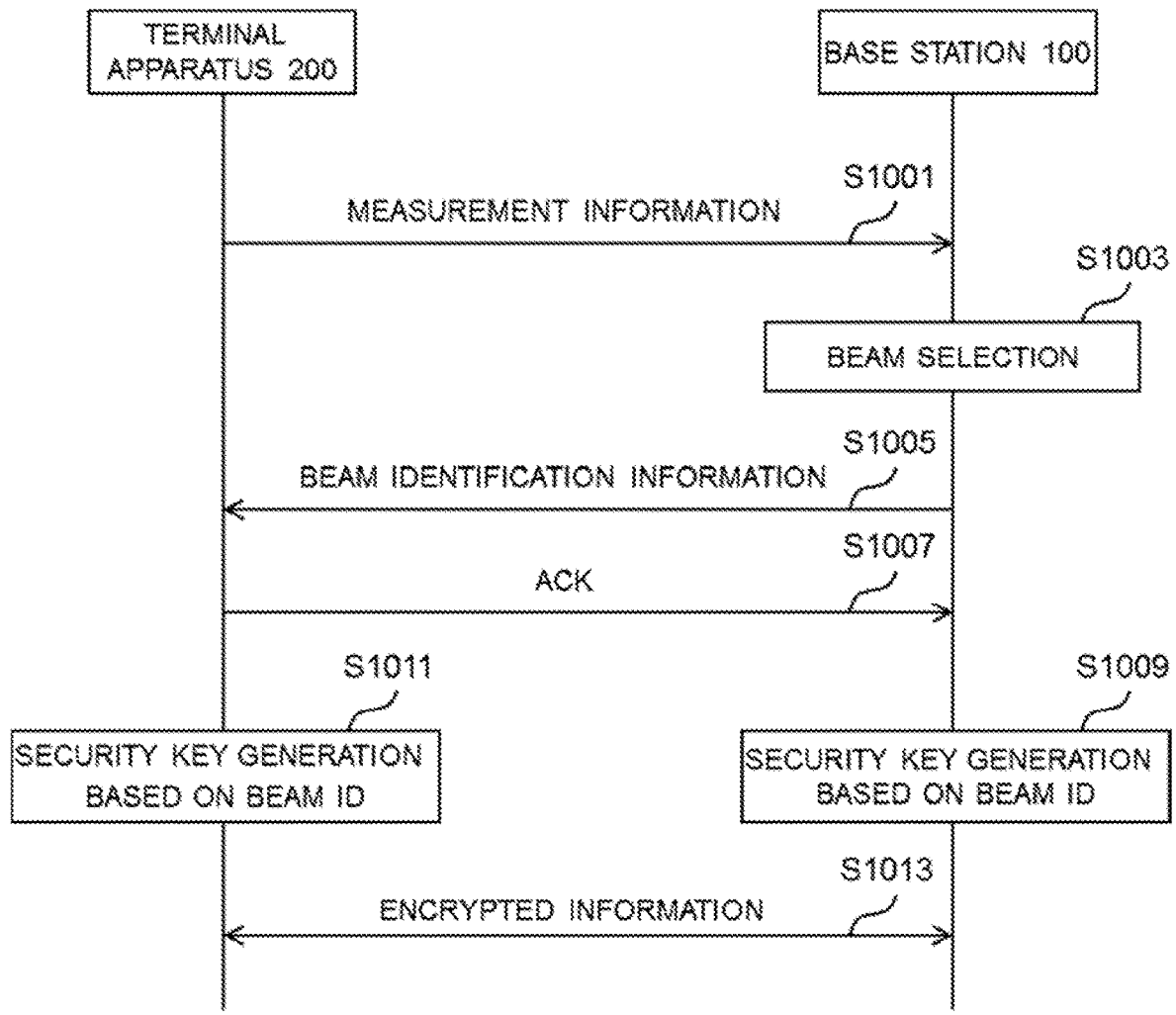
FIG. 16 is an explanatory diagram for describing a first example of a schematic flow of processing according to the first example embodiment.

FIG. 16 is an explanatory diagram for describing a first example of a schematic flow of processing according to the first example embodiment. In this example, the beam selection related information is beam identification information.

The terminal apparatus 200 transmits measurement information on the base station 100 to the base station 100, and the base station 100 receives the measurement information (S1001).

For example, the base station 100 selects, based on the measurement information, a beam to be used for radio communication between the base station 100 and the terminal apparatus 200 (S1003). For example, the base station 100 generates beam identification information for identifying the beam.

The base station 100 transmits the beam identification information to the terminal apparatus 200 (S1005). For example, the base station 100 transmits the control information of the physical layer or the MAC layer to the terminal apparatus 200, and the control information includes the beam identification information. The terminal apparatus 200 receives the control information (the beam identification information) and transmits acknowledgement (ACK) to the base station 100 (S1007). For example, the terminal apparatus 200 transmits the control information of the physical layer or the MAC layer to the base station 100, and the control information includes the acknowledgement (ACK).

The base station 100 obtains the beam identification information and generates a security key for radio communication with the terminal apparatus 200, based on the beam identification information (S1009).

The terminal apparatus 200 also obtains the beam identification information and generates a security key for radio communication with the base station 100, based on the beam identification information (S1011).

The base station 100 and the terminal apparatus 200 thereafter perform radio communication by using the security key (S1013).

Second Example: Counter

Figure 17:
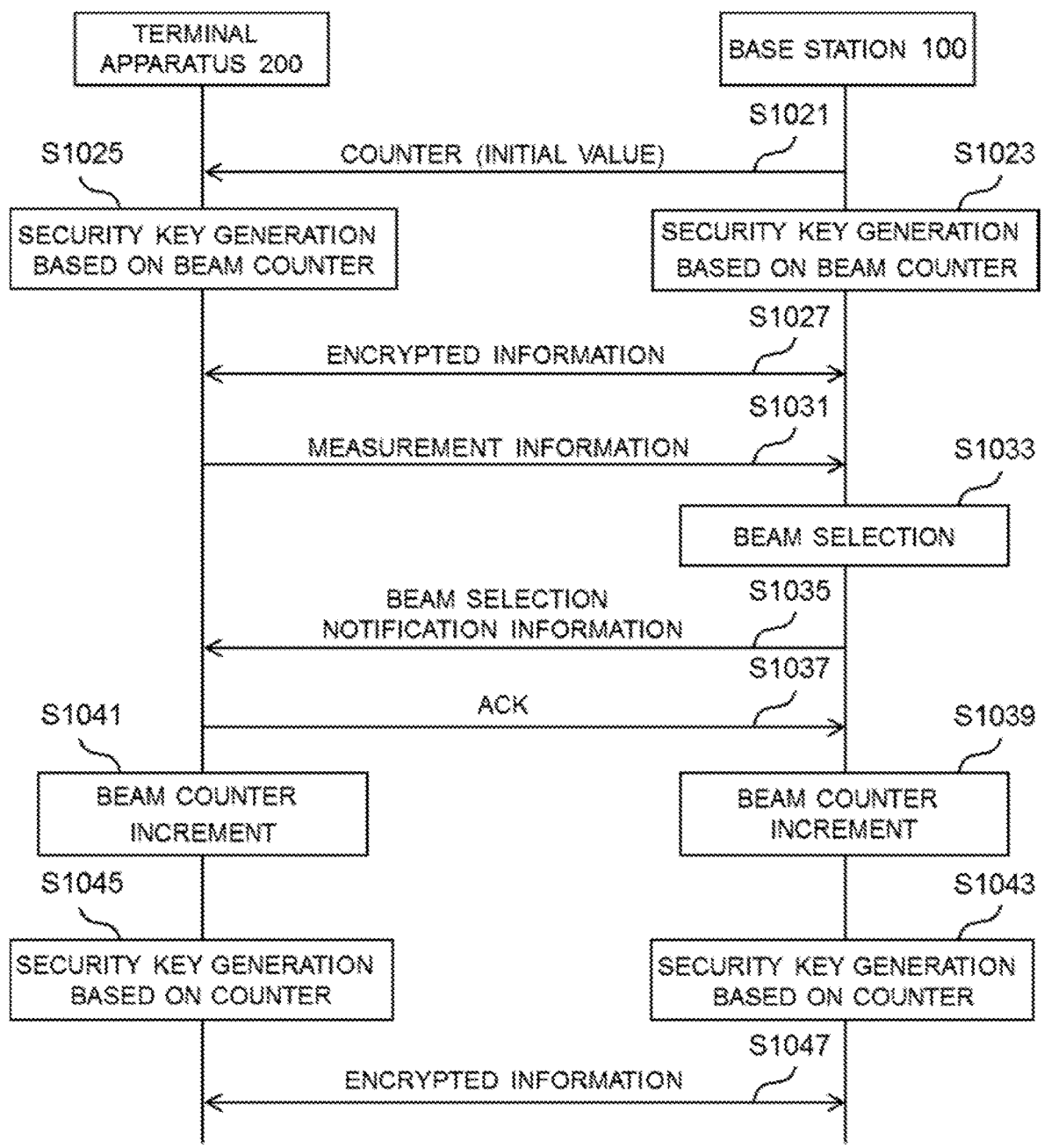
FIG. 17 is an explanatory diagram for describing a second example of a schematic flow of processing according to the first example embodiment.

FIG. 17 is an explanatory diagram for describing a second example of a schematic flow of processing according to the first example embodiment. In this example, the beam selection related information is a beam counter.

The base station 100 transmits an initial value of the beam counter to the terminal apparatus 200 (S1021). For example, the base station 100 transmits an RRC message (e.g., an RRC connection reconfiguration message) including the initial value to the terminal apparatus 200.

The base station 100 obtains the beam counter (initial value) and generates a security key for radio communication with the terminal apparatus 200, based on the beam counter (initial value) (S1023).

The terminal apparatus 200 also obtains the beam counter (initial value) and generates a security key for radio communication with the base station 100, based on the beam counter (initial value) (S1025).

The terminal apparatus 200 transmits measurement information on the base station 100 to the base station 100, and the base station 100 receives the measurement information (S1031).

For example, the base station 100 selects, based on the measurement information, a beam to be used for radio communication between the base station 100 and the terminal apparatus 200 (S1033).

The base station 100 transmits information for notifying beam selection (beam selection notification information) to the terminal apparatus 200 (S1035). For example, the base station 100 transmits the control information of the physical layer or the MAC layer to the terminal apparatus 200, and the control information includes the beam selection notification information.

The terminal apparatus 200 receives the beam selection notification information and transmits acknowledgement (ACK) to the base station 100 (S1037). For example, the terminal apparatus 200 transmits the control information of the physical layer or the MAC layer to the base station 100, and the control information includes the acknowledgement (ACK).

The base station 100 increments the beam counter of the base station 100 (S1039), and the terminal apparatus 200 also increments the beam counter of the terminal apparatus 200 (S1041).

The base station 100 obtains the beam counter of the base station 100 and generates a security key for radio communication with the terminal apparatus 200, based on the beam counter (S1043).

The terminal apparatus 200 obtains the beam counter of the terminal apparatus 200 and generates a security key for radio communication with the base station 100, based on the beam counter (S1045).

The base station 100 and the terminal apparatus 200 thereafter perform radio communication by using the security key (S1047).

The first example embodiment has been described above. According to example alterations of the first example embodiment, it is possible to achieve security enhancement in the case of employing beamforming.

4. Example Alterations of First Example Embodiment

Next, with reference to FIG. 18 to FIG. 47, example alterations of the first example embodiment will be described. Note that the description of the above-described first example embodiment is apparently also applicable to the example alteration.

<4.1. First Example Alteration>

First, with reference to FIG. 18 to FIG. 25, a first example alteration of the first example embodiment will be described.

In the first example alteration, at the time of a handover of a terminal apparatus, a source base station of the handover generates a security key for radio communication between a target base station of the handover and the terminal apparatus, based on beam selection related information.

(1) Configuration of System

Figure 18:
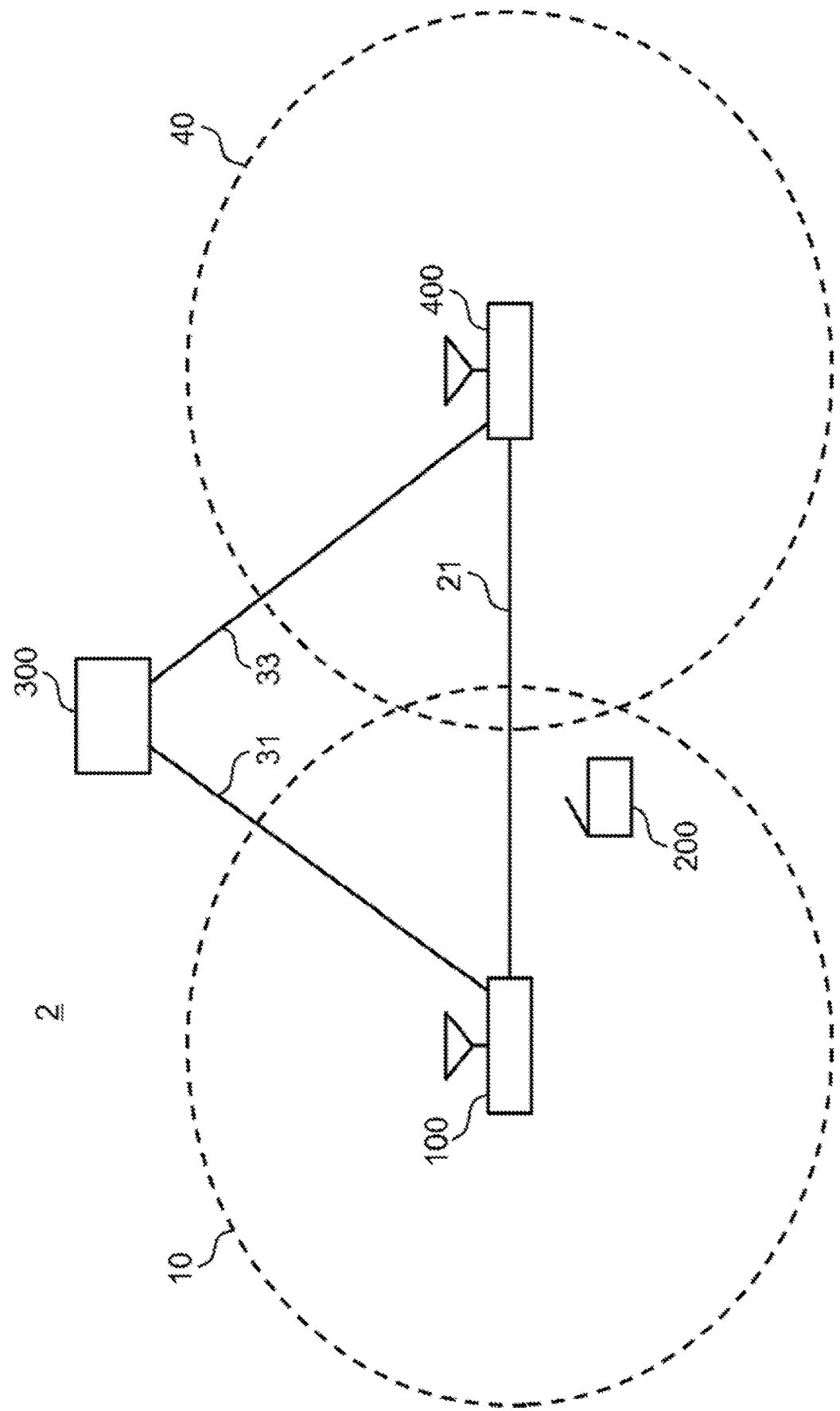
FIG. 18 is an explanatory diagram illustrating an example of a schematic configuration of a system according to a first example alteration.

FIG. 18 is an explanatory diagram illustrating an example of a schematic configuration of a system 2 according to a first example alteration of the first example embodiment. According to FIG. 18, the system 2 further includes a base station 400 in addition to the base station 100, the terminal apparatus 200, and the core network node 300.

The base station 400 performs radio communication with a terminal apparatus located in a cell 40 (or coverage area 40). In addition, the base station 400 communicates with the core network node 300 via an interface 33 (e.g., an S1 interface). Moreover, the base station 400 communicates with the base station 100 via an interface 21 (e.g., an X2 interface). For example, the base station 400 operates similarly to the base station 100.

The base station 400 is a node that performs radio communication with a terminal apparatus, in other words, a RAN node. A description of this respect is the same as the description of the base station 100 and is hence omitted here.

In particular, in the first example alteration, a handover of the terminal apparatus 200 from the base station 100 to the base station 400 is performed. In other words, the base station 100 is a source base station of the handover, and the base station 400 is a target base station of the handover.

(2) Configuration of Base Station 400

Figure 19:
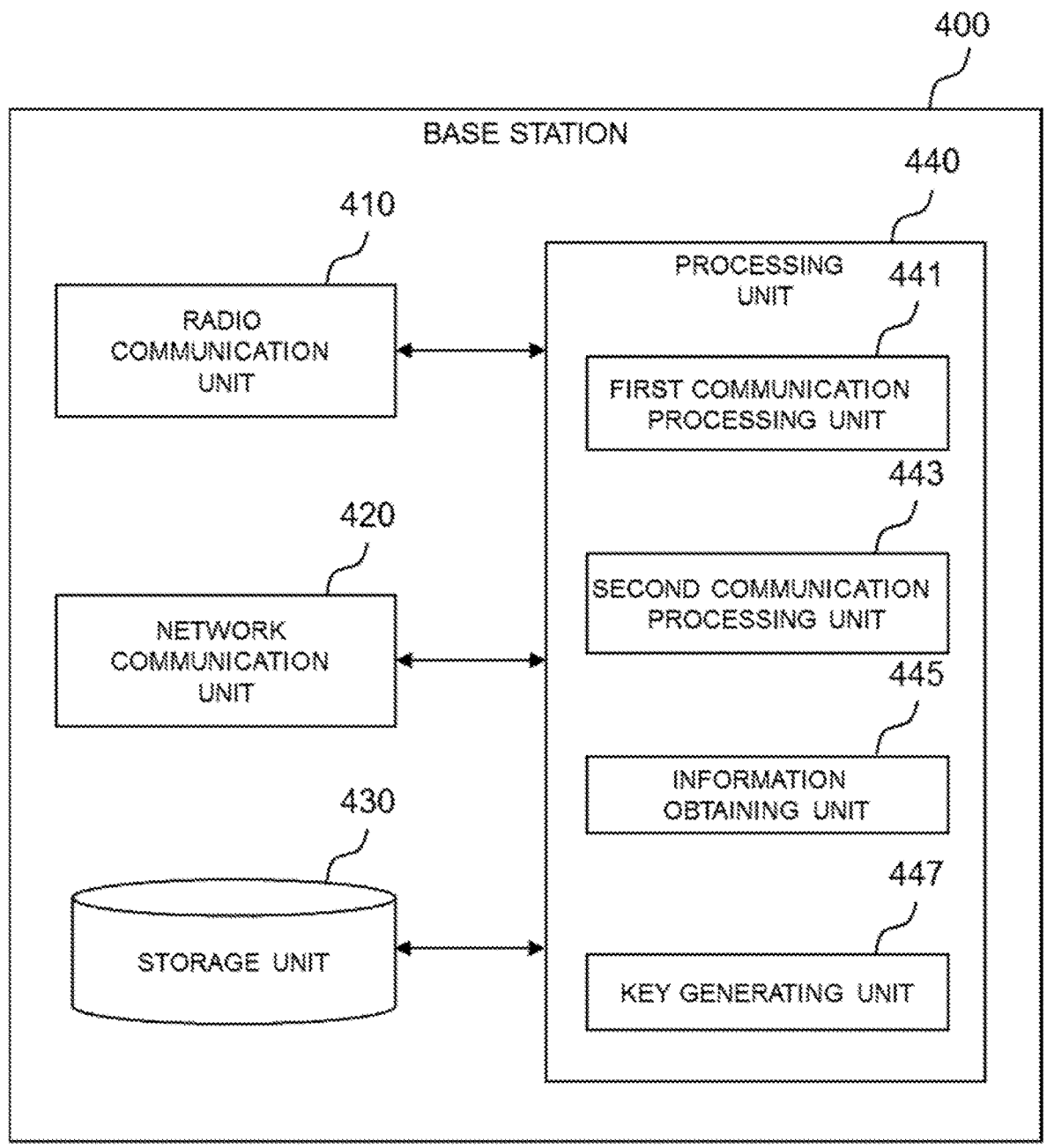
FIG. 19 is a block diagram illustrating an example of a schematic configuration of a base station according to the first example alteration.

FIG. 19 is a block diagram illustrating an example of a schematic configuration of the base station 400 according to the first example alteration of the first example embodiment. According to FIG. 19, the base station 400 includes a radio communication unit 410, a network communication unit 420, a storage unit 430, and a processing unit 440. The processing unit 440 includes a first communication processing unit 441, a second communication processing unit 443, an information obtaining unit 445, and a key generating unit 447.

A description of the base station 400 is the same as the description of the base station 100 in <3.2. Configuration of Base Station> except for a difference in reference signs. Hence, overlapping descriptions are omitted here.

(3) Technical Features

As described above, the base station 100 (key generating unit 147) generates a security key for radio communication between a base station and the terminal apparatus 200, based on the beam selection related information (information related to beam selection).

(3-1) Base Station/Radio Communication

In the first example alteration, a handover of the terminal apparatus 200 from the base station 100 (source base station) to the base station 400 (target base station) is performed, and the base station is, for example, the base station 400 (target base station of the handover of the terminal apparatus 200). In other words, the base station 100 (key generating unit 147) generates a security key for radio communication between the base station 400 and the terminal apparatus 200.

(3-2) Beam Selection

For example, the base station 400 (first communication processing unit 441) performs the beam selection. Specifically, for example, the base station 100 (second communication processing unit 143) transmits measurement information on the base station 400 (measurement information received from the terminal apparatus 200) to the base station 400. As an example, the base station 100 (second communication processing unit 143) transmits a HANDOVER REQUEST message including the measurement information to the base station 400. The base station 400 (first communication processing unit 441) selects, based on the measurement information, a beam to be used for radio communication between the base station 400 and the terminal apparatus 200.

Alternatively, the base station 100 (first communication processing unit 141) or the terminal apparatus 200 (communication processing unit 231) may perform the beam selection.

(3-3) Beam Selection Related Information

Case of Beam Identification Information

For example, the beam selection related information is the beam identification information.

As described above, for example, the base station 400 (first communication processing unit 441) performs the beam selection. The base station 400 (second communication processing unit 443) then transmits beam identification information to the base station 100. As an example, the base station 400 (second communication processing unit 443) transmits a HANDOVER REQUEST ACKNOWLEDGE message including the beam identification information to the base station 100. For example, as illustrated in FIG. 20, the HANDOVER REQUEST ACKNOWLEDGE message includes a beam ID (beam identification information). For example, as illustrated in FIG. 21, the beam ID is any one of 0 to 255.

For example, the base station 100 (first communication processing unit 141) transmits the beam identification information to the terminal apparatus 200. Specifically, for example, the base station 100 (first communication processing unit 141) transmits an RRC message (e.g., an RRC connection reconfiguration message) including the beam identification information to the terminal apparatus 200.

Note that, in a case that the terminal apparatus 200, instead of the base station 400 (and the base station 100), performs the beam selection, the terminal apparatus 200 (communication processing unit 231) may transmit the beam identification information to the base station 100.

Case of Beam Counter

The beam selection related information may be the beam counter.

The beam counter may be transmitted from a source base station to a target base station at the time of a handover to be used successively. In this case, the beam counter (to be used for generation of the security key) may be a current beam counter of the base station 100.

Alternatively, the beam counter may be returned to an initial value at the time of a handover. In this case, the beam counter (to be used for generation of the security key) may be an initial value of the beam counter.

(3-4) Generation of Security Key

Input for Generation

For example, the base station 100 (key generating unit 147) generates the security key (security key for radio communication between the base station 400 and the terminal apparatus 200), by using, as an input, a key for radio communication between the base station 100 and the terminal apparatus 200 (e.g., $K_{eNB}$) in addition to the beam selection related information.

Alternatively, the base station 100 (key generating unit 147) may generate the security key by using, as an input, another key (e.g., next hop (NH)) provided by the core network node 300 instead of the above key (e.g., $K_{eNB}$).

For example, the base station 100 (key generating unit 147) generates the security key by using another information as an additional input. Such another information is, for example, a frequency channel number and a physical cell ID (PCI) of a target cell (cell 40 of the base station 400) of the handover. The frequency channel number is, as an example, an E-UTRAN absolute radio frequency channel number (EARFCN).

Example of Security Key

For example, the security key is a key to be used for key generation by the base station 400. The key generation is generation of an encryption key for encryption of the user plane. Specifically, for example, the security key is $K_{eNB}*$ ($K_{eNB}$ star), and the encryption key is $K_{UPenc}$. For example, the base station 100 (key generating unit 147) generates $K_{eNB}*$ through a mechanism defined in TS 33.401 (A.5) and/or 3GPP TS 33.220.

Figure 22:
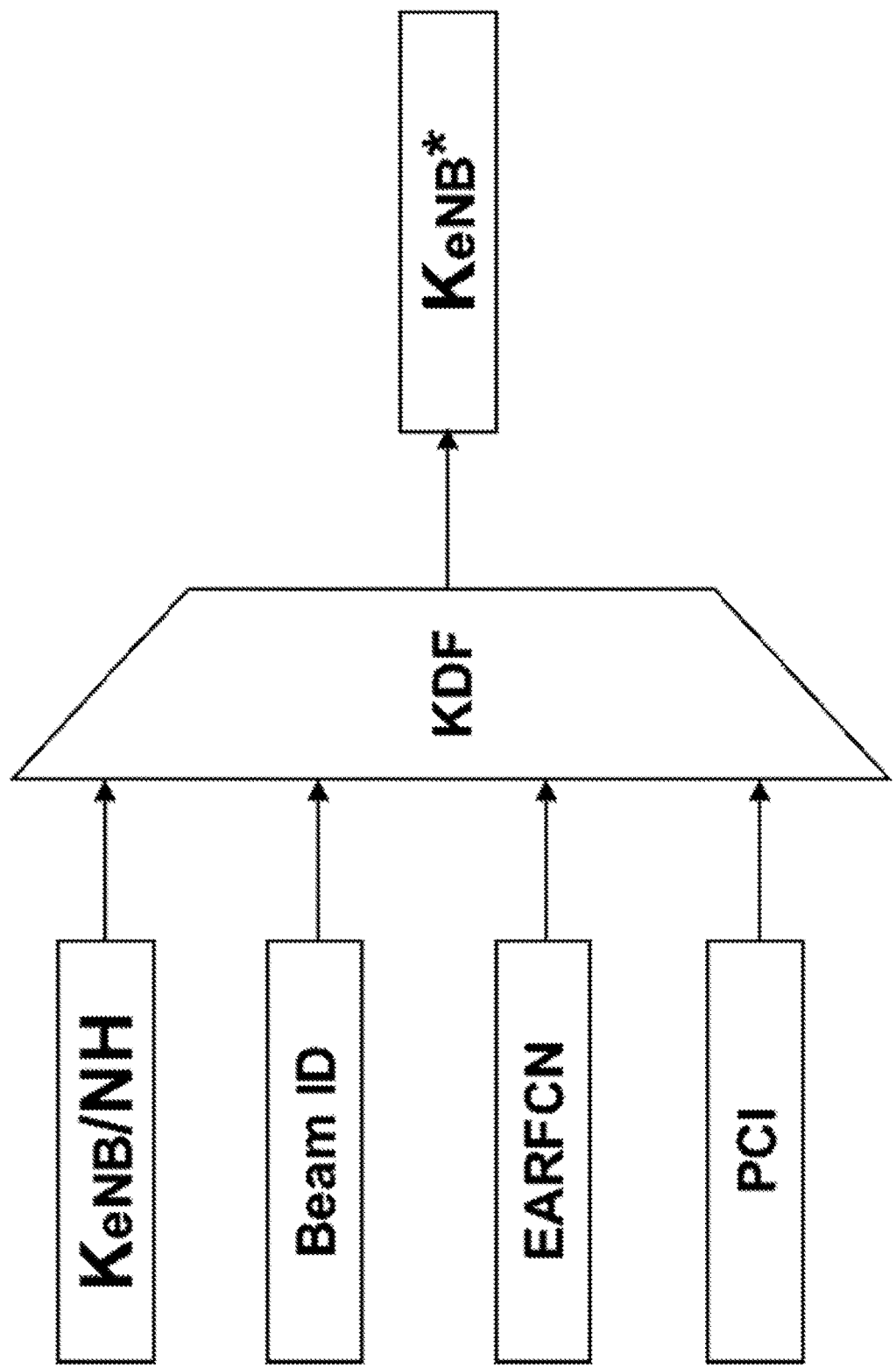
FIG. 22 is an explanatory diagram for describing a first example of security key generation based on beam selection related information in the first example alteration.

FIG. 22 is an explanatory diagram for describing a first example of security key generation based on beam selection related information in the first example alteration. According to FIG. 22, $K_{eNB}*$ is generated through the KDF by using $K_{eNB}$, the beam ID, the ERFCN, and the PCI as inputs. The KDF is an algorithm similar to the algorithm described in 3GPP TS 33.401 V13.3.0 (Annex A A.5) and/or 3GPP TS 33.220 V13.1.0 (Annex B), for example.

In the example in FIG. 22, a beam ID is used as an input of the KDF. However, a beam counter may be used as an input of the KDF instead of a beam ID. Alternatively, beam selection related information other than a beam ID and a beam counter may be used as an input of the KDF.

(3-5) Transmission of Security Key

For example, the base station 100 (second communication processing unit 143) transmits the security key to the base station 400, and the base station 400 (second communication processing unit 443) receives the security key.

As described above, the base station 100 is the source base station of the handover of the terminal apparatus 200, and the base station 400 is the target base station of the handover. The base station 100 (second communication processing unit 143) transmits, to the base station 400, a message including the security key in a handover procedure of the handover. The message may be referred to as a SECURITY KEY UPDATE message, for example. For example, as illustrated in FIG. 23, the SECURITY KEY UPDATE message includes AS security information, and the AS security information includes $K_{eNB}^*$, for example, as illustrated in FIG. 24.

(3-6) Operations of Target Base Station

The base station 400 (information obtaining unit 445) obtains the security key. The base station 400 (first communication processing unit 441) then performs radio communication with the terminal apparatus 200 by using the security key. For example, the base station 400 (information obtaining unit 445, first communication processing unit 441) obtains $K_{eNB}^*$ and performs radio communication with the terminal apparatus 200 by using $K_{eNB}^*$ as $K_{eNB}$.

For example, the base station 400 (first communication processing unit 441) generates an encryption key for encryption of a user plane by using the security key and performs radio communication with the terminal apparatus 200 by using the encryption key. For example, the base station 400 (first communication processing unit 441) generates $K_{UPenc}$ by using $K_{eNB}$ similarly to the example in FIG. 14 and performs radio communication with the terminal apparatus 200 by using $K_{UPenc}$.

For example, the base station 400 (first communication processing unit 441) also generates an encryption key for encryption of a control plane (e.g., $K_{RRCenc}$) and/or a key for integrity protection of the control plane (e.g., $K_{RRCint}$) by using the security key and performs radio communication with the terminal apparatus 200 by using such a key.

(3-7) Operations of Terminal Apparatus

The terminal apparatus 200 (key generating unit 235), like the base station 100, generates a security key for radio communication with the base station 400 (e.g., $K_{eNB}^*$), based on the beam selection related information. The terminal apparatus 200 (communication processing unit 231) then performs radio communication with the base station 400 by using the security key.

For example, the terminal apparatus 200 (key generating unit 235) generates $K_{eNB}^*$. The terminal apparatus 200 (communication processing unit 231) then generates $K_{UPenc}$ by using $K_{eNB}^*$ as $K_{eNB}$ and performs radio communication with the base station 400 by using $K_{UPenc}$.

(3-8) Others

The base station 400 (second communication processing unit 443) may transmit the beam selection related information to the core network node 300, and the core network node 300 (communication processing unit 331) may receive the beam selection related information. For example, the base station 400 (second communication processing unit 443) may transmit a PATH SWITCH REQUEST message including the beam selection related information to the core network node 300. For example, the PATH SWITCH REQUEST message may include a beam ID as in the example in FIG. 20.

The core network node 300 (information obtaining unit 333, key generating unit 335) may obtain the beam selection related information and generate a security key for radio communication between a base station and the terminal apparatus 200, based on the beam selection related information. For example, the security key may be a NH.

Furthermore, the core network node 300 (communication processing unit 331) may transmit the security key (e.g., a NH) to the base station 400. As an example, the core network node 300 (communication processing unit 331) may transmit a PATH SWITCH REQUEST ACKNOWLEDGE message including the security key (e.g., a NH) to the base station 400.

(3-9) Flow of Processing

Figure 25:
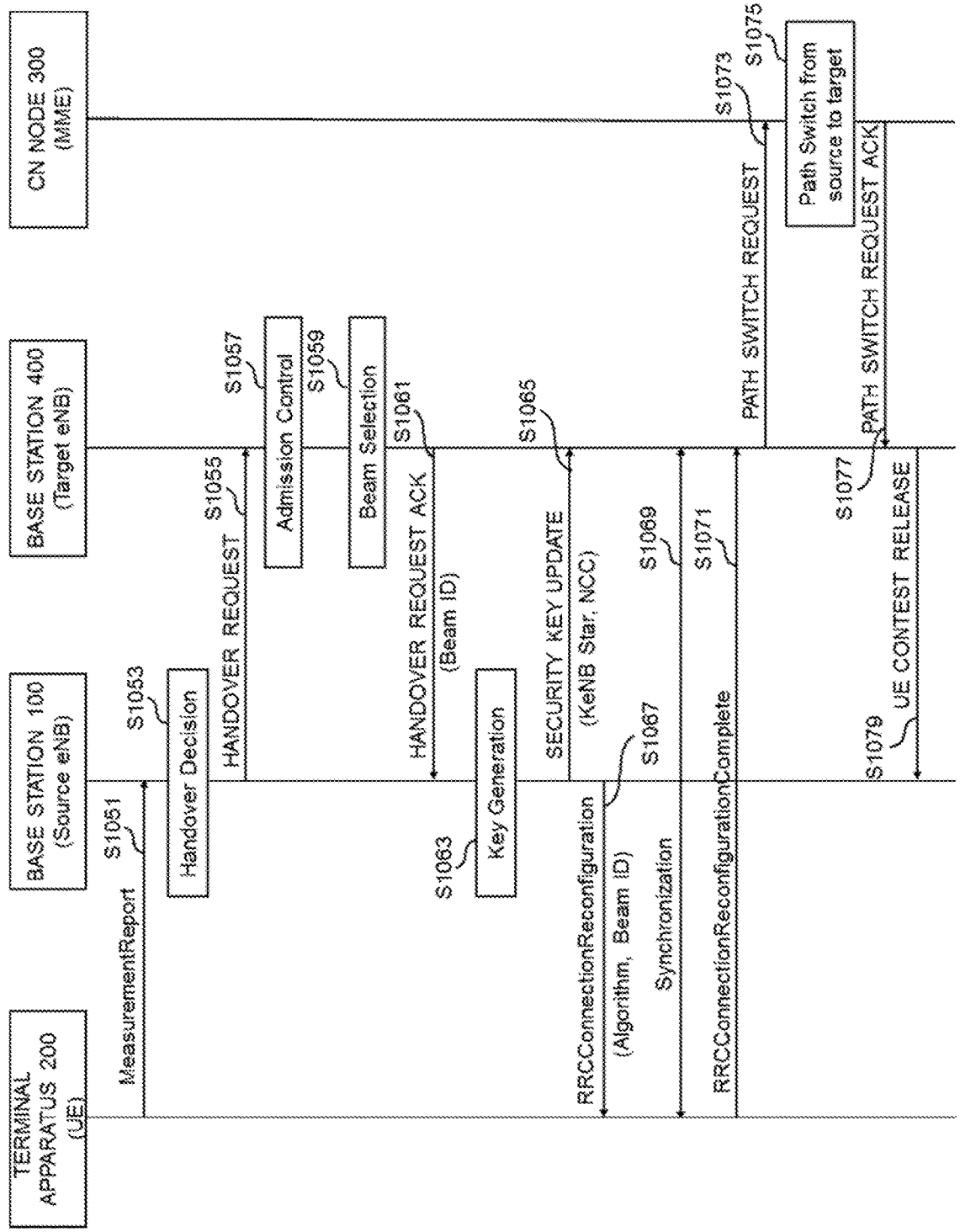
FIG. 25 is an explanatory diagram for describing an example of a schematic flow of processing according to the first example alteration.

FIG. 25 is an explanatory diagram for describing an example of a schematic flow of processing according to the first example alteration of the first example embodiment. In this example, the beam selection related information is beam ID identification information.

The terminal apparatus 200 transmits a measurement report on the base station 400 to the base station 100 (S1051).

For example, the base station 100 decides a handover of the terminal apparatus 200 from the base station 100 (source base station) to the base station 400 (target base station), based on the measurement report (S1053).

The base station 100 transmits a HANDOVER REQUEST message to the base station 400 (S1055). For example, the HANDOVER REQUEST message includes the measurement report on the base station 400.

The base station 400 performs admission control (S1057).

The base station 400 selects, based on the measurement report, a beam to be used for radio communication between the base station 400 and the terminal apparatus 200 (S1059).

The base station 400 transmits a HANDOVER REQUEST ACKNOWLEDGE message including a beam ID of the beam to the base station 100 (S1061).

The base station 100 generates a security key ($K_{eNB}^*$) for the radio communication between the base station 400 and the terminal apparatus 200, based on the beam ID (S1063).

The base station 100 transmits a security key update message including the security key to the base station 400 (S1065).

The base station 100 transmits an RRC connection reconfiguration message including the beam ID to the terminal apparatus 200 (S1067). The terminal apparatus 200 obtains the beam ID and generates a security key ($K_{eNB}^*$) for radio communication with the base station 400, based on the beam ID.

The terminal apparatus 200 synchronizes with the base station 400 (S1069) and transmits an RRC connection reconfiguration complete message to the base station 400 (S1071).

The base station 400 transmits a PATH SWITCH REQUEST message to the core network node 300 (S1073), and the core network node 300 performs path switch from the source to the target (S1075) and transmits the PATH SWITCH REQUEST ACKNOWLEDGE message to the base station 400 (S1077). Note that the PATH SWITCH REQUEST message may include the beam ID, and, in this case, the core network node 300 may generate a NH, based on the beam ID. The PATH SWITCH REQUEST ACKNOWLEDGE message may include the NH.

The base station 400 transmits a UE context release message to the base station 100 (S1079).

The first example alteration of the first example embodiment has been described above. Note that, although the description has been given of an example that the base station 100 is a source base station, the base station 100 may operate similarly to the base station 400 in a case that the base station 100 is a target base station. Although the description has been given of an example that the base station 400 is the target base station, the base station 400 may operate similarly to the base station 100 in a case that the base station 400 is a source base station.

<4.2. Second Example Alteration>

Next, a second example alteration of the first example embodiment will be described with reference to FIG. 26 to FIG. 31.

In the second example alteration, the secondary base station in dual connectivity generates a security key for radio communication between the secondary base station and a terminal apparatus, based on beam selection related information.

(1) Configuration of System

Figure 26:
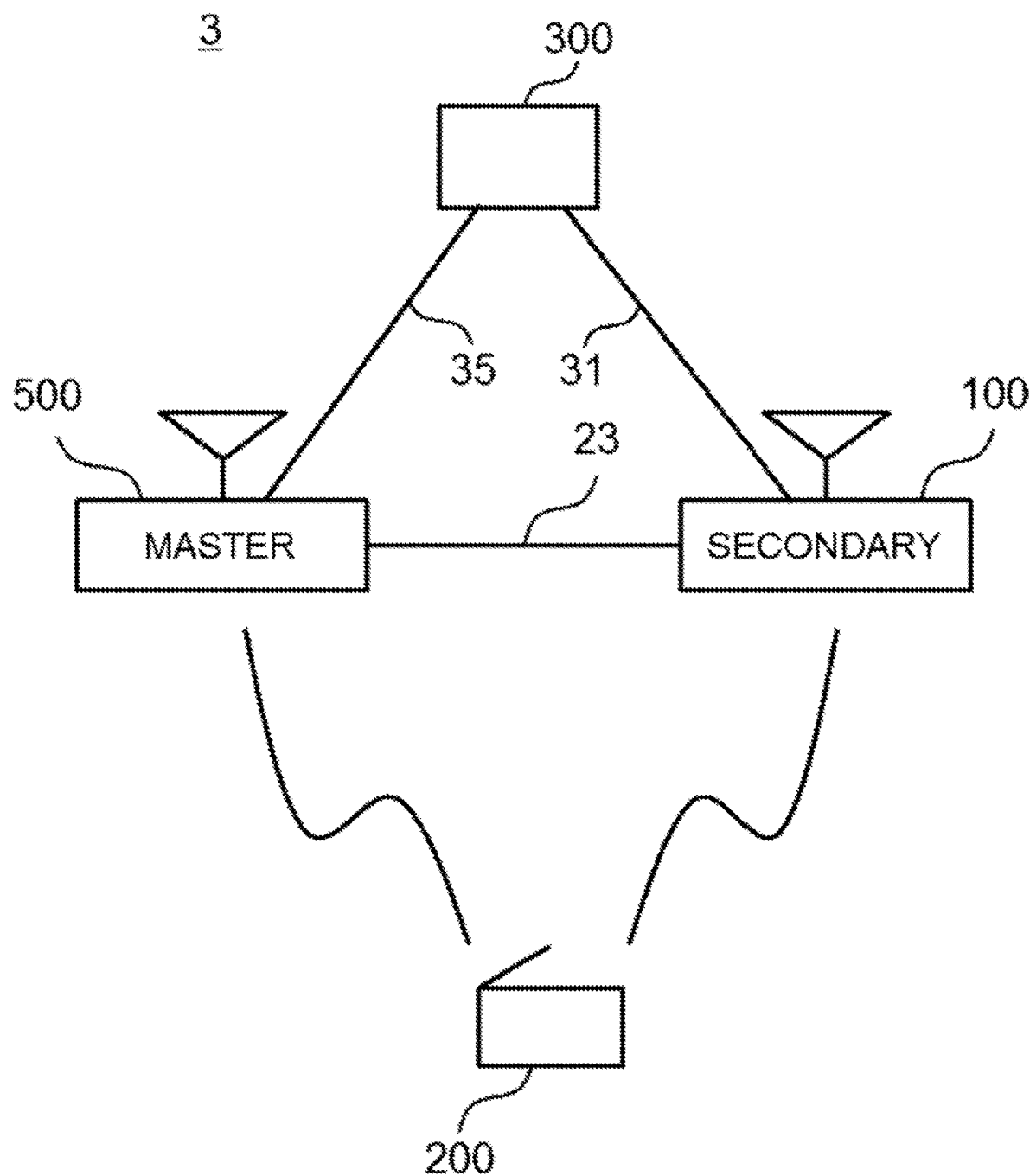
FIG. 26 is an explanatory diagram illustrating an example of a schematic configuration of a system according to a second example alteration.

FIG. 26 is an explanatory diagram illustrating an example of a schematic configuration of a system 3 according to the second example alteration of the first example embodiment. With reference to FIG. 26, the system 3 further includes a base station 500 in addition to the base station 100, the terminal apparatus 200, and the core network node 300.

In particular, in the second example alteration, the base station 500 is a master base station in dual connectivity of the terminal apparatus 200, and the base station 100 is a secondary base station in the dual connectivity. As an example, the base station 500 is a master evolved Node B (MeNB), and the base station 100 is a secondary evolved Node B (SeNB). The terminal apparatus 200 performs radio communication with both the base station 500 (master base station) and the base station 100 (secondary base station). Note that the master base station and the secondary base station may use the same radio access technology (RAT) or use different RATs (refer to <4.5. Others> to be described later, for example).

Figure 27:
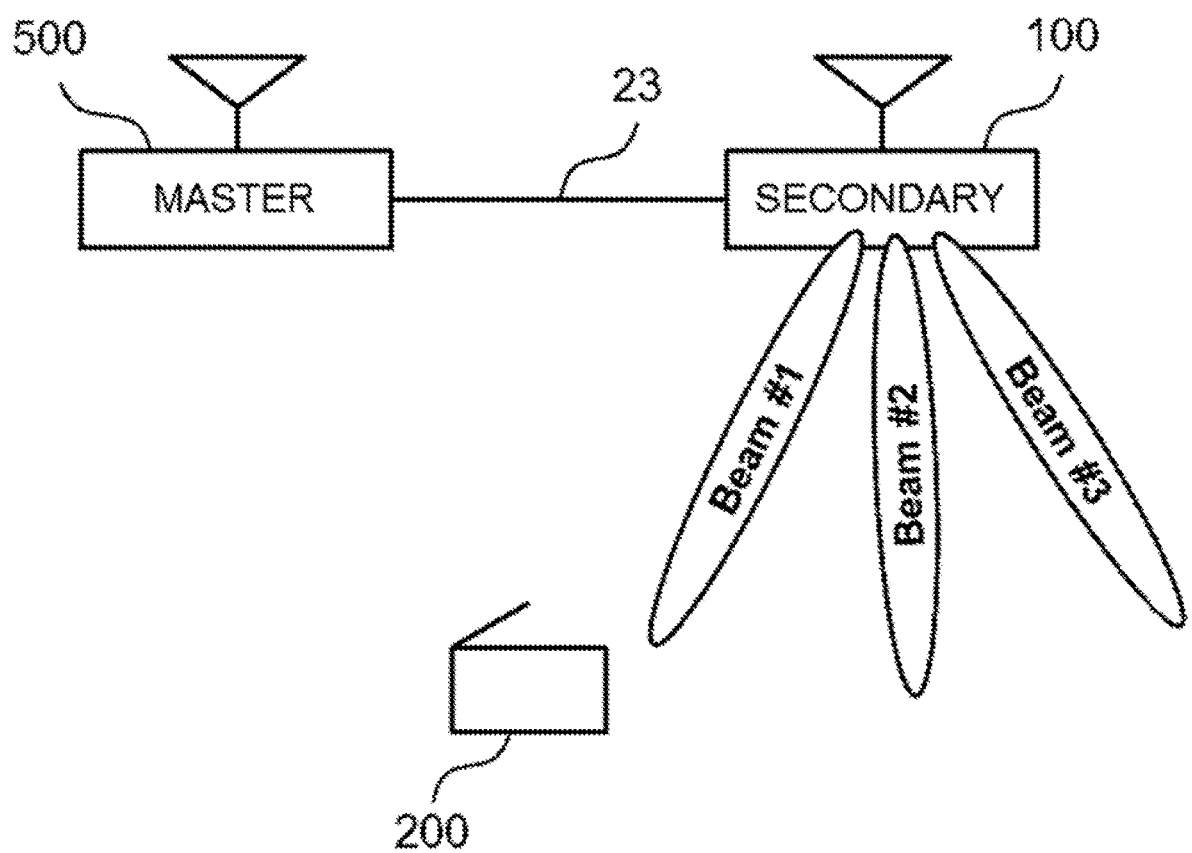
FIG. 27 is an explanatory diagram for describing an example of use of a beam in the second example alteration.

For example, the base station 100 (secondary base station) uses a beam for radio communication with the terminal apparatus 200 as illustrated in FIG. 27. For example, a beam is newly selected according to move of the terminal apparatus 200.

In the second example alteration, the base station 100 (secondary base station) uses, for example, a SCG bearer for radio communication with the terminal apparatus 200. Specifically, data transmitted from the base station 100 (secondary base station) to the terminal apparatus 200 is transmitted from a core network (e.g., a serving gateway (S-GW)) to the base station 100 (secondary base station) without passing through the base station 500 (master base station). Moreover, data transmitted from the terminal apparatus 200 to the base station 100 (secondary base station) is transmitted from the base station 100 to the core network (e.g., the serving gateway (S-GW)) without passing through the base station 500 (master base station).

The base station 500 communicates with the core network node 300 via an interface 35 (e.g., an S1 interface). Moreover, the base station 500 communicates with the base station 100 via an interface 23 (e.g., an X2 interface).

(2) Configuration of Base Station 500

Figure 28:
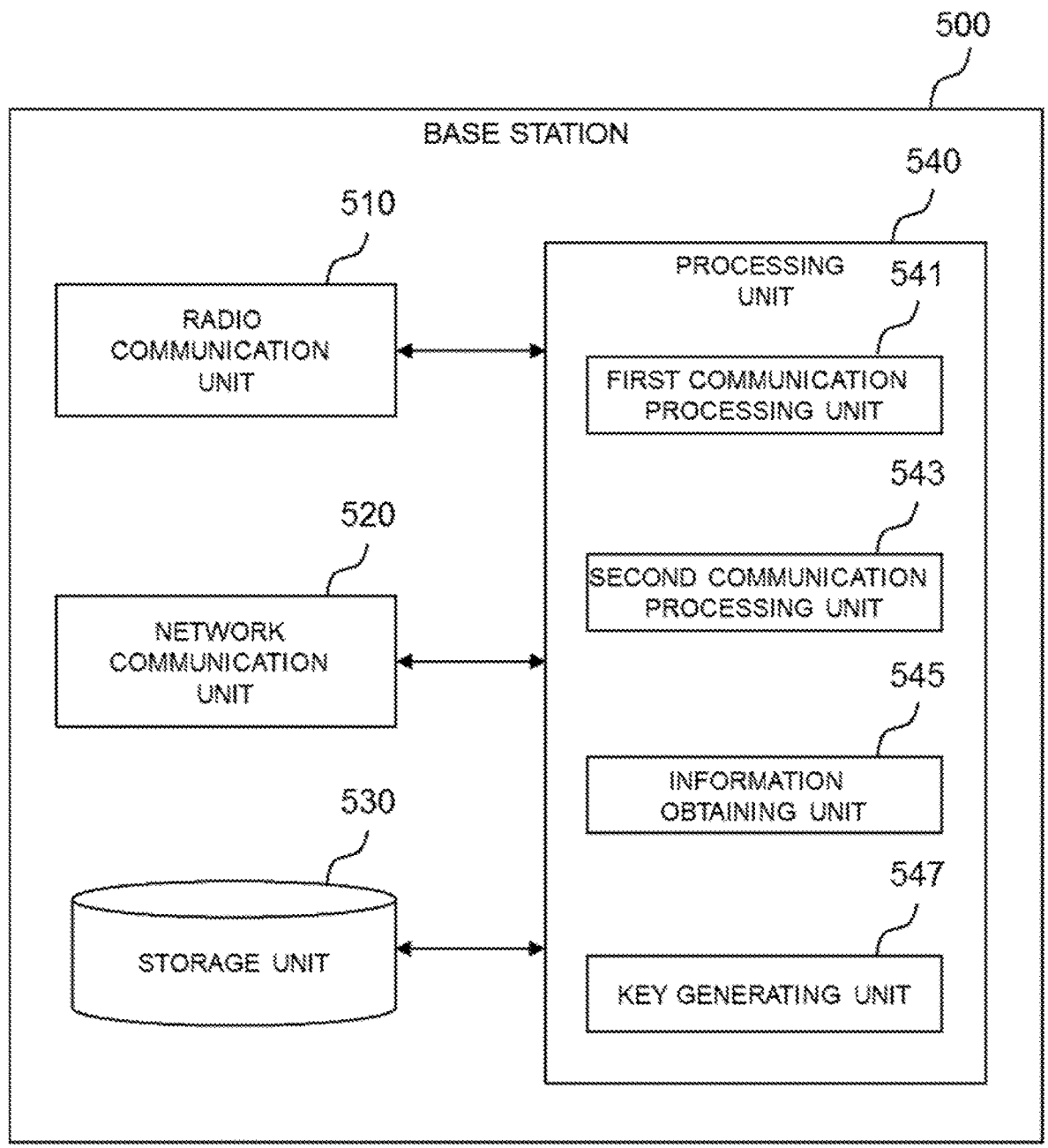
FIG. 28 is a block diagram illustrating an example of a schematic configuration of a base station according to the second example alteration.

FIG. 28 is a block diagram illustrating an example of a schematic configuration of the base station 500 according to the second example alteration of the first example embodiment. According to FIG. 28, the base station 500 includes a radio communication unit 510, a network communication unit 520, a storage unit 530, and a processing unit 540. The processing unit 540 includes a first communication processing unit 541, a second communication processing unit 543, an information obtaining unit 545, and a key generating unit 547.

A description of the base station 500 is the same as the description of the base station 100 in <3.2. Configuration of Base Station> except for a difference in reference signs. Hence, overlapping descriptions are omitted here.

(3) Technical Features

As described above, the base station 100 (key generating unit 147) generates a security key for radio communication between a base station and the terminal apparatus 200, based on the beam selection related information (information related to beam selection).

(3-1) Base Station/Radio Communication

In the second example alteration, the base station is the base station 100 (secondary base station in the dual connectivity). In other words, the base station 100 (key generating unit 147) generates a security key for radio communication between the base station 100 (secondary base station) and the terminal apparatus 200.

(3-2) Beam Selection

In the second example alteration, for example, the base station 100 (first communication processing unit 141) performs the beam selection.

Alternatively, the terminal apparatus 200 (communication processing unit 231) may perform the beam selection, or the base station 500 (first communication processing unit 541) may perform the beam selection.

(3-3) Beam Selection Related Information

Case of Beam Identification Information

For example, the beam selection related information is the beam identification information.

As described above, for example, the base station 100 (first communication processing unit 141) performs the beam selection. The base station 100 (first communication processing unit 141) then transmits the beam identification information to the terminal apparatus 200. For example, the base station 100 (first communication processing unit 141) transmits control information (control information of the physical layer or the MAC layer) including the beam identification information to the terminal apparatus 200.

Moreover, for example, at the time when the base station 100 is added as a secondary base station, the base station 500 (first communication processing unit 541), which is the master base station, transmits the beam identification information to the terminal apparatus 200. For example, the base station 500 (first communication processing unit 541) transmits an RRC message (e.g., an RRC connection reconfiguration message) including the beam identification information to the terminal apparatus 200. Note that, for example, the base station 100 (second communication processing unit 143) transmits the beam identification information to the base station 500. As an example, the base station 100 (second communication processing unit 143) transmits an addition request acknowledge message (e.g., an SENB ADDITION REQUEST ACKNOWLEDGE message) including the beam identification information to the base station 500. For example, the SENB ADDITION REQUEST ACKNOWLEDGE message includes a beam ID as in the example in FIG. 20.

Note that the base station 500 (first communication processing unit 541) may transmit beam identification information to the terminal apparatus 200 instead of the base station 100 (first communication processing unit 141) transmitting the control information including the beam identification information to the terminal apparatus 200. For example, the base station 500 (first communication processing unit 541) may transmit an RRC message (e.g., an RRC connection reconfiguration message) including the beam identification information to the terminal apparatus 200. Alternatively, the base station 500 (first communication processing unit 541) may transmit control information (control information of the physical layer or the MAC layer) including the beam identification information to the terminal apparatus 200. The base station 100 (second communication processing unit 143) may transmit the beam identification information to the terminal apparatus 500. As an example, the base station 100 (second communication processing unit 143) may transmit a message (e.g., an SENB MODIFICATION REQUIRED message) including the beam identification information to the base station 500. For example, the SENB MODIFICATION REQUIRED message may include a beam ID as in the example in FIG. 20.

Case of Beam Counter

The beam selection related information may be the beam counter.

Transmission and/or Reception of Beam Counter (Initial Value)

At the time when the base station 100 is added as a secondary base station, the base station 500 (first communication processing unit 541), which is a master base station, may transmit the beam counter (initial value) to the terminal apparatus 200. For example, the base station 500 (first communication processing unit 541) may transmit, to the terminal apparatus 200, the RRC message including the beam counter (initial value). The RRC message may include a SCG counter. To prevent the beam counter (e.g., the initial value) from being maliciously modified by a third party, the RRC message may be a message with protected integrity. As an example, the RRC message may be an RRC connection reconfiguration message to be used after a security mode command procedure at the time when the terminal apparatus 200 changes from an idle state to a connected state.

At the time when the base station 100 is added as a secondary base station, the base station 500 (second communication processing unit 543), which is a master base station, may transmit the beam counter (initial value) to the base station 100. For example, the base station 500 (second communication processing unit 543) may transmit an addition request message (e.g., an SENB ADDITION REQUEST message) including the beam counter (initial value) to the base station 100. The addition request message may further include a key for the secondary base station (e.g., S-K$_{eNB}$) to be used for generation of the security key.

For example, as described above, the beam counter is transmitted to the terminal apparatus 200 and the base station 100. However, the second example alteration is not limited to this example. For example, the base station 100 (second communication processing unit 143), which is a secondary base station, may transmit an addition request acknowledge message (e.g., an SENB ADDITION REQUEST ACKNOWLEDGE message) including information indicating application of beamforming, to the base station 500. The base station 500 (first communication processing unit 541) may then transmit, to the terminal apparatus 200, the RRC message including the beam counter (e.g., the initial value). Furthermore, the base station 500 (second communication processing unit 543) may transmit a MODIFICATION REQUEST message (e.g., an SENB MODIFICATION REQUEST message) including the beam counter (initial value) to the base station 100.

At Time when Beam Counter Reaches Upper Limit

At the time when the beam counter reaches an upper limit, the base station 100 (second communication processing unit 143) notifies the base station 500, and the base station 500 (key generating unit 547) may newly generate (i.e., refresh) a key for the secondary base station (e.g., S-K$_{eNB}$) to be used for generation of the security key. The base station 500 (second communication processing unit 543) may then transmit a MODIFICATION REQUEST message (e.g., an SENB MODIFICATION REQUEST message) including the key (e.g., S-K$_{eNB}$) and the initial value of the beam counter to the base station 100. Moreover, the base station 500 (first communication processing unit 541) may transmit an RRC connection reconfiguration message including the initial value of the beam counter to the terminal apparatus 200.

Alternatively, at the time when the beam counter reaches the upper limit, the base station 500 may discontinue the RRC connection with the terminal apparatus 200.

(3-4) Generation of Security Key

Input for Generation

For example, the base station 100 (key generating unit 147) generates the security key (security key for radio communication between the base station 100 and the terminal apparatus 200), by using, as an input, a key for the secondary base station (e.g., S-K$_{eNB}$) in addition to the beam selection related information. The key for the secondary base station is generated by the base station 500 (key generating unit 547), which is a master base station, and the key is transmitted from the base station 500 (second communication processing unit 543) to the base station 100.

Example of Security Key

For example, the security key is an encryption key for encrypting the user plane. Specifically, for example, the security key is K$_{UPenc}$. For example, the base station 100 (key generating unit 147) generates K$_{UPenc}$ through a mechanism defined in TS 33.401, Chapter A.7.

Figure 29:
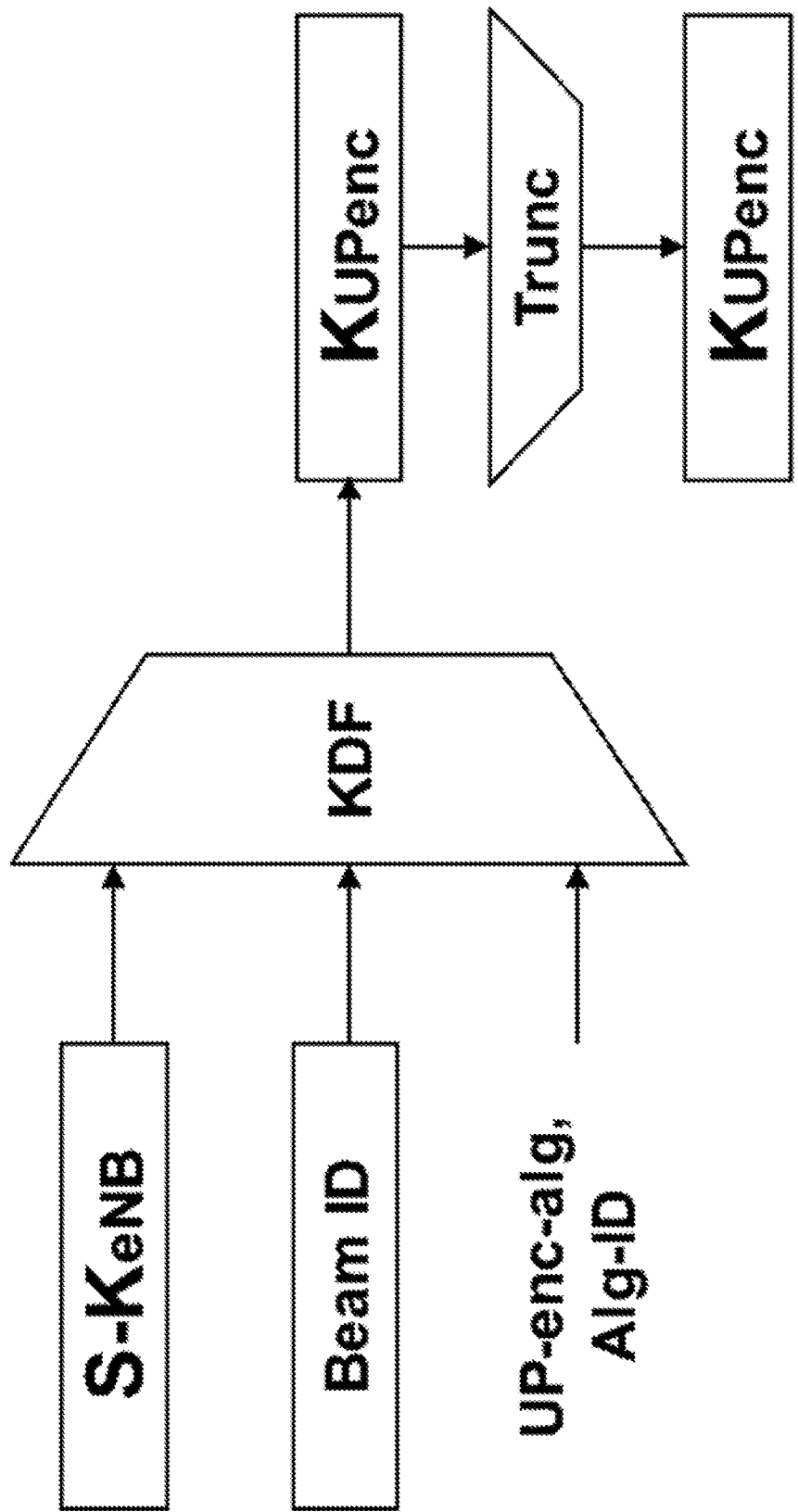
FIG. 29 is an explanatory diagram for describing an example of security key generation based on beam selection related information in the second example alteration.

FIG. 29 is an explanatory diagram for describing an example of security key generation based on beam selection related information in the second example alteration. According to FIG. 29, the encryption key K$_{UPenc}$ for the user plane is generated through the KDF by using S-K$_{eNB}$, a beam ID, UP-enc-alg, and Alg-ID as inputs. The KDF is an algorithm similar to the algorithm described in 3GPP TS 33.401 V13.3.0 (Annex A A.7) and/or 3GPP TS 33.220 V13.1.0 (Annex B), for example. Further, K$_{UPenc}$ is truncated, so that the length of K$_{UPenc}$ becomes 128 bits from 256 bits, for example. Specifically, the higher-order 128 bits of 256 bits of K$_{UPenc}$ are extracted, and the 128 bits result in final K$_{UPenc}$.

In the example in FIG. 29, a beam ID is used as an input of the KDF. However, a beam counter may be used as an input of the KDF instead of a beam ID. Alternatively, beam selection related information other than a beam ID and a beam counter may be used as an input of the KDF.

Note that the base station 100 (key generating unit 147) may also generate an encryption key for encryption of a control plane (e.g., K$_{RRCenc}$) and/or a key for integrity protection for a control plane (e.g., K$_{RRCint}$), based on the beam selection related information. In this case, the security key may be such a key.

(3-5) Radio Communication with Terminal Apparatus, Using Security Key

For example, the base station 100 (first communication processing unit 141) performs radio communication with the terminal apparatus 200 by using the security key.

For example, as described above, the security key is an encryption key for encryption of a user plane (e.g., $K_{UPenc}$), and the base station 100 (first communication processing unit 141) performs radio communication with the terminal apparatus 200 by using the security key. More concrete operations are as described above as the example of the first example embodiment, and overlapping descriptions are omitted here.

Note that, also in the second example alteration, the radio communication using the security key may include radio communication of both downlink and uplink or may be radio communication of only one of downlink and uplink.

(3-6) Operations of Terminal Apparatus

The terminal apparatus 200 (key generating unit 235), like the base station 100, generates a security key (e.g., $K_{UPenc}$) for radio communication with the base station 100, based on the beam selection related information. The terminal apparatus 200 (communication processing unit 231) then performs radio communication with the base station 400 by using the security key (e.g., $K_{UPenc}$).

(3-7) Flow of Processing

First Example

For example, the beam selection related information is the beam identification information, and the base station 100 and the terminal apparatus 200 perform similar processing to that in the example in FIG. 16.

Note that, in Step S1001, measurement information may be transmitted from the terminal apparatus 200 to the base station 500 (master base station) and transmitted from the base station 500 (master base station) to the base station 100 (secondary base station).

Second Example

Figure 30:
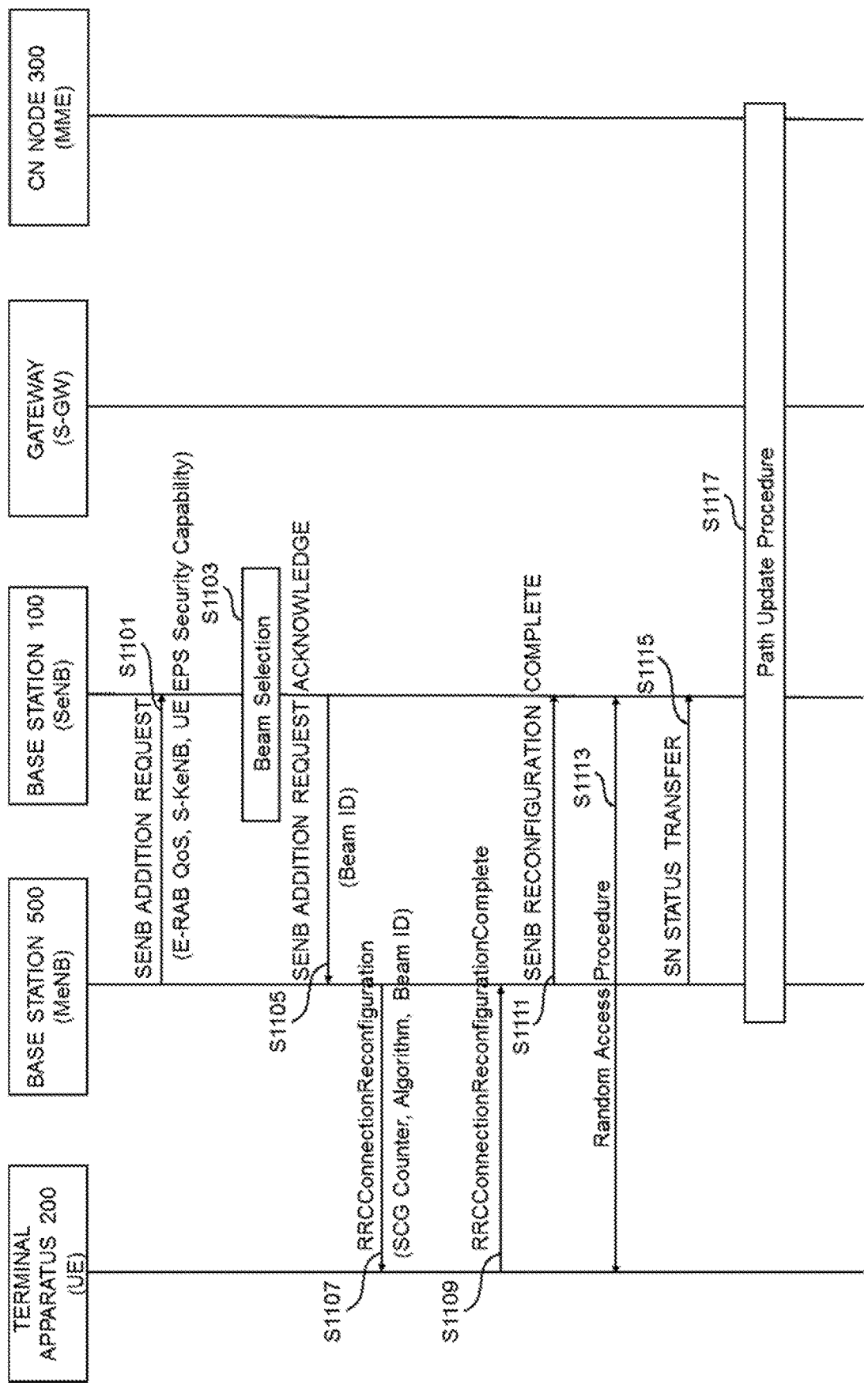
FIG. 30 is an explanatory diagram for describing a second example of the schematic flow of processing according to the second example alteration.

FIG. 30 is an explanatory diagram for describing a second example of a schematic flow of processing according to the second example alteration of the first example embodiment. This example is an example of the processing at the time of addition of a secondary base station. Moreover, in this example, the beam selection related information is a beam ID.

The base station 500 (MeNB) transmits an SENB ADDITION REQUEST message to the base station 100 (SeNB) (S1101). For example, this message includes E-RAB QoS, S-KeNB, UE EPS security capability, and the like. For example, this message also includes measurement information (measurement information on the base station 100) transmitted from the terminal apparatus 200.

The base station 100 (SeNB) selects, based on the measurement information, a beam to be used for radio communication between the base station 100 (SeNB) and the terminal apparatus 200 (UE) (S1103).

The base station 100 (SeNB) transmits an SENB ADDITION REQUEST ACKNOWLEDGE message including the beam ID of the beam, to the base station 500 (MeNB) (S1105).

The base station 500 (MeNB) transmits an RRC connection reconfiguration message including a SCG counter, the beam ID, and the like, to the terminal apparatus 200 (UE) (S1107).

The terminal apparatus 200 (UE) transmits an RRC connection reconfiguration complete message to the base station 500 (MeNB) (S1109).

The base station 500 (MeNB) transmits an SENB RECONFIGURATION COMPLETE message to the base station 100 (SeNB) (S1111).

Thereafter, a random access procedure (S1113), SN status transfer (S1115), and a path update procedure (S1117) are performed.

Through the above processing, the base station 100 (SeNB) and the terminal apparatus 200 (UE) may obtain the same beam ID and generate the same security key.

Third Example

Figure 31:
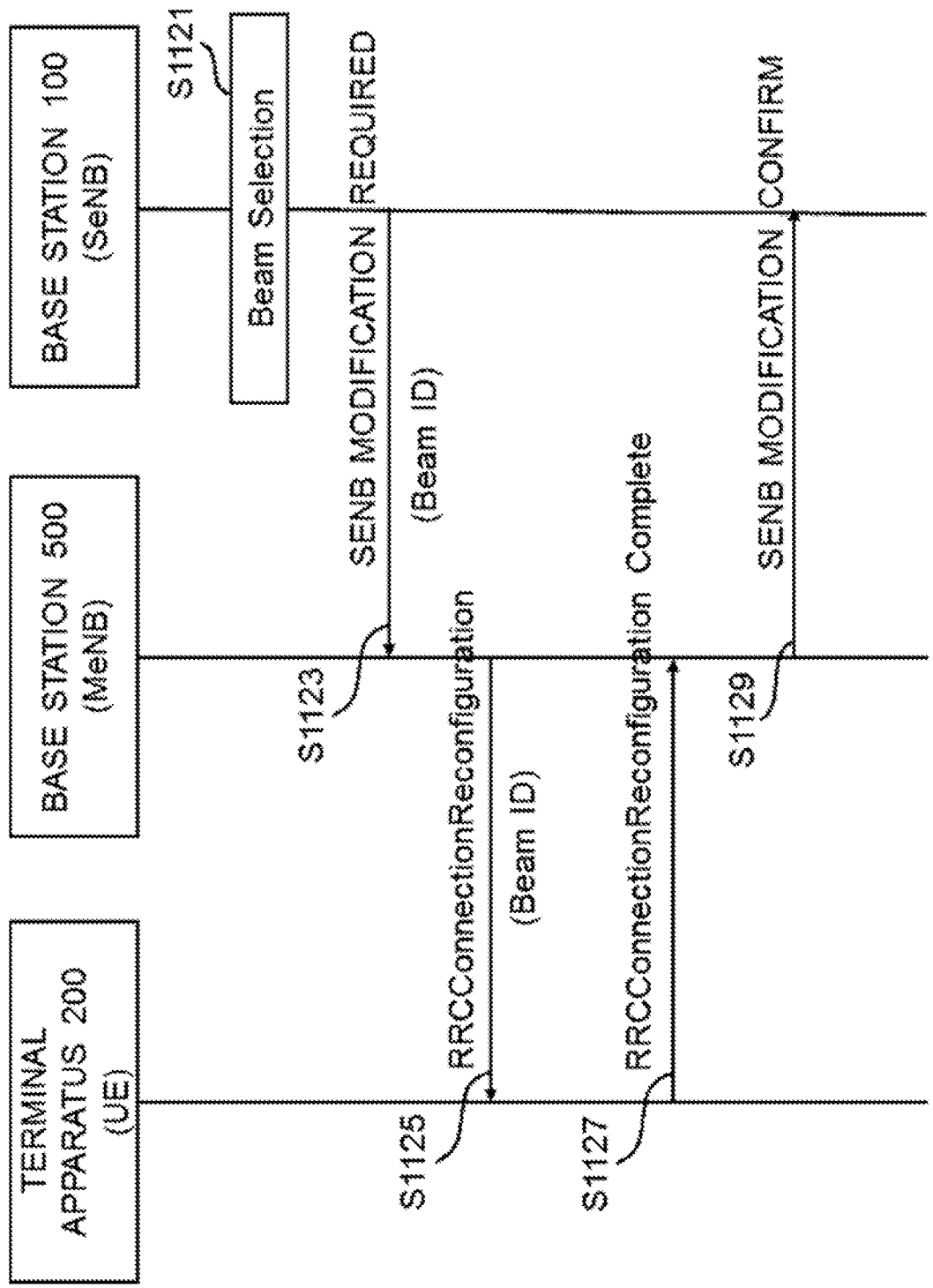
FIG. 31 is an explanatory diagram for describing a third example of the schematic flow of processing according to the second example alteration.

FIG. 31 is an explanatory diagram for describing a third example of a schematic flow of processing according to the second example alteration of the first example embodiment. This example is an example of processing at the time of beam selection (beam modification). Moreover, in this example, the beam selection related information is a beam ID. The third example may be performed instead of the above-described first example.

The base station 100 (SeNB) selects a beam to be used for radio communication between the base station 100 (SeNB) and the terminal apparatus 200 (UE) (S1121). In other words, the base station 100 (SeNB) modifies the beam.

The base station 100 (SeNB) transmits an SENB MODIFICATION REQUIRED message including the beam ID of the beam, to the base station 500 (MeNB) (S1023).

The base station 500 (MeNB) transmits an RRC connection reconfiguration message including the beam ID and the like, to the terminal apparatus 200 (UE) (S1125).

The terminal apparatus 200 (UE) transmits an RRC connection reconfiguration complete message to the base station 500 (MeNB) (S1127).

The base station 500 (MeNB) transmits an SENB MODIFICATION CONFIRM message to the base station 100 (SeNB) (S1129).

Through the above processing, the base station 100 (SeNB) and the terminal apparatus 200 (UE) may obtain the same beam ID and generate the same security key.

Fourth Example

The beam selection related information may be a beam counter instead of beam identification information. In this case, the base station 100 and the terminal apparatus 200 may perform similar processing as that in the example in FIG. 17.

Note that, in Step S1021, the base station 500 (master base station), instead of the base station 100 (secondary base station), may transmit the initial value of the beam counter to the terminal apparatus 200. Moreover, in Step S1031, the measurement information may be transmitted from the terminal apparatus 200 to the base station 500 (master base station) and transmitted from the base station 500 (master base station) to the base station 100 (secondary base station). Moreover, in Step S1035, the base station 500 (master base station), instead of the base station 100 (secondary base station), may transmit information for making a notification of beam selection, to the terminal apparatus 200.

The second example alteration of the first example embodiment has been described above. Note that in the second example alteration, for example, a split bearer may be used for radio communication between the base station 100 (secondary base station) and the terminal apparatus 200, instead of a SCG bearer. In this case, the data encryption may be performed in the RLC layer or the MAC layer on the secondary base station (base station 100) side, instead of the PDCP layer on the master base station (base station 500) side. The base station 100 (SeNB) may generate and use the security key. Also, in such a case, the base station 100 (secondary base station), the base station 500 (master base station), and the terminal apparatus 200 may perform the above-described operations.

<4.3. Third Example Alteration>

Next, a third example alteration of the first example embodiment will be described with reference to FIG. 32 to FIG. 37.

In the third example alteration, a master base station in dual connectivity generates a security key for radio communication between a secondary base station and a terminal apparatus, based on beam selection related information.

(1) Configuration of System

Figure 32:
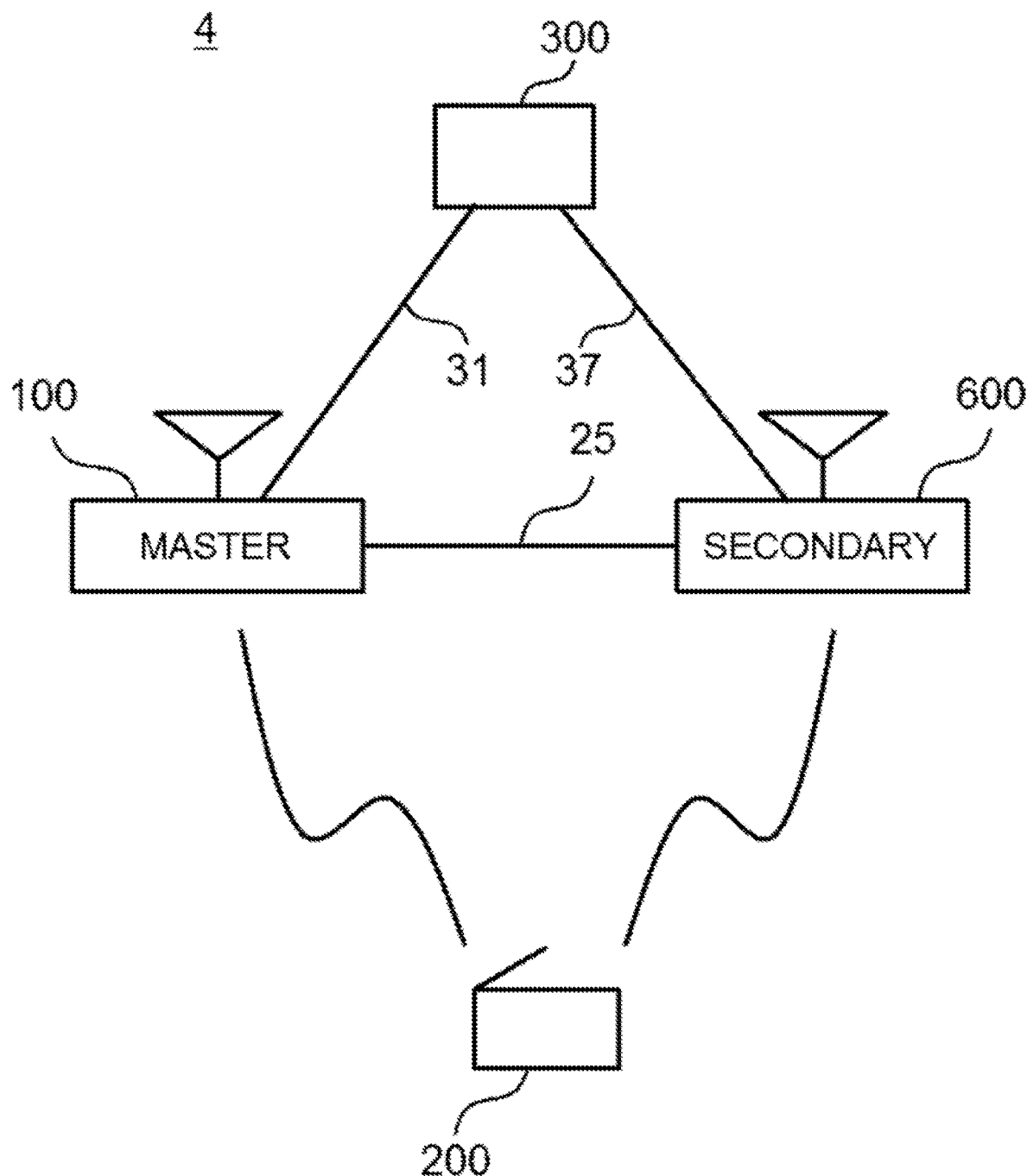
FIG. 32 is an explanatory diagram illustrating an example of a schematic configuration of a system according to a third example alteration.

FIG. 32 is an explanatory diagram illustrating an example of a schematic configuration of a system 4 according to the third example alteration of the first example embodiment. According to FIG. 32, the system 4 further includes a base station 600 in addition to the base station 100, the terminal apparatus 200, and the core network node 300.

In particular, in the third example alteration, the base station 100 is a master base station in dual connectivity of the terminal apparatus 200, and the base station 600 is a secondary base station in the dual connectivity. As an example, the base station 100 is a MeNB, and the base station 600 is an SeNB. The terminal apparatus 200 performs radio communication with both the base station 100 (master base station) and the base station 600 (secondary base station). Note that the master base station and the secondary base station may use the same RAT or use different RATs (refer to <4.5. Others> to be described later, for example).

Figure 33:
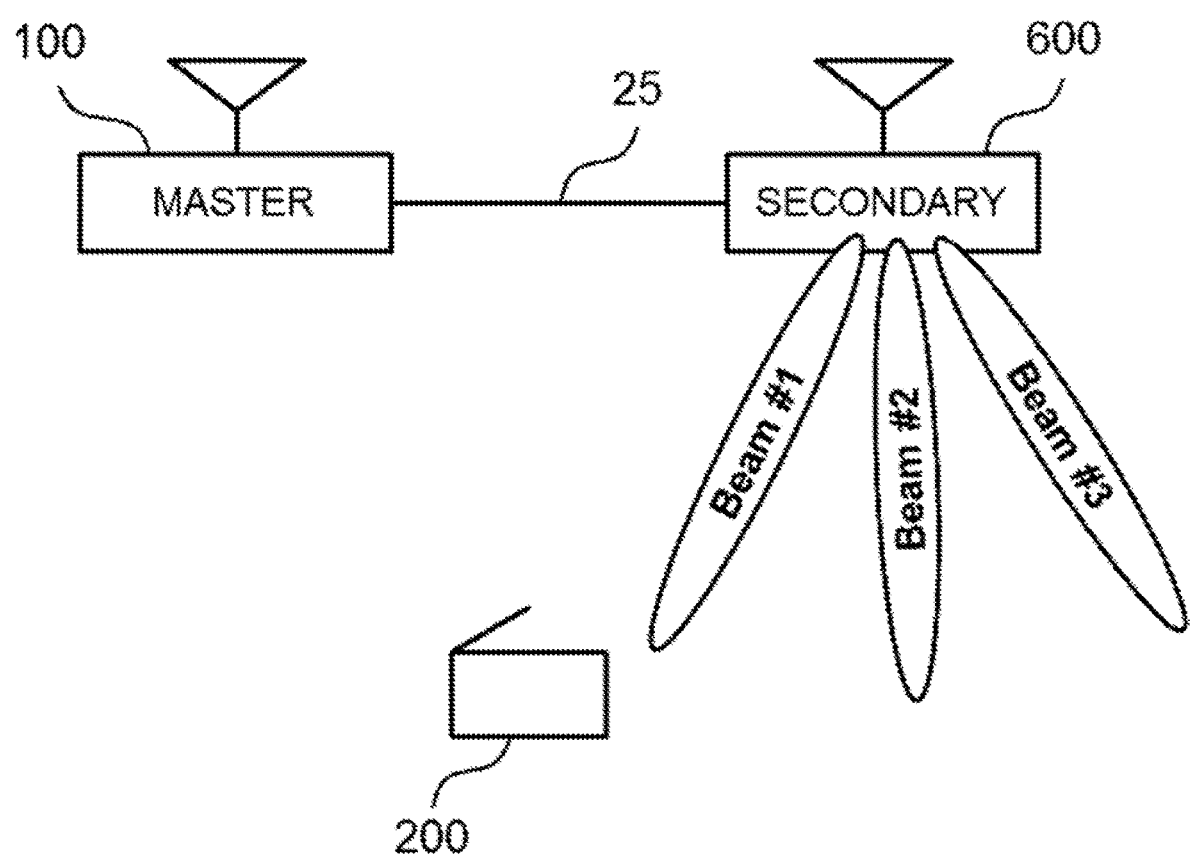
FIG. 33 is an explanatory diagram for describing an example of use of a beam in the third example alteration.

For example, the base station 600 (secondary base station) uses a beam for radio communication with the terminal apparatus 200 as illustrated in FIG. 33. For example, a beam is newly selected according to move of the terminal apparatus 200.

In the third example alteration, for example, a SCG bearer is used for radio communication between the base station 600 (secondary base station) and the terminal apparatus 200. Specifically, data transmitted from the base station 600 (secondary base station) to the terminal apparatus 200 is transmitted from a core network (e.g., a serving gateway (S-GW)) to the base station 600 without passing through the base station 100 (master base station). Moreover, data transmitted from the terminal apparatus 200 to the base station 600 (secondary base station) is transmitted from the base station 600 to a core network (e.g., a serving gateway (S-GW)) without passing through the base station 100 (master base station).

Alternatively, for example, a split bearer may be used for radio communication between the base station 600 (secondary base station) and the terminal apparatus 200. In other words, data to be transmitted from the base station 600 (secondary base station) to the terminal apparatus 200 may be transmitted from a core network (e.g., a serving gateway (S-GW)) to the base station 600 through the base station 100 (master base station). Moreover, data to be transmitted from the terminal apparatus 200 to the base station 600 (secondary base station) may be transmitted from the base station 600 to the core network (e.g., the serving gateway (S-GW)) through the base station 100 (master base station).

The base station 600 communicates with the core network node 300 via an interface 37 (e.g., an S1 interface). Moreover, the base station 600 communicates with the base station 100 via an interface 25 (e.g., an X2 interface).

(2) Configuration of Base Station 600

Figure 34:
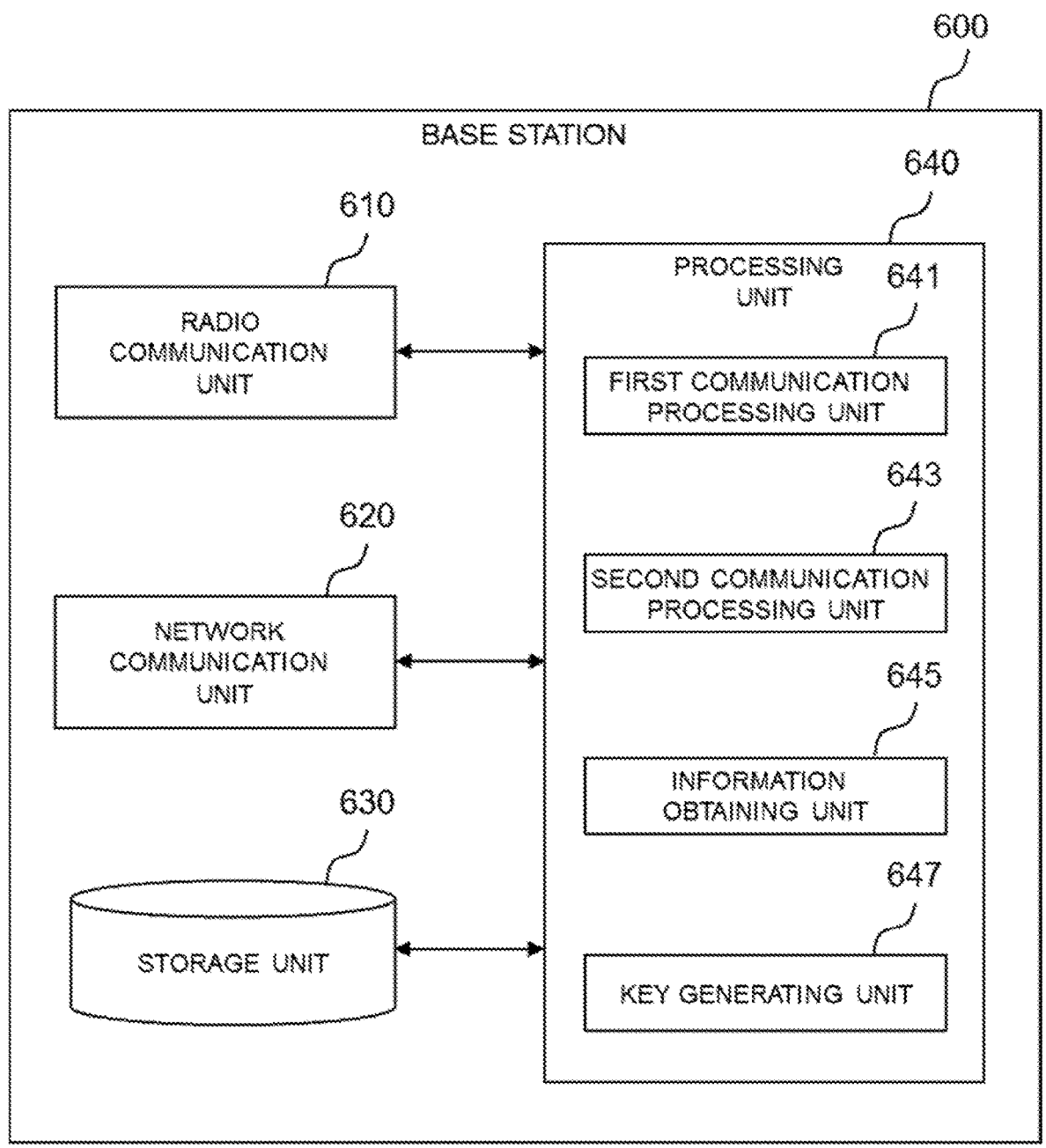
FIG. 34 is a block diagram illustrating an example of a schematic configuration of a base station according to the third example alteration.

FIG. 34 is a block diagram illustrating an example of a schematic configuration of the base station 600 according to the third example alteration of the first example embodiment. According to FIG. 34, the base station 600 includes a radio communication unit 610, a network communication unit 620, a storage unit 630, and a processing unit 640. The processing unit 640 includes a first communication processing unit 641, a second communication processing unit 643, an information obtaining unit 645, and a key generating unit 647.

A description of the base station 600 is the same as the description of the base station 600 in <3.2. Configuration of Base Station> except for a difference in reference signs. Hence, overlapping descriptions are omitted here.

(3) Technical Features (First Example: Case of SCG Bearer)

First, as a first example, technical features in a case of using a SCG bearer will be described.

As described above, the base station 100 (key generating unit 147) generates a security key for radio communication between a base station and the terminal apparatus 200, based on the beam selection related information (information related to beam selection).

(3-1) Base Station/Radio Communication

In the third example alteration, the base station is the base station 600 (secondary base station in the dual connectivity). In other words, the base station 100 (key generating unit 147) generates a security key for radio communication between the base station 600 (secondary base station) and the terminal apparatus 200.

(3-2) Beam Selection

In the third example alteration, for example, the base station 600 (first communication processing unit 641) performs the beam selection.

Alternatively, the terminal apparatus 200 (communication processing unit 231) may perform the beam selection, or the base station 100 (first communication processing unit 141) may perform the beam selection.

(3-3) Beam Selection Related Information

For example, also in the third example alteration, as well as in the second example alteration, beam selection related information (beam identification information, beam counter, or the like) may be transmitted and received among a master base station, a secondary base station, and a terminal apparatus. Hence, overlapping descriptions are omitted here.

(3-4) Generation of Security Key

Input for Generation

For example, the base station 100 (key generating unit 147) generates the security key (security key for radio communication between the base station 600 and the terminal apparatus 200), by using, as an input, a key for the master base station (e.g., $K_{eNB}$) in addition to the beam selection related information.

For example, the key (e.g., $K_{eNB}$) for the master base station is provided by the core network node 300 (e.g., the MME) or is provided by the source base station of a handover to the base station 100 (target base station). As an example, the upper key is included in an INITIAL CONTEXT SETUP REQUEST message from the core network node 300 (e.g., the MME) or a HANDOVER REQUEST message from the source base station.

Example of Security Key

For example, the security key is a key to be used for key generation by the base station 600 (secondary base station). In other words, the security key is a key for the secondary base station. For example, the key generation is generation of an encryption key for encryption of the user plane. Specifically, for example, the security key is S-$K_{eNB}$, and the encryption key is $K_{UPenc}$.

Figure 35:
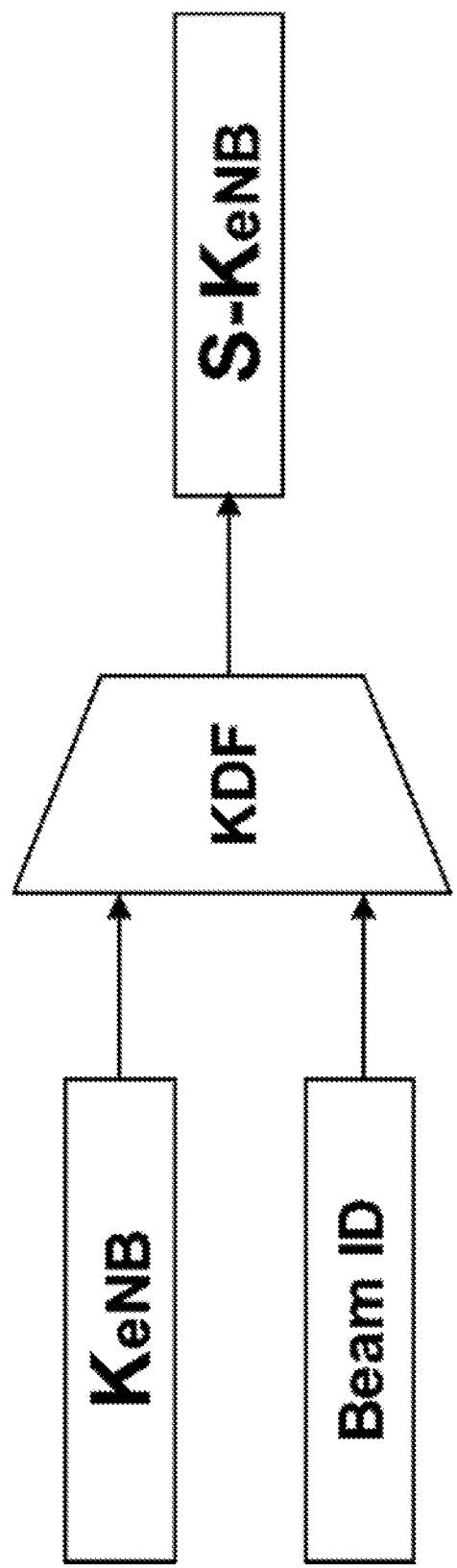
FIG. 35 is an explanatory diagram for describing a first example of security key generation based on beam selection related information in the third example alteration.

FIG. 35 is an explanatory diagram for describing a first example of security key generation based on beam selection related information in the third example alteration. With reference to FIG. 35, S-$K_{eNB}$ is generated through the KDF by using $K_{eNB}$ and the beam ID as inputs. The KDF is an algorithm similar to the algorithm described in 3GPP TS 33.401 V13.3.0 (Annex A A.15) and/or 3GPP TS 33.220 V13.1.0 (Annex B), for example. Note that a SCG counter may be used as an input in addition to the $K_{eNB}$ and the beam ID.

In the example in FIG. 35, a beam ID is used as an input of the KDF. However, a beam counter may be used as an input of the KDF instead of a beam ID. Alternatively, beam selection related information other than a beam ID and a beam counter may be used as an input of the KDF.

(3-5) Transmission of Security Key

For example, the base station 100 (second communication processing unit 143) transmits the security key to the base station 600, and the base station 600 (second communication processing unit 443) receives the security key.

For example, the base station 100 (second communication processing unit 143) transmits, to the base station 600, a message for addition or modification of the secondary base station, and the message includes the security key. For example, the message is an SENB ADDITION REQUEST message or an SENB MODIFICATION REQUEST message.

(3-6) Operation of Secondary Base Station

The base station 600 (information obtaining unit 645) obtains the security key. The base station 600 (first communication processing unit 641) then performs radio communication with the terminal apparatus 200 by using the security key.

For example, the base station 600 (first communication processing unit 641) generates an encryption key for encryption of a user plane by using the security key and performs radio communication with the terminal apparatus 200 by using the encryption key. For example, the base station 600 (first communication processing unit 641) generates $K_{UPenc}$ by using S-$K_{eNB}$ and performs radio communication with the terminal apparatus 200 by using $K_{UPenc}$.

For example, the base station 600 (first communication processing unit 641) also generates an encryption key for encryption of a control plane (e.g., $K_{RRCenc}$) and/or a key for integrity protection of the control plane (e.g., $K_{RRCint}$) by using the security key and performs radio communication with the terminal apparatus 200 using such a key.

(3-7) Operations of Terminal Apparatus

The terminal apparatus 200 (key generating unit 235), similar to the base station 100, generates a security key (e.g., S-$K_{eNB}$) for radio communication with the base station 600, based on the beam selection related information. The terminal apparatus 200 (communication processing unit 231) then performs radio communication with the base station 600 by using the security key.

For example, the terminal apparatus 200 (key generating unit 235) generates S-$K_{eNB}$. The terminal apparatus 200 (communication processing unit 231) then generates $K_{UPenc}$ by using S-$K_{eNB}$ and performs radio communication with the base station 600 by using $K_{UPenc}$.

(3-8) Flow of Processing

First Example

Figure 36:
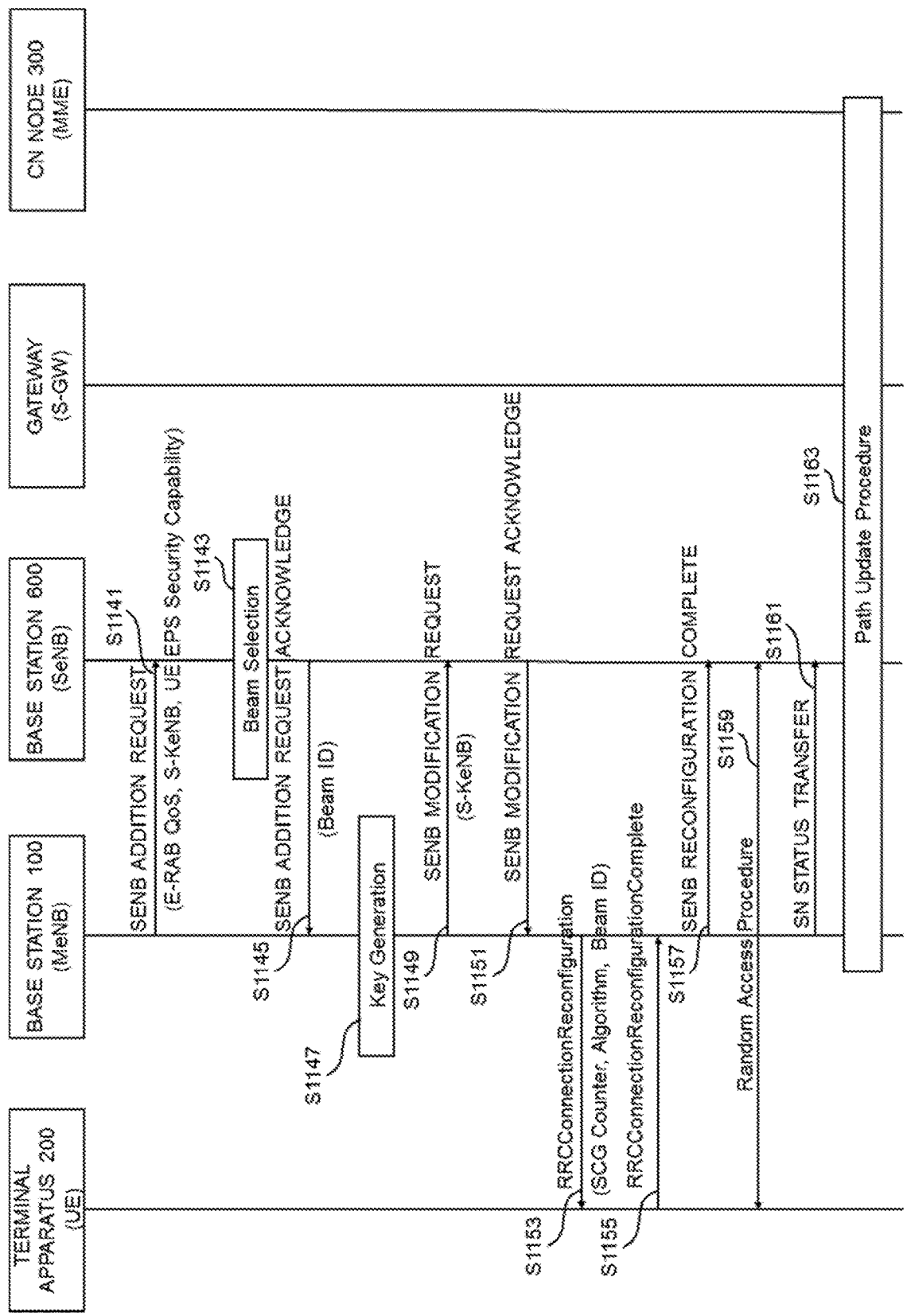
FIG. 36 is an explanatory diagram for describing a first example of a schematic flow of processing according to the third example alteration.

FIG. 36 is an explanatory diagram for describing a first example of a schematic flow of processing according to the third example alteration of the first example embodiment. This example is an example of the processing at the time of addition of the secondary base station. Moreover, in this example, the beam selection related information is a beam ID.

The base station 100 (MeNB) transmits an SENB ADDITION REQUEST message to the base station 600 (SeNB) (S1141). For example, this message includes E-RAB QoS, S-KeNB, UE EPS security capability, and the like. For example, this message also includes measurement information (measurement information on the base station 600) transmitted from the terminal apparatus 200.

The base station 600 (SeNB) selects, based on the measurement information, a beam to be used for radio communication between the base station 600 (SeNB) and the terminal apparatus 200 (UE) (S1143).

The base station 600 (SeNB) transmits an SENB ADDITION REQUEST ACKNOWLEDGE message including the beam ID of the beam, to the base station 100 (MeNB) (S1145).

The base station 100 (MeNB) generates S-$K_{eNB}$, based on the beam ID (S1147).

The base station 100 (MeNB) transmits an SENB MODIFICATION REQUEST message including S-$K_{eNB}$ to the base station 600 (SeNB) (S1149).

The base station 600 (SeNB) transmits an SENB MODIFICATION REQUEST ACKNOWLEDGE message to the base station 100 (MeNB) (S1151).

The base station 100 (MeNB) transmits an RRC connection reconfiguration message including a SCG counter, the beam ID, and the like, to the terminal apparatus 200 (UE) (S1153).

The terminal apparatus 200 (UE) transmits an RRC connection reconfiguration complete message to the base station 100 (MeNB) (S1155).

The base station 100 (MeNB) transmits an SENB RECONFIGURATION COMPLETE message to the base station 600 (SeNB) (S1157).

Thereafter, a random access procedure (S1159), SN status transfer (S1161), and a path update procedure (S1163) are performed.

Through the above processing, the base station 100 (MeNB) and the terminal apparatus 200 (UE) may obtain the same beam ID and generate the same security key.

Second Example

Figure 37:
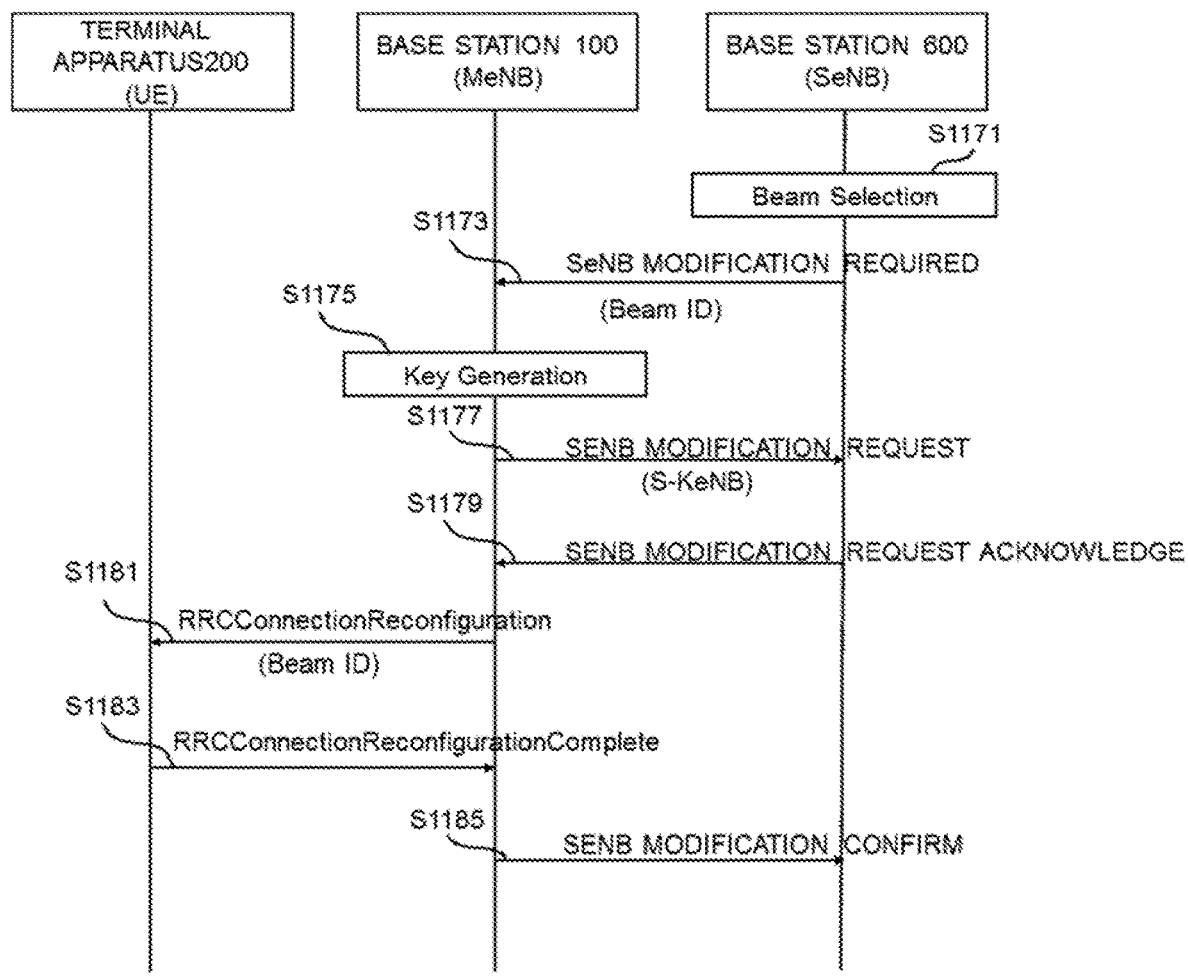
FIG. 37 is an explanatory diagram for describing a second example of the schematic flow of processing according to the third example alteration.

FIG. 37 is an explanatory diagram for describing a second example of a schematic flow of processing according to the third example alteration of the first example embodiment. This example is an example of processing at the time of beam selection (beam modification). Moreover, in this example, the beam selection related information is a beam ID.

The base station 600 (SeNB) selects a beam to be used for radio communication between the base station 600 (SeNB) and the terminal apparatus 200 (UE) (S1171). In other words, the base station 600 (SeNB) modifies the beam.

The base station 600 (SeNB) transmits an SENB MODIFICATION REQUIRED message including the beam ID of the beam, to the base station 100 (MeNB) (S1173).

The base station 100 (MeNB) generates S-$K_{eNB}$, based on the beam ID (S1175).

The base station 100 (MeNB) transmits an SENB MODIFICATION REQUEST message including S-$K_{eNB}$ to the base station 600 (SeNB) (S1177).

The base station 600 (SeNB) transmits an SENB MODIFICATION REQUEST ACKNOWLEDGE message to the base station 100 (MeNB) (S1179).

The base station 100 (MeNB) transmits an RRC connection reconfiguration message including the beam ID and the like, to the terminal apparatus 200 (UE) (S1181).

The terminal apparatus 200 (UE) transmits an RRC connection reconfiguration complete message to the base station 100 (MeNB) (S1183).

The base station 100 (MeNB) transmits an SENB MODIFICATION CONFIRM message to the base station 600 (SeNB) (S1183).

Through the above processing, the base station 100 (MeNB) and the terminal apparatus 200 (UE) may obtain the same beam ID and generate the same security key.

The technical features in the case of using a SCG bearer have been described above. Note that the above-described technical features are also applicable to a case of using a split bearer and performing data encryption in the RLC layer or the MAC layer on the secondary base station (base station 600) side, as well as the case of using a SCG bearer.

(4) Technical Features (Second Example: Case of Split Bearer)

As a second example, technical features in a case of using a split bearer will be described.

As described above, the base station 100 (key generating unit 147) generates a security key for radio communication between a base station and the terminal apparatus 200, based on the beam selection related information (information related to beam selection).

(4-1) Base Station/Radio Communication
(4-2) Beam Selection
(4-3) Beam Selection Related Information Descriptions of base station/radio communication, beam selection, and beam selection related information are the same as those in the above-described first example (case of a SCG bearer), for example. Hence, overlapping descriptions are omitted here.

(4-4) Generation of Security Key

Input for Generation

For example, the base station 100 (key generating unit 147) generates the security key (security key for radio communication between the base station 100 and the terminal apparatus 200), by using, as an input, another key in addition to the beam selection related information.

Note that the base station 100 (key generating unit 147) may further use information other than the beam selection related information and such another key, as an input.

Example of Security Key

Encryption Key for User Plane

For example, the security key is an encryption key for encrypting the user plane. Specifically, for example, the security key is $K_{UPenc}$.

For example, the base station 100 (key generating unit 147) generates the security key, based further on an upper key (key for the base station) of the security key. For example, the upper key is $K_{eNB}$. For example, the upper key is provided by the core network node 300 (e.g., the MME) or is provided by the source base station of a handover to the base station 100 (target base station). As an example, the upper key is included in an INITIAL CONTEXT SETUP REQUEST message from the core network node 300 (e.g., the MME) or a HANDOVER REQUEST message from the source base station.

The security key can be generated as in the example in FIG. 12.

Key for Key Generation

The security key may be a key to be used for key generation. The key generation may be generation of an encryption key for encryption of the user plane. Specifically, the security key may be $K_{eNB}$ or $K_{eNBbeam}$, and the encryption key may be $K_{UPenc}$.

The base station 100 (key generation unit 147) may generate a new security key, based further on a current security key.

The security key may be generated as in the example in FIG. 13. The encryption key may be generated as in the example in FIG. 14.

(4-5) Radio Communication with Terminal Apparatus, Using Security Key

For example, the base station 100 (first communication processing unit 141) performs radio communication with the terminal apparatus 200 via the base station 600 (secondary base station) by using the security key.

For example, as described above, the security key is an encryption key for encryption of a user plane (e.g., $K_{UPenc}$), and the base station 100 (first communication processing unit 141) performs radio communication with the terminal apparatus 200 via the base station 600 (secondary base station) by using the encryption key. More specifically, for example, the base station 100 (first communication processing unit 141) encrypts downlink data (downlink data of the split bearer) to be transmitted via the base station 600 (secondary base station) (e.g., in the PDCP layer) by using the encryption key (e.g., $K_{UPenc}$). The encrypted downlink data is transmitted from the base station 100 (master base station) to the base station 600 (secondary base station) and is transmitted from the base station 600 (secondary base station) to the terminal apparatus 200. In other words, the encrypted downlink data is transmitted over the split bearer. Moreover, for example, the base station 100 (first communication processing unit 141) decrypts uplink data (uplink data of the split bearer) received via the base station 600 (secondary base station) (e.g., in the PDCP layer) by using the encryption key (e.g., $K_{UPenc}$).

Alternatively, as described above, the security key may be a key (e.g., $K_{eNB}$ or $K_{eNBbeam}$) to be used for generation of an encryption key for encryption of a user plane (e.g., $K_{UPenc}$), and the base station 100 (first communication processing unit 141) may perform radio communication with the terminal apparatus 200 via the base station 600 (secondary base station) by using the key. More specifically, for example, the base station 100 (first communication processing unit 141) generates the encryption key (e.g., $K_{UPenc}$) by using the key (e.g., $K_{eNB}$ or $K_{eNBbeam}$) and performs radio communication with the terminal apparatus 200 via the base station 600 (secondary base station) by using the encryption key. A description of the subsequent operations is the same as that in the above-described example.

Note that, also in the third example alteration, the radio communication using the security key may include radio communication of both downlink and uplink or radio communication of only one of downlink and uplink.

(4-6) Operations of Terminal Apparatus

The terminal apparatus 200 (key generating unit 235), as well as the base station 100 (master base station), generates a security key (e.g., $K_{UPenc}$ or $K_{eNB}$) for radio communication with the base station 600, based on the beam selection related information. The terminal apparatus 200 (communication processing unit 231) then performs radio communication with the base station 100 (master base station) via the base station 600 (secondary base station) by using the security key (e.g., $K_{UPenc}$ or $K_{eNB}/K_{eNBbeam}$).

(4-7) Flow of Processing

For example, also in the case of a split bearer, processing illustrated in FIG. 36 (excluding Steps S1147 to S1151) is performed as in the above-described case of a SCG bearer.

Moreover, for example, also in the case of a split bearer, processing illustrated in FIG. 37 (excluding Steps S1175 to S1179) is performed as in the above-described case of a SCG bearer.

<4.4. Fourth Example Alteration>

Next, a fourth example alteration of the first example embodiment will be described with reference to FIG. 38 to FIG. 45.

In the fourth example alteration, a 5G network is used.

(1) Configuration of System

Figure 38:
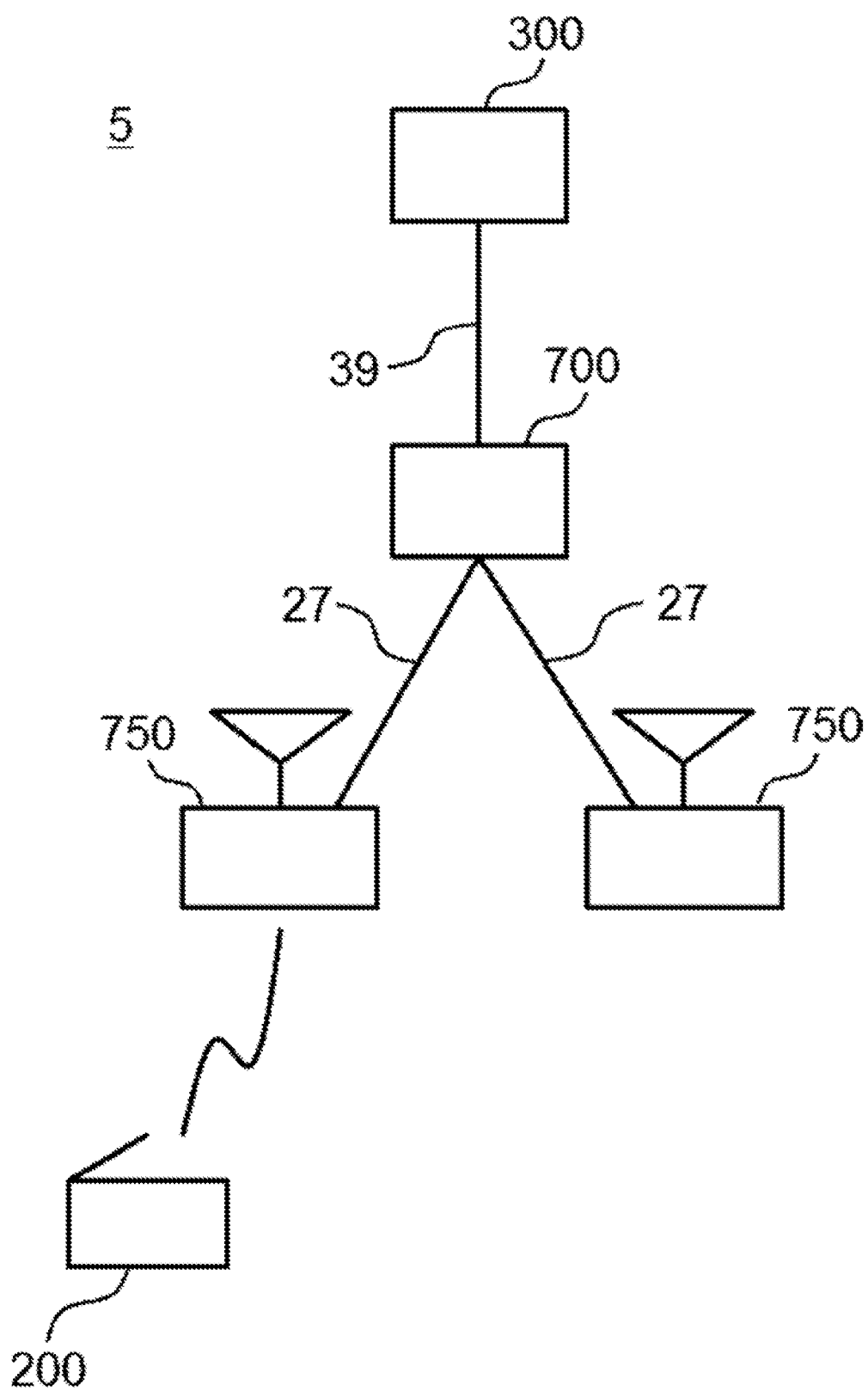
FIG. 38 is an explanatory diagram illustrating an example of a schematic configuration of a system according to a fourth example alteration.

FIG. 38 is an explanatory diagram illustrating an example of a schematic configuration of a system 5 according to the fourth example alteration of the first example embodiment. With reference to FIG. 38, the system 5 includes a first unit 700, a second unit 750, and the core network node 300.

The fourth example alteration is expressed as an example in which the base station 100 in the system 1 described with reference to FIG. 8 includes the first unit 700 and the second unit 750. Alternatively, the fourth example alteration may be considered as an example in which the base station 100 described with reference to FIG. 8 is the first unit 700 and the second unit 750 is added, in the system 1.

The first unit 700 is a unit configured to perform upper protocol layer processing, and the second unit 750 is a unit configured to perform lower protocol layer processing. For example, the RRC layer and the PDCP layer are included in the upper protocol layer, and the physical layer is included in the lower protocol layer. Both the RLC layer and the MAC layer may be included in the upper protocol layer or may be included in the lower protocol layer. Alternatively, the RLC layer may be included in the upper protocol layer, and the MAC layer may be included in the lower protocol layer.

For example, the first unit 700 is referred to as a center/central unit (CU), and the second unit 750 may be referred to as a distributed unit (DU) (or an access unit (AU)).

The first unit 700 and the second unit 750 perform radio communication with the terminal apparatus 200. The first unit 700 performs radio communication with the terminal apparatus 200 via the second unit 750.

Figure 39:
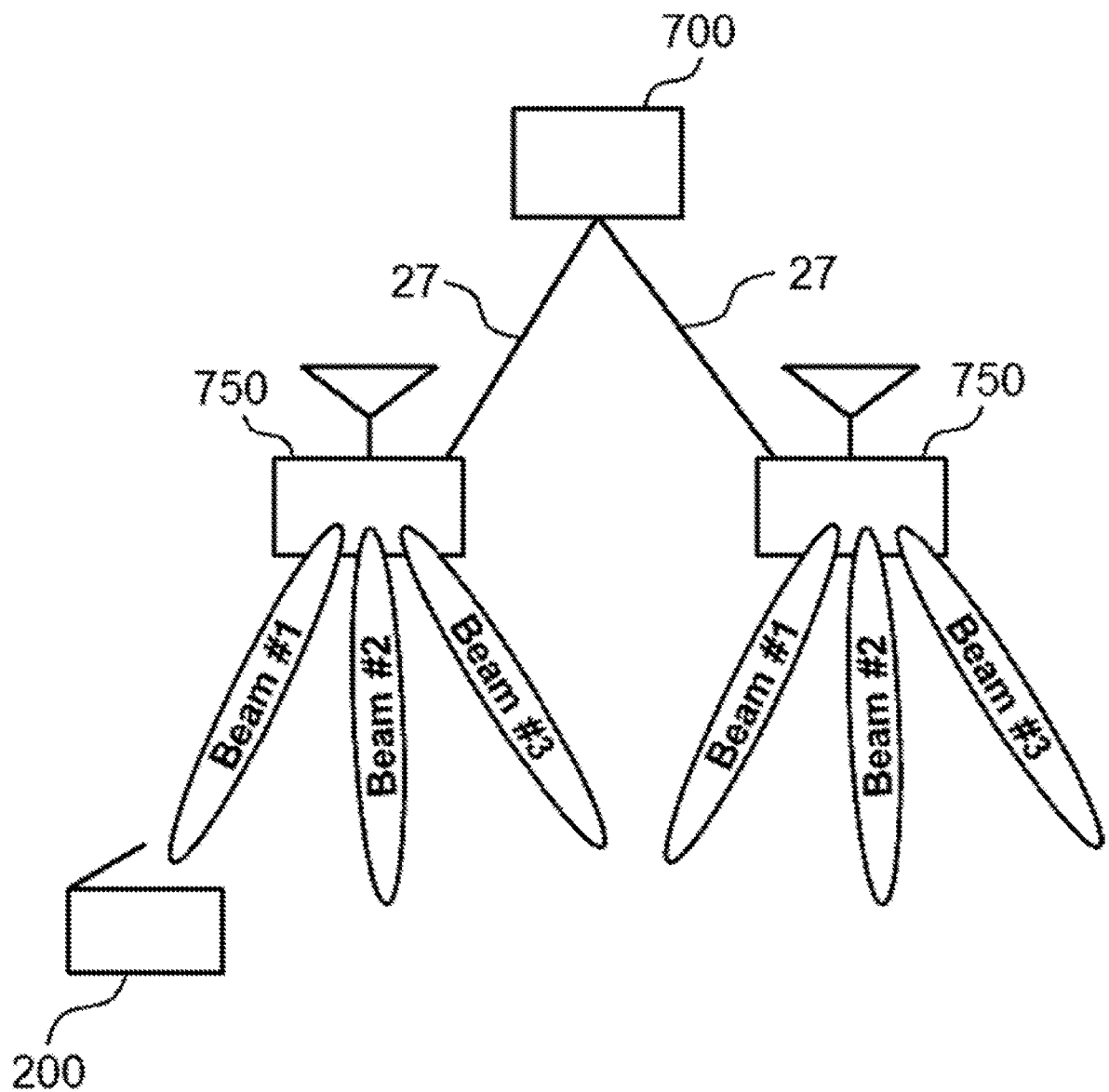
FIG. 39 is an explanatory diagram for describing an example of use of a beam in the fourth example alteration.

For example, the second unit 750 uses a beam for radio communication with the terminal apparatus 200 as illustrated in FIG. 39. For example, a beam is newly selected in response to move of the terminal apparatus 200.

The first unit 700 communicates with the core network node 300 via an interface 39 (e.g., an S1 interface). Moreover, the first unit 700 and the second unit 750 communicate with each other via an interface 27 (e.g., an X3 interface). For example, the interface 27 is similar to an Iur/Iub interface of the Universal Mobile Telecommunication System (UMTS). Linking between the first unit 700 and the second unit 750 is performed in accordance with a link setup procedure (e.g., a DU link setup), for example.

(2) Configuration of First Unit

Figure 40:
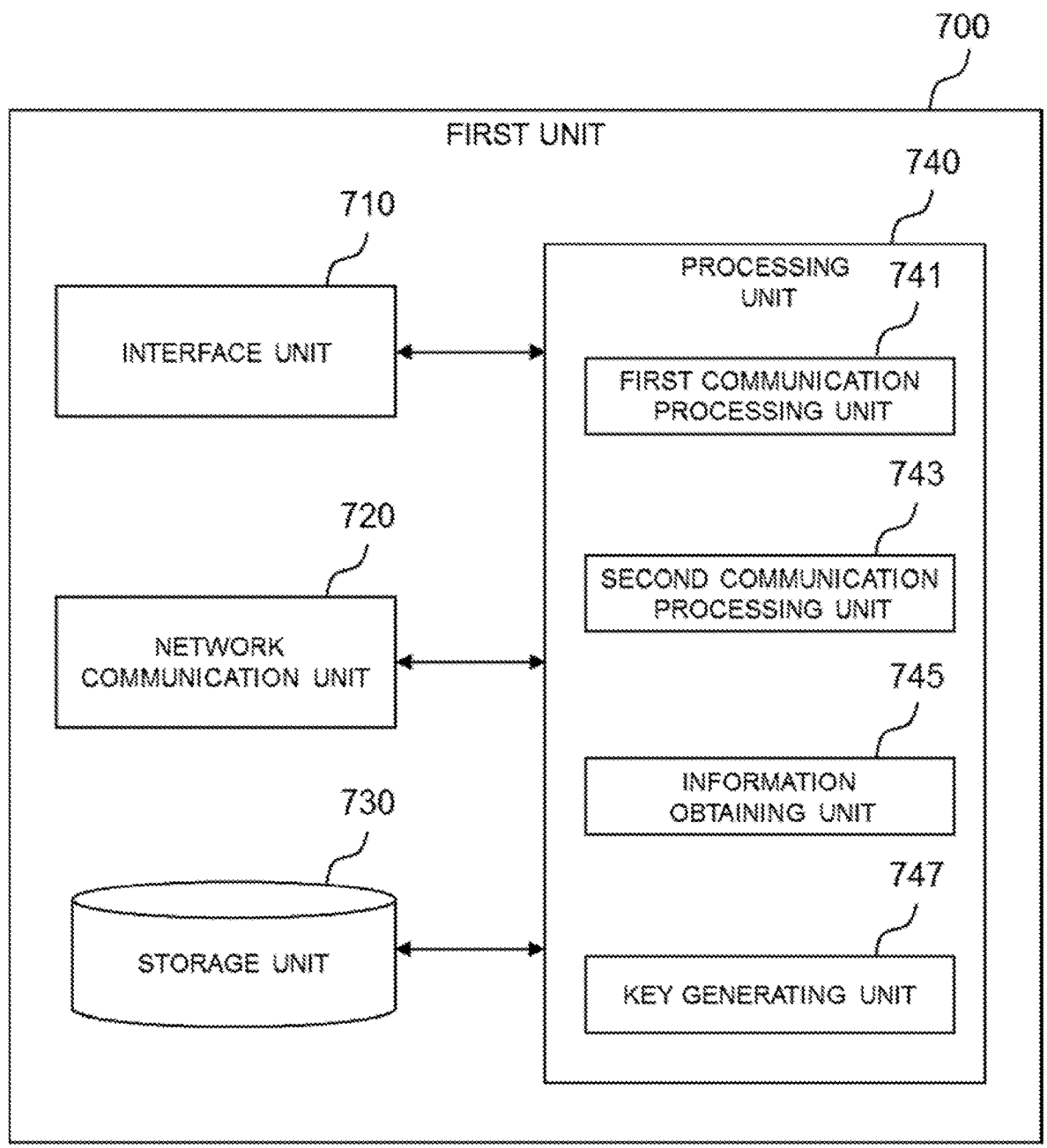
FIG. 40 is a block diagram illustrating an example of a schematic configuration of a first unit according to the fourth example alteration.

FIG. 40 is a block diagram illustrating an example of a schematic configuration of the first unit 700 according to the fourth example alteration of the first example embodiment. According to FIG. 40, the first unit 700 includes an interface unit 710, a network communication unit 720, a storage unit 730, and a processing unit 740.

Interface Unit 710

The interface unit 710 transmits a signal to the second unit 750 and receives a signal from the second unit 750.

Network Communication Unit 720

The network communication unit 720 receives a signal from a network and transmits a signal to the network.

Storage Unit 730

The storage unit 730 temporarily or permanently stores a program and parameters for operations of the first unit 700 as well as various data.

Processing Unit 740

The processing unit 740 provides various functions of the first unit 700. The processing unit 740 includes a first communication processing unit 741, a second communication processing unit 743, an information obtaining unit 745, and a key generating unit 747. Note that the processing unit 740 may further include constituent components other than these constituent components. In other words, the processing unit 740 may also perform operations other than the operations of these constituent components. Concrete operations of the first communication processing unit 741, the second communication processing unit 743, the information obtaining unit 745, and the key generating unit 747 will be described later in detail.

For example, the processing unit 740 (first communication processing unit 741) communicates with a terminal apparatus (e.g., the terminal apparatus 200) via the interface unit 710 (and the second unit 750). For example, the processing unit 740 (second communication processing unit 143) communicates with another network node (e.g., the core network node 300) via the network communication unit 720.

Implementation Example

The interface unit 710 may be implemented by any kind of an interface (e.g., an optical fiber interface). The network communication unit 720 may be implemented by a network adapter, a network interface card, or the like. The storage unit 730 may be implemented by a memory (e.g., a non-volatile memory and/or a volatile memory) and/or a hard disk, and the like. The processing unit 740 may be implemented by a baseband (BB) processor and/or a different processor, and the like. The first communication processing unit 741, the second communication processing unit 743, the information obtaining unit 745, and the key generating unit 747 may be implemented by the same processor or may be implemented by separate processors. The memory (storage unit 130) may be included in such a processor (chip).

The first unit 700 may include a memory configured to store a program and one or more processors that can execute the program, and the one or more processors may perform operations of the processing unit 740 (operations of the first communication processing unit 741, the second communication processing unit 743, the information obtaining unit 745 and/or the key generating unit 747). The program may be a program for causing the one or more processors to perform operations of the processing unit 740 (operations of the first communication processing unit 741, the second communication processing unit 743, the information obtaining unit 745, and/or the key generating unit 747).

(3) Configuration of Second Unit

Figure 41:
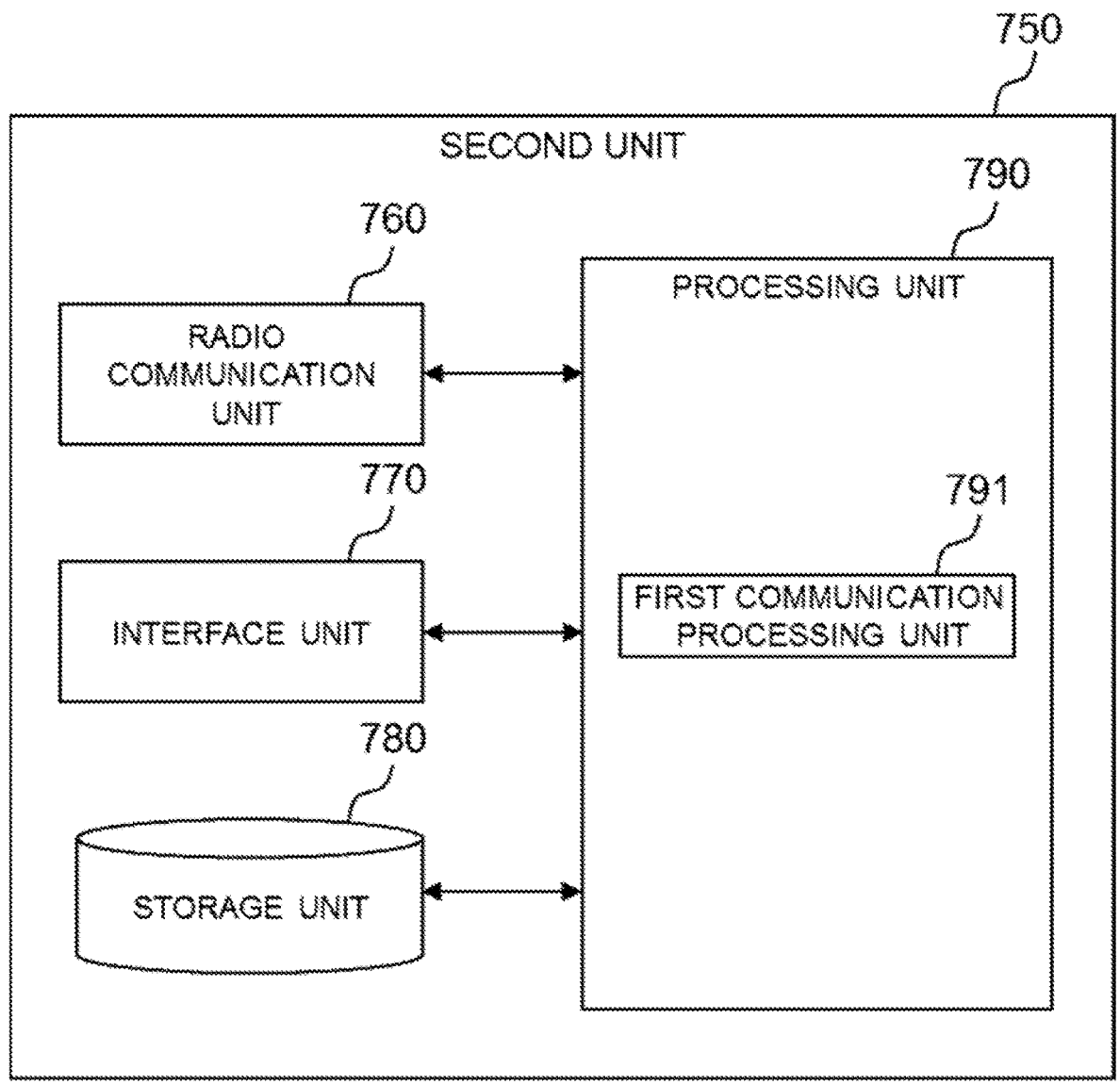
FIG. 41 is a block diagram illustrating an example of a schematic configuration of a second unit according to the fourth example alteration.

FIG. 41 is a block diagram illustrating an example of a schematic configuration of the second unit 750 according to the fourth example alteration of the first example embodiment. According to FIG. 41, the second unit 750 includes a radio communication unit 760, an interface unit 770, a storage unit 780, and a processing unit 790.

Radio Communication Unit 760

The radio communication unit 760 transmits and/or receives a signal wirelessly. For example, the radio communication unit 760 receives a signal from a terminal apparatus and transmits a signal to a terminal apparatus.

Interface Unit 770

The interface unit 770 transmits a signal to the first unit 700 and receives a signal from the first unit 700.

Storage Unit 780

The storage unit 780 temporarily or permanently stores a program and parameters for operations of the second unit 750 as well as various data.

Processing Unit 790

The processing unit 790 provides various functions of the second unit 750. The processing unit 790 includes a first communication processing unit 791. Note that the processing unit 790 may further include constituent components other than the first communication processing unit 791. In other words, the processing unit 790 may also perform operations other than the operations of the first communication processing unit 791. Concrete operations of the first communication processing unit 791 will be described later in detail.

For example, the processing unit 790 (first communication processing unit 791) communicates with a terminal apparatus (e.g., the terminal apparatus 200) via the radio communication unit 760. For example, the processing unit 790 (first communication processing unit 791) communicates with the first unit 700 via the interface unit 770.

Implementation Example

The radio communication unit 760 may be implemented by an antenna, a radio frequency (RF) circuit, and the like, and the antenna may be a directional antenna. The interface unit 770 may be implemented by any kinds of an interface (e.g., an optical fiber interface). The storage unit 780 may be implemented by a memory (e.g., a nonvolatile memory and/or a volatile memory) and/or a hard disk, and the like. The processing unit 790 may be implemented by a baseband (BB) processor and/or another processor, and the like. The memory (storage unit 130) may be included in such a processor (chip).

The second unit 750 may include a memory configured to store a program and one or more processors that can execute the program, and the one or more processors may perform operations of the processing unit 790 (operations of first communication processing unit 791). The program may be a program for causing the one or more processors to perform the operations of the processing unit 790 (operations of the first communication processing unit 791).

(4) Technical Features

The first unit 700 (information obtaining unit 745) obtains beam selection related information (information related to beam selection). The first unit 700 (key generating unit 747) then generates a security key for radio communication between the terminal apparatus 200 and a set of the first unit 700 and the second unit 750 based on the beam selection related information.

(4-1) Beam Selection

For example, the beam selection is selection of a beam to be used for the radio communication.

Selection by Second Unit

For example, the second unit 750 (first communication processing unit 791) performs the beam selection. Specifically, for example, the second unit 750 (first communication processing unit 791) selects a beam (e.g., an optimal beam) to be used for radio communication between the terminal apparatus 200 and a set of the first unit 700 and the second unit 750 based on measurement information on the second unit 750 (measurement information from the terminal apparatus 200).

For example, the measurement information is included in the control information of the physical layer or the MAC layer. As an example, the measurement information is CSI or information similar to this. Alternatively, the measurement information may be included in RRC layer control information. As an example, the measurement information may be included in a measurement report. In any case, for example, the measurement information includes information such as downlink receive power and/or receive quality.

For example, at the time of setting up a link between the first unit 700 and the second unit 750, the first unit 700 transmits the measurement information to the second unit 750. For example, the first unit 700 transmits a DU LINK SETUP REQUEST message including the measurement information to the second unit 750. The second unit 750 then selects an optimal beam, based on the measurement information.

For example, after communication between the second unit 750 and the terminal apparatus 200 is started, the second unit 750 receives the measurement information from the terminal apparatus 200. The second unit 750 then selects an optimal beam, based on the measurement information. In particular, in this case, for example, the measurement information is included in the control information of the physical layer or the MAC layer.

Selection by First Unit

Alternatively, the first unit 700 (first communication processing unit 741) may perform the beam selection. Specifically, the first unit 700 (first communication processing unit 741) may select a beam (e.g., an optimal beam) to be used for radio communication between the terminal apparatus 200 and a set of the first unit 700 and the second unit 750 based on measurement information on the second unit 750 (measurement information from the terminal apparatus 200).

Selection by Terminal Apparatus

Alternatively, the terminal apparatus 200 (communication processing unit 231) may perform the beam selection. Specifically, the terminal apparatus 200 (communication processing unit 231) may select a beam (e.g., an optimal beam) to be used for radio communication between the terminal apparatus 200 and a set of the first unit 700 and the second unit 750 based on a measurement regarding the second unit 750.

Note that a beam selection technique is similar to that in the example of the above-described first example embodiment, for example.

(4-2) Beam Selection Related Information

Case of Beam Identification Information

For example, the beam selection related information is the beam identification information.

As described above, for example, the second unit 750 (first communication processing unit 791) performs the beam selection. The second unit 750 (first communication processing unit 791) then transmits beam identification information to the first unit 700. The second unit 750 (first communication processing unit 791) or the first unit 700 (first communication processing unit 741) transmits the beam identification information to the terminal apparatus 200.

For example, at the time of setting up a link between the first unit 700 and the second unit 750, the second unit 750 (first communication processing unit 791) transmits a DU LINK SETUP RESPONSE message including the beam identification information to the first unit 700. For example, the first unit 700 (first communication processing unit 741) transmits an RRC connection reconfiguration message including the beam identification information to the terminal apparatus 200 (via the second unit 750 or another second unit 750, for example). This message may include information indicating timing of application of the beam identification information (e.g., a frame number and/or a symbol number, or the like).

For example, after communication between the second unit 750 and the terminal apparatus 200 is started, the second unit 750 (first communication processing unit 791) transmits a DU LINK RECONFIGURATION REQUIRED message including the beam identification information to the first unit 700. Moreover, for example, the second unit 750 (first communication processing unit 791) transmits control information (control information of the physical layer or the MAC layer) including the beam identification information to the terminal apparatus 200.

Note that the first unit 700 (first communication processing unit 741) may perform the beam selection and transmit the beam identification information to the terminal apparatus 200. Alternatively, the terminal apparatus 200 (communication processing unit 231) may perform the beam selection and transmit the beam identification information to the first unit 700 or the second unit 750.

Case of Beam Counter

The beam selection related information may be the beam counter.

The first unit 700 (first communication processing unit 741) may then transmit, to the terminal apparatus 200, the initial value of the beam counter. Specifically, for example, the first unit 700 (first communication processing unit 741) may transmit, to the terminal apparatus 200, the RRC message including the beam counter (initial value). To prevent the beam counter (e.g., the initial value) from being maliciously changed by a third party, the RRC message may be a message with protected integrity. As an example, the RRC message may be an RRC connection reconfiguration message to be used after a security mode command procedure at the time when the terminal apparatus 200 changes from an idle state to a connected state.

Note that the terminal apparatus 200 (communication processing unit 231) may transmit the initial value of the beam counter to the first unit 700 or the second unit 750.

(4-3) Generation of Security Key

Input for Generation

For example, the first unit 700 (key generating unit 747) generates the security key (security key for radio communication between the terminal apparatus 200 and a set of the first unit 700 and the second unit 750) by using, as an input, another key in addition to the beam selection related information.

Note that the first unit 700 (key generating unit 747) may further use information other than the beam selection related information and such another key, as an input.

Example of Security Key

Encryption Key for User Plane

For example, the security key is an encryption key for encrypting the user plane. Specifically, for example, the security key is $K_{UPenc}$.

For example, the first unit 700 (key generating unit 747) generates the security key, based further on an upper key (key for the CU) of the security key. For example, the upper key is $K_{CU}$. For example, the upper key is provided by the core network node 300 (e.g., the MME) or is provided by a source unit of a handover to the first unit 700 (target unit). As an example, the upper key is included in a SECURITY MODE COMMAND message or an INITIAL CONTEXT SETUP REQUEST message from the core network node 300 (e.g., the MME) or a HANDOVER REQUEST message from the source unit.

Figure 42:
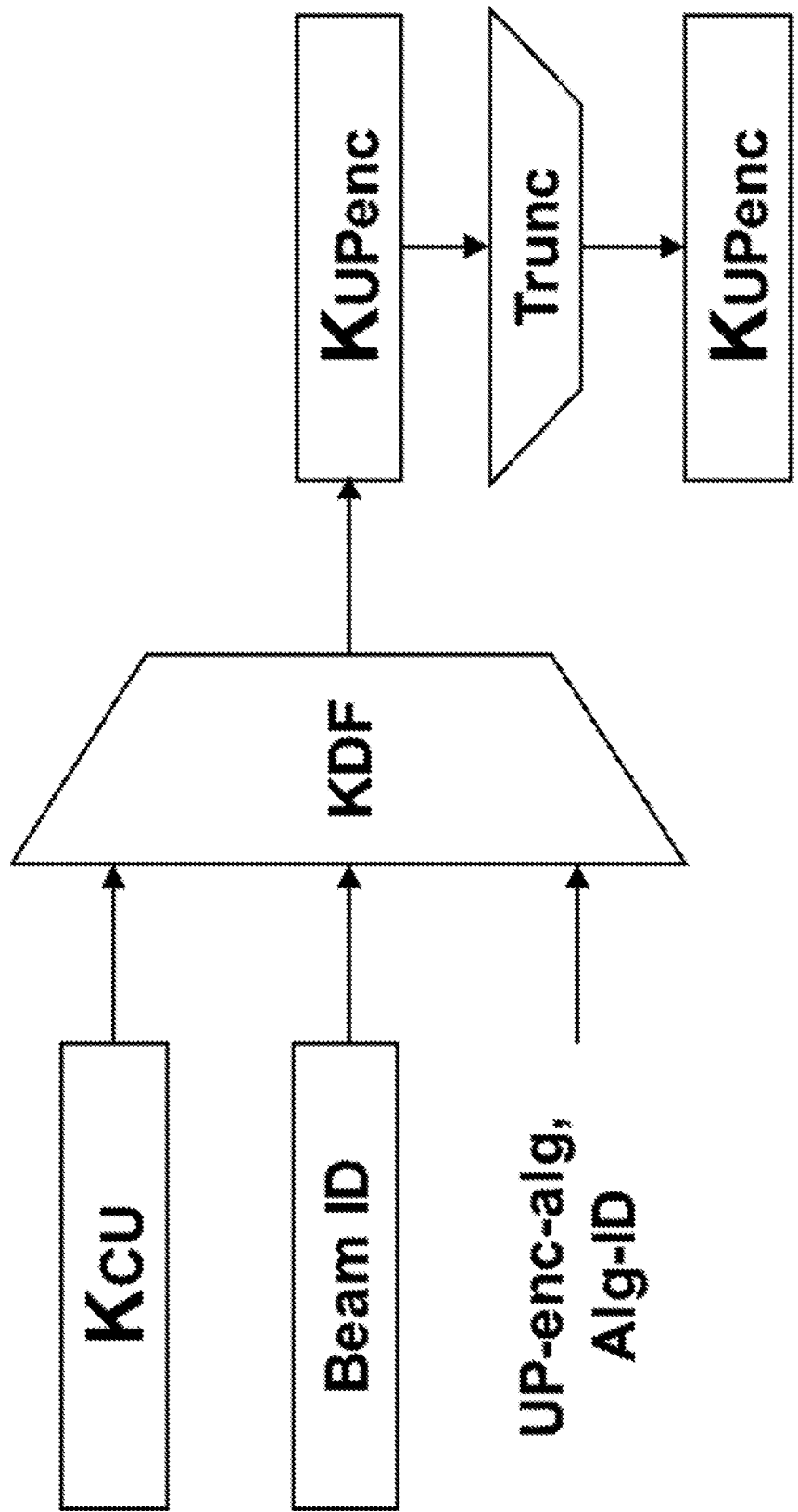
FIG. 42 is an explanatory diagram for describing a first example of security key generation based on beam selection related information in the fourth example alteration.

FIG. 42 is an explanatory diagram for describing a first example of security key generation based on beam selection related information in the fourth example alteration. According to FIG. 42, the encryption key $K_{UPenc}$ for the user plane is generated through the KDF by using $K_{CU}$, a beam ID, UP-enc-alg, and an Alg-ID as inputs. The KDF is an algorithm similar to the algorithm described in 3GPP TS 33.401 V13.3.0 (Annex A A.7) and/or 3GPP TS 33.220 V13.1.0 (Annex B), for example. Further, $K_{UPenc}$ is truncated, so that the length of $K_{UPenc}$ becomes 128 bits from 256 bits, for example. Specifically, higher-order 128 bits of 256 bits of K are extracted, and the 128 bits result in final $K_{UPenc}$.

In the example in FIG. 42, a beam ID is used as an input of the KDF. However, a beam counter may be used as an input of the KDF instead of a beam ID. Alternatively, beam selection related information other than a beam ID and a beam counter may be used as an input of the KDF.

Note that the first unit 700 (key generating unit 747) may also generate an encryption key for encryption of the control plane (e.g., $K_{RRCenc}$) and/or a key for integrity protection for the control plane (e.g., $K_{RRCint}$), based on the beam selection related information. In this case, the security key may be such a key.

Key for Key Generation

The security key may be a key to be used for key generation. The key generation may be generation of an encryption key for encryption of the user plane. Specifically, the security key may be $K_{CU}$ or $K_{CUbeam}$, and the encryption key may be $K_{UPenc}$.

The first unit 700 (key generation unit 747) may generate a new security key, based further on a current security key.

Figure 43:
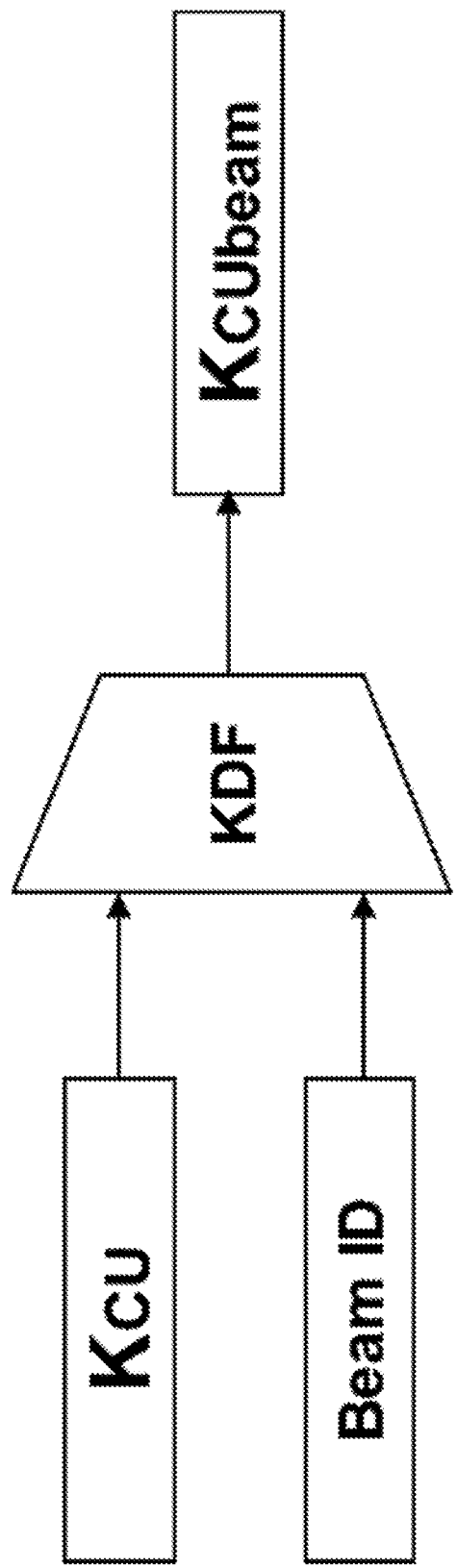
FIG. 43 is an explanatory diagram for describing a second example of security key generation based on beam selection related information in the fourth example alteration.

FIG. 43 is an explanatory diagram for describing a second example of security key generation based on beam selection related information in the fourth example alteration. According to FIG. 43, $K_{CUbeam}$ is generated through the KDF by using the current $K_{CU}$ and the beam ID as inputs. The KDF is an algorithm similar to the algorithm described in 3GPP TS 33.220 V13.1.0 (Annex B), for example. For example, $K_{CUbeam}$ thereafter serves as new $K_{CU}$. Alternatively, $K_{CUbeam}$ may exist as an independent key different from $K_{CU}$. Thereafter, $K_{UPenc}$ is generated by using new $K_{CU}$ (or $K_{CUbeam}$ independent of $K_{CU}$).

In the example in FIG. 43, a beam ID is used as an input of the KDF. However, a beam counter may be used as an input of the KDF instead of a beam ID. Alternatively, beam selection related information other than a beam ID and a beam counter may be used as an input of the KDF.

Note that the security key (e.g., new $K_{CU}$ or $K_{CUbeam}$ independent of $K_{CU}$) may also be used for generation of the encryption key for encryption of the control plane (e.g., $K_{RRCenc}$) and/or the key for integrity protection for the control plane (e.g., $K_{RRCint}$). In this case, the key generation may be generation of such a key.

(4-4) Radio Communication with Terminal Apparatus, Using Security Key

For example, the first unit 700 (first communication processing unit 741) performs radio communication with the terminal apparatus 200 via the second unit 750 by using the security key.

For example, as described above, the security key is an encryption key for encryption of a user plane (e.g., $K_{UPenc}$), and the first unit 700 (first communication processing unit 741) performs radio communication with the terminal apparatus 200 via the second unit 750 by using the encryption key. More specifically, for example, the first unit 700 (first communication processing unit 741) encrypts downlink data to be transmitted via the second unit 750 (e.g., in the PDCP layer) by using the encryption key (e.g., $K_{UPenc}$). The encrypted downlink data is transmitted from the first unit 700 to the second unit 750 and is transmitted from the second unit 750 to the terminal apparatus 200. In addition, for example, the first unit 700 (first communication processing unit 741) decrypts uplink data received via the second unit 750 (e.g., in the PDCP layer) by using the encryption key (e.g., $K_{UPenc}$).

Alternatively, as described above, the security key may be a key (e.g., $K_{CU}$ or $K_{CUbeam}$) to be used for generation of an encryption key for encryption of a user plane (e.g., $K_{UPenc}$), and the first unit 700 (first communication processing unit 741) may perform radio communication with the terminal apparatus 200 via the second unit 750 by using the key. More specifically, for example, the first unit 700 (first communication processing unit 741) generates the encryption key (e.g., $K_{UPenc}$) by using the key (e.g., $K_{CU}$ or $K_{CUbeam}$) and performs radio communication with the terminal apparatus 200 via the second unit 750 by using the encryption key. A description of the subsequent operations is the same as that in the above-described example.

Note that, also in the fourth example alteration, the radio communication using the security key may include radio communication of both downlink and uplink or may be only one of downlink and uplink.

(4-5) Operations of Terminal Apparatus

The terminal apparatus 200 (key generating unit 235), like the first unit 700 (key generating unit 747), generates a security key (e.g., $K_{UPenc}$ or $K_{CU}/K_{CUbeam}$) for radio communication with the first unit 700 and the second unit 750, based on the beam selection related information. The terminal apparatus 200 (communication processing unit 231) then performs radio communication with the first unit 700 and the second unit 750 by using the security key (e.g., $K_{UPenc}$ or $K_{CU}/K_{CUbeam}$).

(4-6) Flow of Processing

First Example

Figure 44:
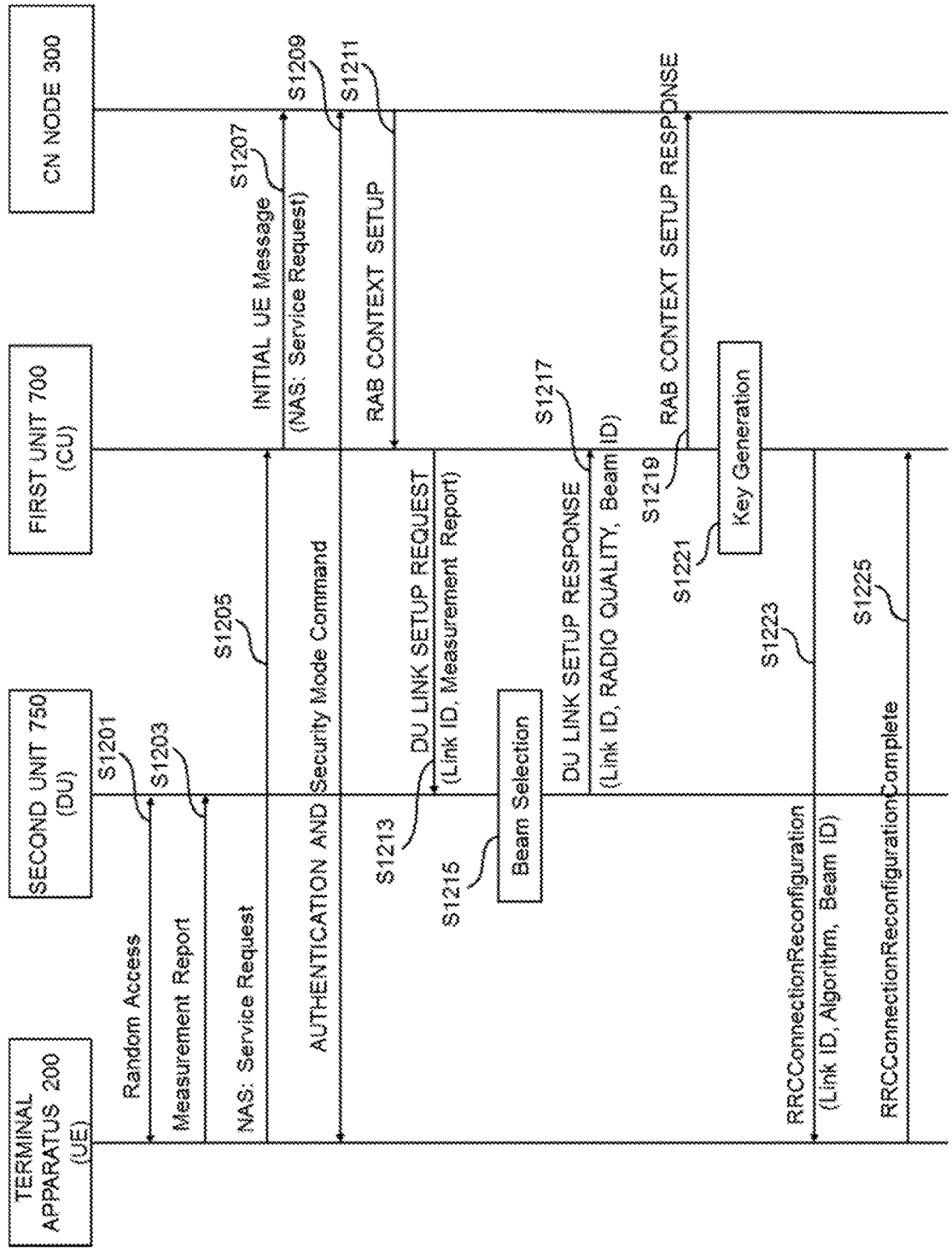
FIG. 44 is an explanatory diagram for describing a first example of a schematic flow of processing according to the fourth example alteration.

FIG. 44 is an explanatory diagram for describing a first example of a schematic flow of processing according to the fourth example alteration of the first example embodiment. This example is an example of processing at the time of setting up a link between the first unit 700 and the second unit 750. Moreover, in this example, the beam selection related information is a beam ID.

First, random access (S1201), transmission of a measurement report (S1203), transmission of a service request (S1205), transmission of an initial UE message (S1207), authentication and security mode command (S1209), and transmission of RAB context setup (S12011) are performed.

The first unit 700 transmits a DU LINK SETUP REQUEST message including the measurement report to the second unit 750 (S1213).

The second unit 750 selects, based on the measurement report, a beam to be used for radio communication between the terminal apparatus 200 (UE) and a set of the first unit 700 and the second unit 750 (S1215).

The second unit 750 transmits a DU LINK SETUP RESPONSE message including the beam ID of the beam to the first unit 700 (S1217).

The first unit 700 transmits a RAB CONTEXT SETUP RESPONSE message to the core network node 300 (S1219).

The first unit 700 generates a security key ($K_{UPenc}$ or $K_{CU}/K_{CUbeam}$) for the radio communication with the terminal apparatus 200 (UE), based on the beam ID (S1221).

The first unit 700 transmits an RRC connection reconfiguration message including the beam ID of the beam to the terminal apparatus 200 (S1223).

The terminal apparatus 200 transmits an RRC connection reconfiguration complete message to the first unit 700 (S1225).

Note that the terminal apparatus 200 thereafter also generates a security key ($K_{UPenc}$ or $K_{CU}/K_{CUbeam}$), based on the beam ID.

Second Example

Figure 45:
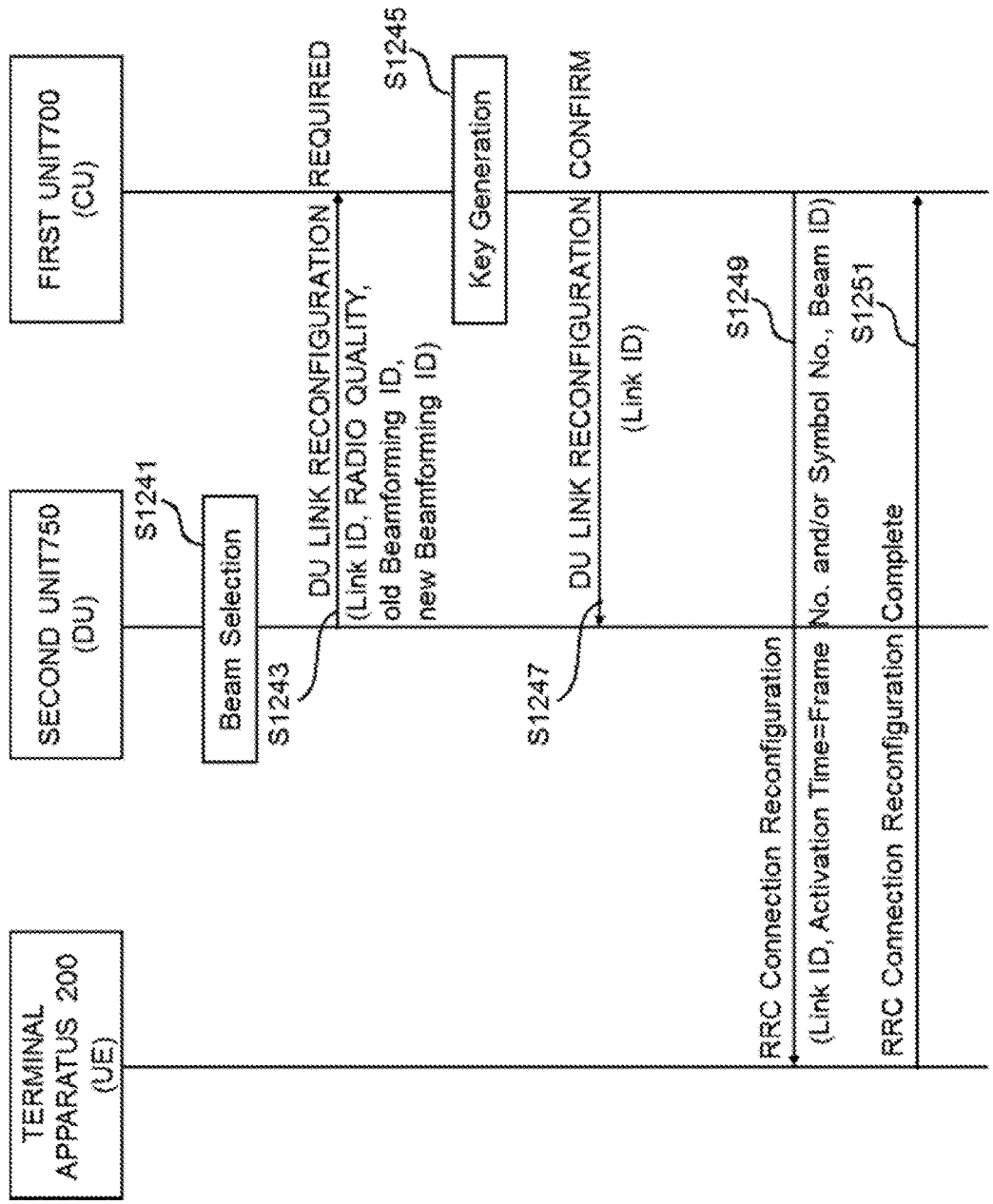
FIG. 45 is an explanatory diagram illustrating a second example of the schematic flow of processing according to the fourth example alteration.

FIG. 45 is an explanatory diagram for describing a second example of a schematic flow of processing according to the fourth example alteration of the first example embodiment. This example is an example of processing at the time of beam selection (beam modification). Moreover, in this example, the beam selection related information is a beam ID.

The second unit 750 selects, based on the measurement information (e.g., CSI), a beam to be used for radio communication between the terminal apparatus 200 (UE) and a set of the first unit 700 and the second unit 750 (S1241).

The second unit 750 transmits a DU LINK RECONFIGURATION REQUIRED message including the beam ID of the beam to the first unit 700 (S1243).

The first unit 700 generates a security key ($K_{UPenc}$ or $K_{CU}/K_{CUbeam}$) for the radio communication with the terminal apparatus 200 (UE), based on the beam ID (S1245).

The first unit 700 transmits a DU LINK RECONFIGURATION COMPLETE message to the second unit 750 (S1247).

The first unit 700 transmits an RRC connection reconfiguration message including the beam ID of the beam to the terminal apparatus 200 (S1249).

The terminal apparatus 200 transmits an RRC connection reconfiguration complete message to the first unit 700 (S1251).

Note that the terminal apparatus 200 thereafter also generates a security key ($K_{UPenc}$ or $K_{CU}/K_{CUbeam}$), based on the beam ID.

<4.5. Others>

As the fourth example alteration, the example of the 5G network has been described. It is apparent that the first to third example alterations may be applied to an example of the 5G network.

(1) Network Configuration

Figure 46:
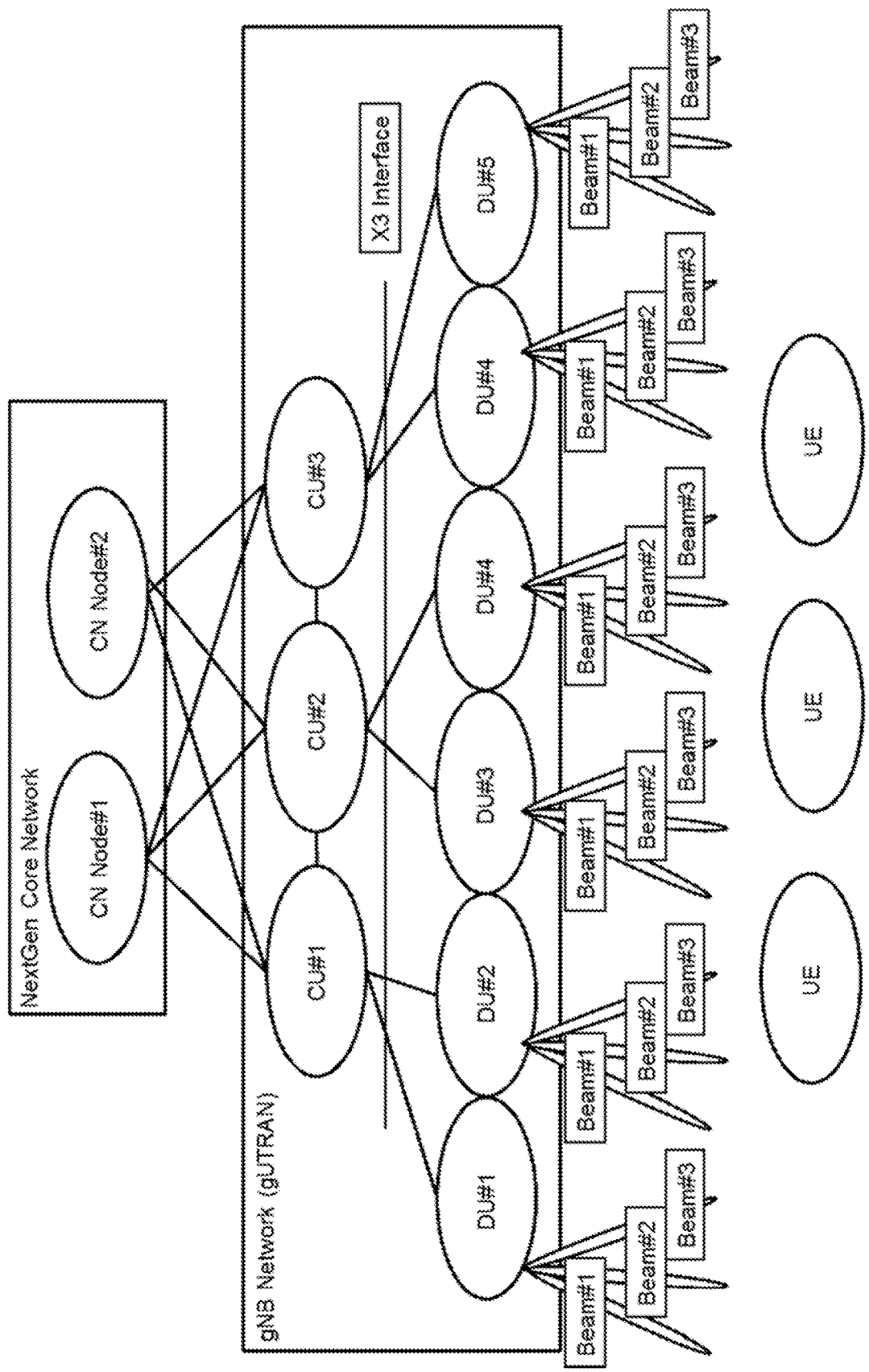
FIG. 46 is an explanatory diagram for describing an architecture of a 5G network.

FIG. 46 is an explanatory diagram for describing an architecture of a 5G network. According to FIG. 46, the 5G network includes a plurality of CUs (each corresponding to the first unit 700 in the fourth example alteration) in a radio access network (referred to as a gUTRAN, for example), and each CU communicates with a UE via one or more DUs (corresponding to second unit(s) 750 in the fourth example alteration). Each DU communicates with a UE by a beam. A set of one CU and one or more DUs may be referred to as a generation Node B (gNB).

Figure 47:
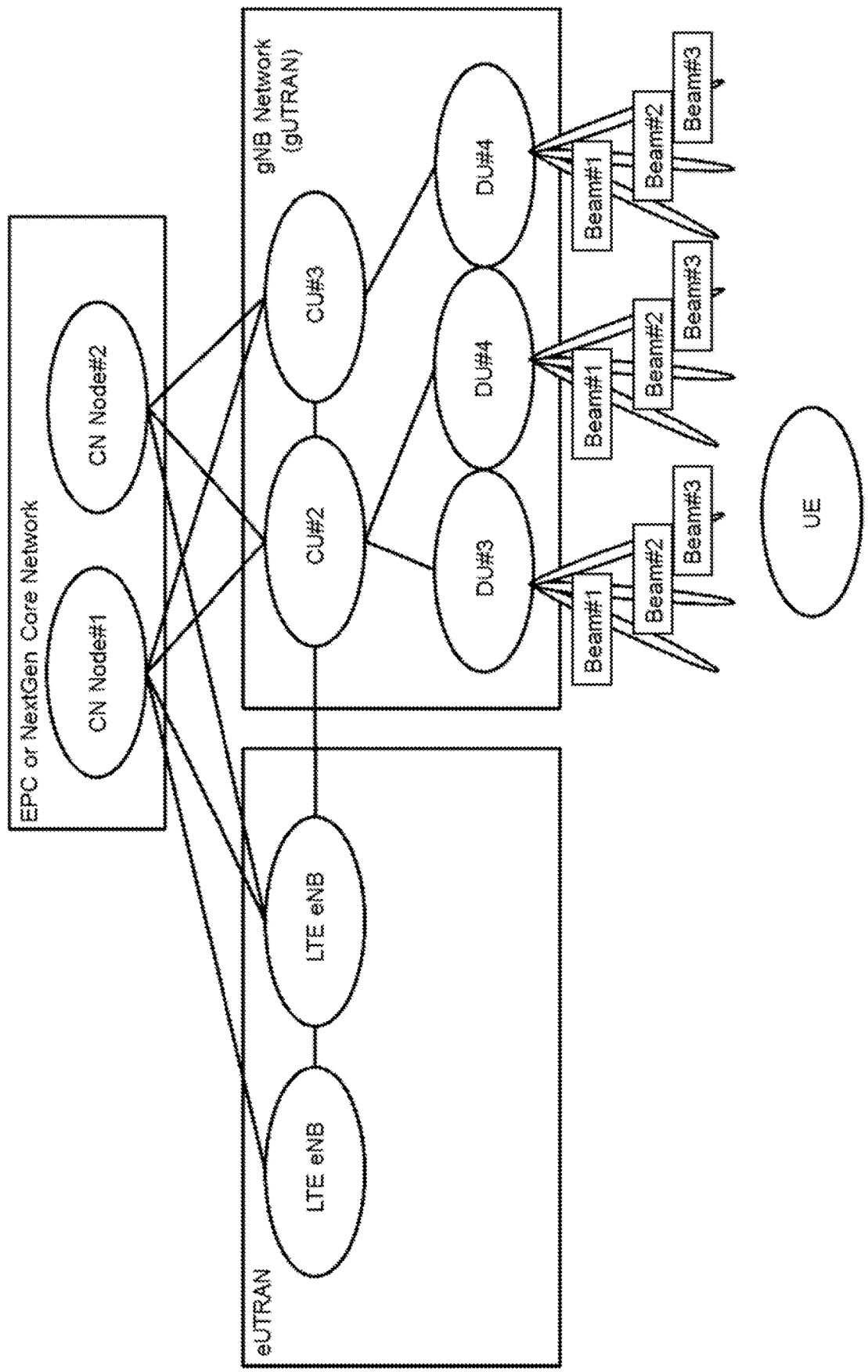
FIG. 47 is an explanatory diagram for describing an architecture of a combination of a 4G network and a 5G network.

FIG. 47 is an explanatory diagram for describing an architecture of a combination of a 4G network and a 5G network. According to FIG. 47, the 4G network and the 5G network may coexist, for example. The 4G network includes a plurality of eNBs in a radio access network (eUTRAN), and the 5G network includes a plurality of CUs and a plurality of DUs (plurality of gNBs) in a radio access network (gUTRAN) as in the example in FIG. 46. For example, each DU communicates with a UE by a beam.

(2) Handover

For example, in the example in FIG. 46, a handover of a UE is performed between CUs. Such a handover is also applicable to the first example alteration of the first example embodiment. In other words, a handover in the first example alteration may be a handover between CUs (or a handover between gNBs). More specifically, in the first example alteration, each of the base station 100 and the base station 400 may be a CU (first unit 700 in the fourth example alteration) or a gNB (CU and DU) (first unit 700 and second unit 750 in the fourth example alteration).

For example, in the example in FIG. 47, a handover of a UE can be performed between an eNB and a CU (or a gNB). Such a handover is also applicable to the first example alteration of the first example embodiment. In other words, a handover in the first example alteration may be a handover between an eNB and a CU (or a gNB). More specifically, in the first example alteration, one of the base station 100 and the base station 400 may be an eNB, and the other of the base station 100 and the base station 400 may be a CU (first unit 700 in the fourth example alteration) or a gNB (CU and DU) (first unit 700 and second unit 750 in the fourth example alteration).

(3) Dual Connectivity

For example, in the example in FIG. 46, a UE may communicate with a master CU (or a master gNB) and a secondary CU (or a secondary gNB or a secondary DU) as dual connectivity. Such dual connectivity is also applicable to the second example alteration and the third example alteration of the first example embodiment. More specifically, in the second example alteration and the third example alteration, the master base station may be a master CU (first unit 700 in the fourth example alteration) or a master gNB (master CU and DU) (first unit 700 and second unit 750 in the fourth example alteration). Moreover, the secondary base station may be a secondary CU (first unit 700 in the fourth example alteration), a secondary gNB (secondary CU and DU) (first unit 700 and second unit 750 in the fourth example alteration), or a secondary DU (second unit 750 in the fourth example alteration).

For example, in the example in FIG. 47, a UE may communicate with a master eNB (MeNB) and a secondary CU (or a secondary gNB or a secondary DU) as dual connectivity. Such dual connectivity is also applicable to the second example alteration and the third example alteration of the first example embodiment. More specifically, in the second example alteration and the third example alteration, the master base station may be a master eNB, and the secondary base station may be a secondary CU (first unit 700 in the fourth example alteration), a secondary gNB (secondary CU and DU) (first unit 700 and second unit 750 in the fourth example alteration), or a secondary DU (second unit 750 in the fourth example alteration).

The example alterations of the first example embodiment have been described above. According to the example alterations of the first example embodiment, it is possible to achieve security enhancement in the case of employing beamforming in various cases (cases of handover, dual connectivity, and 5G).

5. Second Example Embodiment

Next, with reference to FIG. 48 to FIG. 52, the second example embodiment of the present invention will be described. The above-described first example embodiment is a concrete example embodiment, whereas the second example embodiment is a more generalized example embodiment.

<5.1. Configuration of System>

Figure 48:
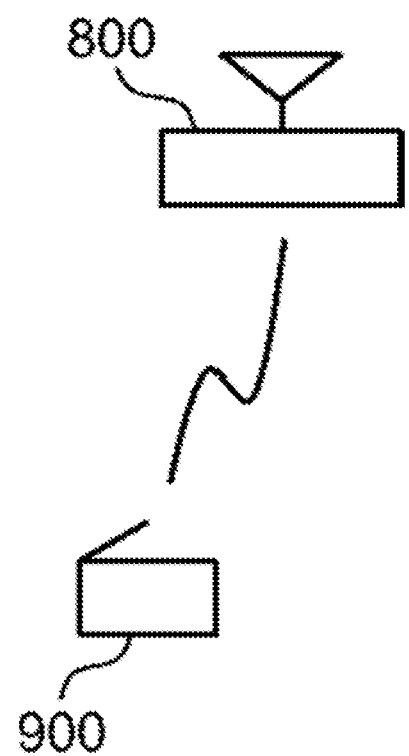
FIG. 48 is an explanatory diagram illustrating an example of a schematic configuration of a system according to a second example embodiment.

With reference to FIG. 48, an example of a configuration of a system 6 according to the second example embodiment will be described. FIG. 48 is an explanatory diagram illustrating an example of a schematic configuration of the system 6 according to the second example embodiment. According to FIG. 48, the system 6 includes a base station 800 and a terminal apparatus 900.

For example, the system 6 is a system conforming to a 3GPP standard. More concretely, the system 1 may be a system conforming to LTE/LTE-Advanced or may be a system conforming to a 5th generation (5G) standard. The system 1 is apparently not limited to these examples.

For example, descriptions of the base station 800 and the terminal apparatus 900 are the same as the descriptions of the base station 100 and the terminal apparatus 200 of the first example embodiment. Hence, overlapping descriptions are omitted here.

<5.2. Configuration of Base Station>

Figure 49:
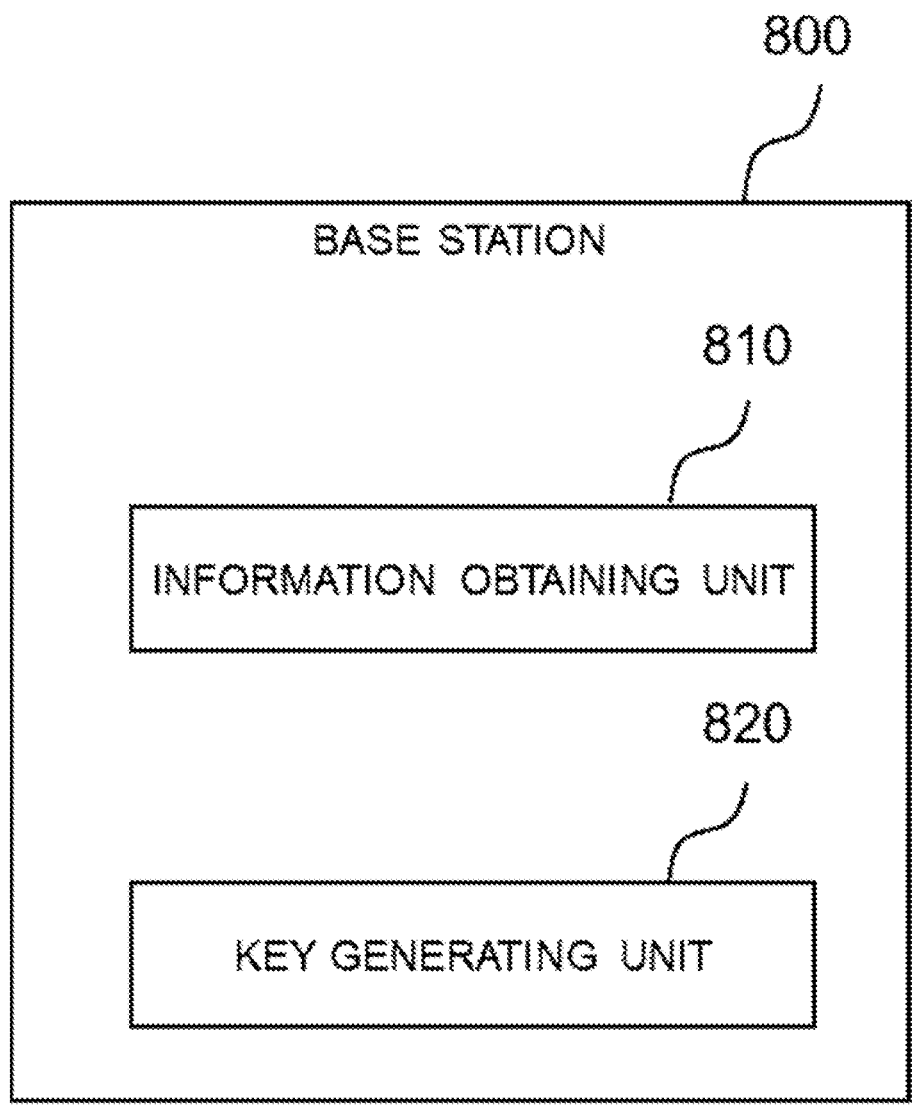
FIG. 49 is a block diagram illustrating an example of a schematic configuration of a base station according to the second example embodiment.

Next, a description will be given of an example of a configuration of the base station 800 according to the second example embodiment with reference to FIG. 49. FIG. 49 is a block diagram illustrating an example of a schematic configuration of the base station 800 according to the second example embodiment. According to FIG. 49, the base station 800 includes an information obtaining unit 810 and a key generating unit 820.

Concrete operations of the information obtaining unit 810 and the key generating unit 820 will be described later in detail.

The information obtaining unit 810 and the key generating unit 820 may be implemented by a baseband (BB) processor and/or another processor, or the like. The information obtaining unit 810 and the key generating unit 820 may be implemented by the same processor or may be implemented by separate processors.

The base station 800 may include a memory configured to store a program and one or more processors that can execute the program, and the one or more processors may perform operations of the information obtaining unit 810 and the key generating unit 820. The program may be a program for causing the one or more processors to perform the operations of the information obtaining unit 810 and the key generating unit 820.

<5.3. Configuration of Terminal Apparatus>

Figure 50:
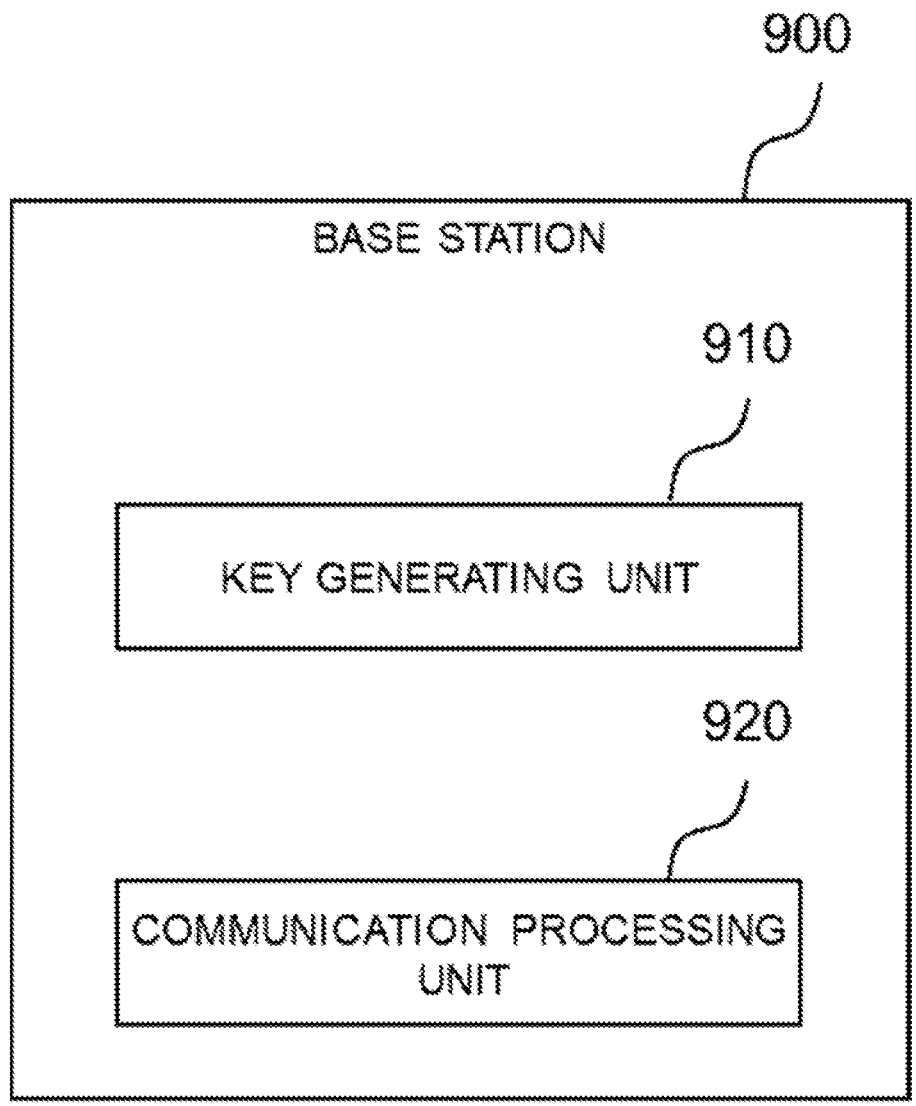
FIG. 50 is a block diagram illustrating an example of a schematic configuration of a terminal apparatus according to the second example embodiment.

Next, an example of a configuration of the terminal apparatus 900 according to the second example embodiment will be described with reference to FIG. 50. FIG. 50 is a block diagram illustrating an example of a schematic configuration of the terminal apparatus 900 according to the second example embodiment. According to FIG. 50, the terminal apparatus 900 includes a key generating unit 910 and a communication processing unit 920.

Concrete operations of the key generating unit 910 and the communication processing unit 920 will be described later.

The key generating unit 910 and the communication processing unit 920 may be implemented by a baseband (BB) processor and/or another processor, or the like. The key generating unit 910 and the communication processing unit 920 may be implemented by the same processor or may be implemented by separate processors.

The terminal apparatus 900 may include a memory configured to store a program and one or more processors that can execute the program, and the one or more processors may perform operations of the key generating unit 910 and the communication processing unit 920. The program may be a program for causing the one or more processors to perform the operations of the key generating unit 910 and the communication processing unit 920.

<5.4. Technical Features>

Next, technical features of the second example embodiment will be described with reference to FIG. 51 and FIG. 52.

The base station 800 (information obtaining unit 810) obtains information related to beam selection (beam selection related information). The base station 100 (key generating unit 820) then generates a security key for radio communication between a base station and the terminal apparatus 900, based on the information related to beam selection.

The terminal apparatus 900 (key generating unit 910) generates a security key for radio communication with the base station, based on the information related to beam selection (beam selection related information). The terminal apparatus 900 (communication processing unit 920) then performs radio communication with the base station by using the security key.

(1) Base Station/Radio Communication, Beam Selection, Beam Selection Related Information, Security Key Generation, Radio Communication with Terminal Apparatus by Using Security Key, and Operations of Terminal Apparatus Descriptions of a base station/radio communication, beam selection, beam selection related information, security key generation, radio communication with terminal apparatus by using security key, and operations of a terminal apparatus in the second example embodiment are the same as the descriptions of those in the first example embodiment, for example. Hence, overlapping descriptions are omitted here, and only an example of a flow of processing will be described.

(2) Flow of Processing

Processing of Base Station

Figure 51:
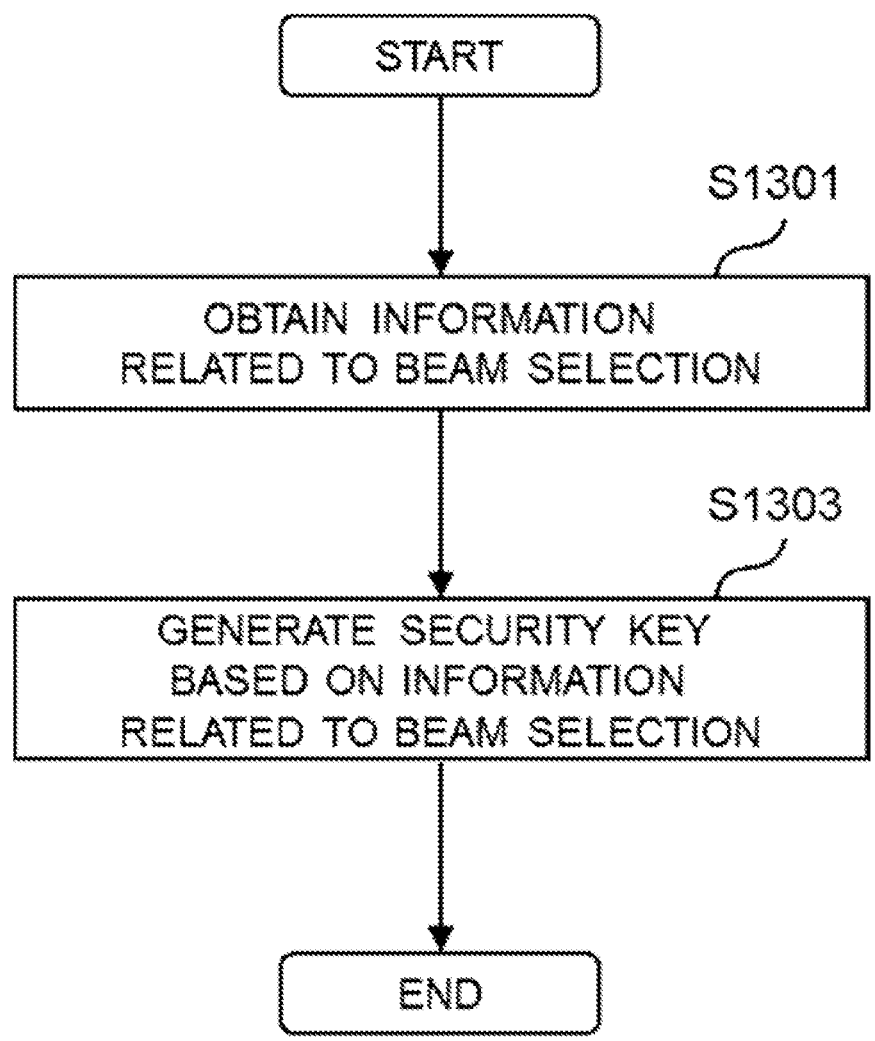
FIG. 51 is an explanatory diagram for describing an example of a schematic flow of processing of the base station according to the second example embodiment.

FIG. 51 is an explanatory diagram for describing an example of a schematic flow of processing of the base station 800 according to the second example embodiment.

The base station 800 (information obtaining unit 810) obtains information related to beam selection (S1301).

The base station 100 (key generating unit 820) generates a security key for radio communication between a base station and the terminal apparatus 900, based on the information related to beam selection (S1303).

Processing of Terminal Apparatus

Figure 52:
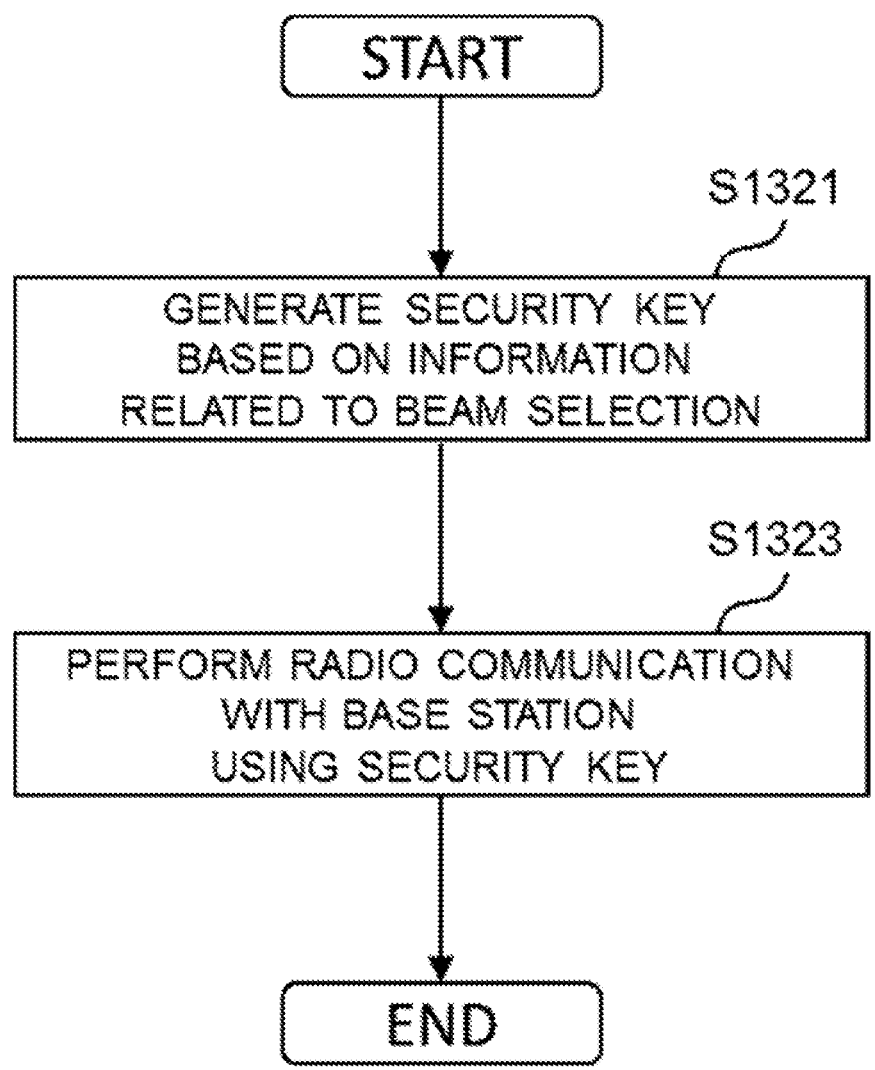
FIG. 52 is an explanatory diagram for describing an example of a schematic flow of processing of the terminal apparatus according to the second example embodiment.

FIG. 52 is an explanatory diagram for describing an example of a schematic flow of processing of the terminal apparatus 900 according to the second example embodiment.

The base station 900 (key generating unit 910) generates a security key for radio communication with the base station, based on the information related to beam selection (S1321).

The terminal apparatus 900 (communication processing unit 920) performs radio communication with the base station by using the security key (S1323).

As above, the second example embodiment has been described. According to the second example embodiment, it is possible to achieve security enhancement in the case of employing beamforming. Note that the example alterations of the above-described first example embodiment may also be applied to the second example embodiment.

Descriptions have been given above of the example embodiments of the present invention. However, the present invention is not limited to the above-described example embodiments. It should be understood by those skilled in the art that the above-described example embodiments are merely examples and that various modifications are possible without departing from the scope and the spirit of the present invention.

For example, "transmit" here means, for example, to perform transmit processing in at least one protocol layer among a plurality of protocol layers and does not mean to output any signal with wire or wirelessly. Similarly, "receive" here means, for example, to perform receive processing in at least one protocol layer among a plurality of protocol layers. Similarly, "perform radio communication" here means, for example, to perform transmit processing and/or receive processing in at least one protocol layer among a plurality of protocol layers. As an example, the plurality of protocol layers are the physical layer, the MAC layer, the RLC layer, the PDCP layer, and the RRC layer. As another example, the plurality of protocol layers are the physical layer, the MAC layer, the IP layer, and the transport layer.

Moreover, "transmit X to Y" here is not limited to transmitting X directly to Y and includes transmitting X indirectly to Y (specifically, transmitting X to another node, and after transfer of X from such another node, transmitting X to Y). Similarly, "receive X from Y" here is not limited to receiving X directly from Y and includes receiving X indirectly from Y (specifically, receiving X transmitted from Y after transfer of X from another node).

Moreover, for example, the steps in any processing described herein need not be performed chronologically in the order illustrated in the corresponding sequence diagram or flowchart. For example, the steps of the processing may be performed in a different order from the order illustrated as the corresponding sequence diagram or flowchart or may be performed in parallel. In addition, some of the steps in the processing may be deleted, or more steps may be added to the processing.

An apparatus (e.g., one or more apparatuses (or units) of a plurality of apparatuses (or units) included in a base station) or a module (e.g., a module for one of the plurality of apparatuses (or units)) including constituent elements of the base station described herein (e.g., the first communication processing unit, the second communication processing unit, the information obtaining unit, and/or the key generating unit), may be provided. A module including constituent elements of the terminal apparatus or the core network node described herein (e.g., the communication processing unit, the information obtaining unit, and/or the key generating unit) may be provided. Moreover, methods including processing of the constituent elements may be provided, and programs for causing a processor to execute processing of the constituent elements may be provided. Furthermore, recording media (non-transitory computer-readable recording media) recording the programs may be provided. It is apparent that such apparatuses, modules, methods, programs, and recording media are also included in the present invention.

The whole or part of the above-described example embodiments can be described as, but not limited to, the following supplementary notes.

(Supplementary Note 1)

An apparatus comprising:

an information obtaining unit configured to obtain information related to beam selection; and a key generating unit configured to generate a security key for radio communication between a base station and a terminal apparatus based on the information related to the beam selection.

(Supplementary Note 2)

The apparatus according to Supplementary Note 1, wherein the beam selection is selection of a beam to be used for the radio communication.

(Supplementary Note 3)

The apparatus according to Supplementary Note 1 or 2, wherein the information related to the beam selection is a parameter which varies when a beam is selected.

(Supplementary Note 4)

The apparatus according to any one of Supplementary Notes 1 to 3, wherein the information related to the beam selection is identification information for identifying a beam.

(Supplementary Note 5)

The apparatus according to any one of Supplementary Notes 1 to 3, wherein the information related to the beam selection is a counter which is incremented when a beam is selected.

(Supplementary Note 6)

The apparatus according to any one of Supplementary Notes 3 to 5, wherein the beam is a beam to be used for the radio communication.

(Supplementary Note 7)

The apparatus according to any one of Supplementary Notes 1 to 6, wherein the information related to the beam selection is information which is transmitted to the terminal apparatus or transmitted from the terminal apparatus.

(Supplementary Note 8)

The apparatus according to Supplementary Note 7, wherein the information related to the beam selection is included in control information of a physical layer or a medium access control (MAC) layer which is transmitted to the terminal apparatus or transmitted from the terminal apparatus.

(Supplementary Note 9)

The apparatus according to any one of Supplementary Notes 1 to 8, wherein the key generating unit is configured to generate the security key based on the information related to the beam selection at the time of beam selection.

(Supplementary Note 10)

The apparatus according to any one of Supplementary Notes 1 to 9, wherein the security key is an encryption key for encryption of a user plane.

(Supplementary Note 11)

The apparatus according to any one of Supplementary Notes 1 to 9, wherein the security key is a key to be used for key generation.

(Supplementary Note 12)

The apparatus according to Supplementary Notes 11, wherein the key generation is generation of an encryption key for encryption of a user plane.

(Supplementary Note 13)

The apparatus according to any one of Supplementary Notes 1 to 11, wherein the base station is a secondary base station of dual connectivity of the terminal apparatus.

(Supplementary Note 14)

The apparatus according to any one of Supplementary Notes 1 to 11, wherein the base station is a target base station of a handover of the terminal apparatus.

(Supplementary Note 15)

The apparatus according to any one of Supplementary Notes 1 to 14, further comprising a first communication processing unit configured to perform radio communication with the terminal apparatus using the security key.

(Supplementary Note 16)

The apparatus according to Supplementary Note 15, wherein the security key is a key to be used for generation of encryption key for encryption of a user plane; and the first communication processing unit is configured to generate the encryption key using the security key and perform radio communication with the terminal apparatus using the encryption key.

(Supplementary Note 17)

The apparatus according to any one of Supplementary Notes 1 to 16, wherein the apparatus is the base station, one or more of a plurality of apparatuses included in the base station, or a module for one of the plurality of apparatuses.

(Supplementary Note 18)

The apparatus according to Supplementary Note 15 or 16, wherein the apparatus is a master base station of dual connectivity of the terminal apparatus, one or more of a plurality of apparatuses included in the master base station, or a module of one of the plurality of apparatuses;

the base station is a secondary base station of dual connectivity of the terminal apparatus; and the first communication processing unit is configured to perform radio communication with the terminal apparatus via the base station using the security key.

(Supplementary Note 19)

The apparatus according to Supplementary Note 15 or 16, wherein the base station includes a first unit which performs processing of an upper protocol layer, and a second unit which performs processing of a lower protocol layer;

the apparatus is the first unit or a module for the first unit; and the first communication processing unit is configured to perform radio communication with the terminal apparatus via the second unit using the security key.

(Supplementary Note 20)

The apparatus according to any one of Supplementary Notes 1 to 14, further comprising a second communication processing unit configured to transmit the security key to the base station.

(Supplementary Note 21)

The apparatus according to Supplementary Note 20, wherein the security key is a key to be used for key generation by the base station.

(Supplementary Note 22)

The apparatus according to Supplementary Note 20 or 21, wherein the base station is a secondary base station of dual connectivity of the terminal apparatus;

the second communication processing unit is configured to transmit, to the base station, a message for addition or change of a secondary base station; and the message includes the security key.

(Supplementary Note 23)

The apparatus according to Supplementary Note 20 or 21, wherein the base station is a target base station of a handover of the terminal apparatus;

the second communication processing unit is configured to transmit a message to the base station in a handover procedure for the handover; and the message includes the security key.

(Supplementary Note 24)

The apparatus according to any one of Supplementary Notes 1 to 14 and 20 to 23, wherein the base station is a second base station which is different from a first base station; and the apparatus is the first base station, one or more of a plurality of apparatuses included in the first base station, or a module for one of the plurality of the apparatuses.

(Supplementary Note 25)

The apparatus according to any one of Supplementary Notes 1 to 14 and 20 to 23, wherein the apparatus is a core network node, or a module for a core network node.

(Supplementary Note 26)

An apparatus comprising:

a key generating unit configured to generate a security key for radio communication with a base station based on information related to beam selection; and a communication processing unit configured to perform radio communication with the base station using the security key.

(Supplementary Note 27)

The apparatus according to Supplementary Note 26, wherein the communication processing unit is configured to receive the information related to the beam selection from a radio access network node, or transmit the information related to the beam selection to the radio access network node.

(Supplementary Note 28)

The apparatus according to Supplementary Note 27, wherein the communication processing unit is configured to receive control information of a physical layer or a MAC layer from the radio access network node, or transmit the control information to the radio access network node; and the control information includes the information related to the beam selection.

(Supplementary Note 29)

The apparatus according to any one of Supplementary Notes 26-28, wherein the apparatus is a terminal apparatus or a module for a terminal apparatus.

(Supplementary Note 30)

An apparatus comprising:

an information obtaining unit configured to obtain a security key for radio communication with a terminal apparatus, the security key being generated based on information related to beam selection; and a first communication processing unit configured to perform radio communication with the terminal apparatus using the security key.

(Supplementary Note 31)

The apparatus according to Supplementary Note 30, further comprising a second communication processing unit configured to receive the security key from a base station.

(Supplementary Note 32)

The apparatus according to Supplementary Note 30 or 31, wherein the first communication processing unit is configured to generate an encryption key for encryption of a user plane using the security key, and perform radio communication with the terminal apparatus using the encryption key.

(Supplementary Note 33)

The apparatus according to any one of Supplementary Notes 30 to 32, wherein the apparatus is a base station, one or more of a plurality of apparatuses included in a base station, or a module for one of the plurality of apparatuses.

(Supplementary Note 34)

A method comprising:

obtaining information related to beam selection; and generating a security key for radio communication between a base station and a terminal apparatus based on the information related to the beam selection.

(Supplementary Note 35)

A method comprising:

generating a security key for radio communication with a base station based on information related to beam selection; and performing radio communication with the base station using the security key.

(Supplementary Note 36)

A method comprising:

obtaining a security key for radio communication with a terminal apparatus, the security key being generated based on information related to beam selection; and performing radio communication with the terminal apparatus using the security key.

(Supplementary Note 37)

A system comprising:

a base station; and a terminal apparatus, wherein the base station generates a security key for radio communication with the terminal apparatus based on information related to beam selection, and wherein the terminal apparatus generates a security key for radio communication with a base station based on the information related to the beam selection, and performs the radio communication with the base station using the security key.

(Supplementary Note 38)

A program that causes a processor to execute:

obtaining information related to beam selection; and generating a security key for radio communication between a base station and a terminal apparatus based on the information related to the beam selection.

(Supplementary Note 39)

A program that causes a processor to execute:

generating a security key for radio communication with a base station based on information related to beam selection; and performing radio communication with the base station using the security key.

(Supplementary Note 40)

A program that causes a processor to execute:

obtaining a security key for radio communication with a terminal apparatus, the security key being generated based on information related to beam selection; and performing radio communication with the terminal apparatus using the security key.

(Supplementary Note 41)

A non-transitory computer-readable recording medium storing a program that causes a processor to execute:

obtaining information related to beam selection; and generating a security key for radio communication between a base station and a terminal apparatus based on the information related to the beam selection.

(Supplementary Note 42)

A non-transitory computer-readable recording medium storing a program that causes a processor to execute:

generating a security key for radio communication with a base station based on information related to beam selection; and performing radio communication with the base station using the security key.

(Supplementary Note 43)

A non-transitory computer-readable recording medium storing a program that causes a processor to execute:

obtaining a security key for radio communication with a terminal apparatus, the security key being generated based on information related to beam selection; and performing radio communication with the terminal apparatus using the security key.

INDUSTRIAL APPLICABILITY

It is possible to achieve security enhancement in a mobile communication system in the case of employing beamforming.

REFERENCE SIGNS LIST 1, 2, 3, 4, 5, 6 System
100, 400, 500, 600, 800 Base Station
141, 441, 541, 641 First Communication Processing Unit
143, 443, 543, 643 Second Communication Processing Unit
145, 445, 545, 645, 810 Information Obtaining Unit
147, 447, 547, 647, 820 Key Generating Unit
200, 900 Terminal Apparatus
231, 920 Communication Processing Unit
235, 910 Key Generating Unit
300 Core Network Node
331 Communication Processing Unit
333 Information Obtaining Unit
335 Key Generating Unit
700 First Unit
741 First Communication Processing Unit
743 Second Communication Processing Unit
745 Information Obtaining Unit
747 Key Generating Unit
750 Second Unit

What is claimed is:

1. An apparatus comprising:
a memory storing instructions; and
one or more processors configured to execute the instructions to:
  obtain information related to selection of a beam to be used for radio communication between a base station and a terminal apparatus; and
  generate a security key for the radio communication between a base station and a terminal apparatus based on the information related to the selection of the beam,
wherein the information related to the selection of the beam is
  identification information for identifying the beam, or
  a counter which is incremented when the beam is selected.

2. The apparatus according to claim 1, wherein the one or more processors are configured to execute the instructions to generate the security key based on the information related to the beam selection at the time of beam selection.

3. The apparatus according to claim 1, wherein the base station is a secondary base station of dual connectivity of the terminal apparatus.

4. The apparatus according to claim 1, wherein the base station is a target base station of a handover of the terminal apparatus.

5. The apparatus according to claim 1, wherein the one or more processors are configured to execute the instructions to perform radio communication with the terminal apparatus using the security key.

6. The apparatus according to claim 1, wherein the apparatus is the base station, one or more of a plurality of apparatuses included in the base station, or a module for one of the plurality of apparatuses.

7. The apparatus according to claim 5, wherein
the apparatus is a master base station of dual connectivity of the terminal apparatus, one or more of a plurality of apparatuses included in the master base station, or a module of one of the plurality of apparatuses;
the base station is a secondary base station of dual connectivity of the terminal apparatus; and
the one or more processors are configured to execute the instructions to perform radio communication with the terminal apparatus via the base station using the security key.

8. The apparatus according to claim 5, wherein
the base station includes a first unit which performs processing of an upper protocol layer, and a second unit which performs processing of a lower protocol layer;
the apparatus is the first unit or a module for the first unit; and
the one or more processors are configured to execute the instructions to perform radio communication with the terminal apparatus via the second unit using the security key.

9. The apparatus according to claim 1, wherein the one or more processors are configured to execute the instructions to transmit the security key to the base station.

10. The apparatus according to claim 9, wherein the security key is a key to be used for key generation by the base station.

11. The apparatus according to claim 9, wherein
the base station is a secondary base station of dual connectivity of the terminal apparatus;
the one or more processors are configured to execute the instructions to transmit, to the base station, a message for addition or change of a secondary base station; and
the message includes the security key.

12. The apparatus according to claim 9, wherein
the base station is a target base station of a handover of the terminal apparatus;
the one or more processors are configured to execute the instructions to transmit a message to the base station in a handover procedure for the handover; and
the message includes the security key.

13. The apparatus according to claim 1, wherein
the base station is a second base station which is different from a first base station; and
the apparatus is the first base station, one or more of a plurality of apparatuses included in the first base station, or a module for one of the plurality of the apparatuses.

14. The apparatus according to claim 1, wherein the apparatus is a core network node, or a module for a core network node.

15. An apparatus comprising:
a memory storing instructions; and
one or more processors configured to execute the instructions to:
  generate a security key for radio communication with a base station based on information related to selection of a beam to be used for the radio communication; and
  perform the radio communication with the base station using the security key,
wherein the information related to the selection of the beam is
  identification information for identifying the beam, or
  a counter which is incremented when the beam is selected.

16. A method comprising:
obtaining information related to selection of a beam to be used for radio communication between a base station and a terminal apparatus; and
generating a security key for the radio communication between a base station and a terminal apparatus based on the information related to the selection of the beam, wherein the information related to the selection of the beam is
identification information for identifying the beam, or a counter which is incremented when the beam is selected.

* * * * *